United States Patent
Kumar et al.

(10) Patent No.: US 6,697,810 B2
(45) Date of Patent: Feb. 24, 2004

(54) SECURITY SYSTEM FOR EVENT MONITORING, DETECTION AND NOTIFICATION SYSTEM

(75) Inventors: Nithin Kumar, Milpitas, CA (US); Peiwei Mi, Cupertino, CA (US); Kevin Hsiaohsu Tu, Milpitas, CA (US); Bing-Shing Chen, Fremont, CA (US)

(73) Assignee: Vigilance, Inc., Sunnyvale, CA (US)

( * ) Notice: Subject to any disclaimer, the term of this patent is extended or adjusted under 35 U.S.C. 154(b) by 136 days.

(21) Appl. No.: 09/886,402

(22) Filed: Jun. 20, 2001

(65) Prior Publication Data

US 2002/0156785 A1 Oct. 24, 2002

Related U.S. Application Data

(60) Provisional application No. 60/299,669, filed on Jun. 19, 2001, provisional application No. 60/296,948, filed on Jun. 8, 2001, and provisional application No. 60/285,647, filed on Apr. 19, 2001.

(51) Int. Cl.[7] .............................................. G06F 17/00
(52) U.S. Cl. ........................ 707/10; 707/101; 707/102
(58) Field of Search ...................................... 707/1–206

(56) References Cited

U.S. PATENT DOCUMENTS

| | | | |
|---|---|---|---|
| 5,630,123 A | 5/1997 | Hogge ......................... | 395/607 |
| 5,734,645 A | 3/1998 | Raith et al. | |
| 5,748,104 A | 5/1998 | Argyroudis et al. | |
| 5,794,210 A | 8/1998 | Goldhaber | |
| 5,812,668 A | 9/1998 | Weber ......................... | 380/24 |
| 5,845,258 A | 12/1998 | Kennedy ....................... | 705/8 |
| 5,855,008 A | 12/1998 | Goldhaber et al. | |
| 5,917,405 A | 6/1999 | Joao | |
| 5,931,900 A | 8/1999 | Notani et al. ................ | 709/201 |
| 6,055,519 A | 4/2000 | Kennedy et al. ............... | 705/80 |
| 6,157,915 A | 12/2000 | Bhaskaran et al. ............ | 705/7 |
| 6,185,613 B1 * | 2/2001 | Lawson et al. .............. | 709/224 |
| 6,211,782 B1 | 4/2001 | Sandelman et al. | |
| 6,598,224 B1 * | 7/2003 | Maeda et al. ................ | 707/102 |
| 6,601,073 B1 * | 7/2003 | Robare ......................... | 707/102 |
| 6,609,128 B1 * | 8/2003 | Underwood ................ | 707/200 |

OTHER PUBLICATIONS

Jackson et al., Multi–scale event detection and period extraction, Time–scale and Time–Frequency Analysis and Applications (Ref. No 2000/019), IEE Seminar on Feb. 29, 2000, pp. 25/1 to 25/6.*

Raeth et al., Finding events automatically in contiuosly sampled data streams via anomaly detection, Natinoal Aerospace and Electronics Conference, 2000, NAECON 2000, Proceedings of the IEEE 2000, Oct. 10–12, 2000, pp. 580–587.*

Haering et al., A semantic event–detection appproach and its application to detecting hunts in wildlife video, Circuits and Systems for Video Technology, IEEE Transactions on vol. 10, Issue 6, Sep. 2000, pp. 857–868.*

Loeser Henrik, "Keeping Web Pages Up–To–Date With SQL:1999", Int. Database Engineering and Applications Symposium (IDEAS 2000), Yokohama, Japan Sep. 2000, University of Kaiserslautern, Department of Computer Science.

\* cited by examiner

Primary Examiner—David Yiuk Jung
(74) Attorney, Agent, or Firm—Beyer Weaver & Thomas LLP

(57) ABSTRACT

Methods and apparatus for providing access in an event detection and tracking system are disclosed, where the event detection and tracking system is adapted for storing data associated with a plurality of detected events. An access request for access to at least a portion of data associated with one of the plurality of detected events is received and access information associated with the access request is obtained. It is then determined from the access information whether to provide access to at least a portion of the data associated with one of the plurality of detected events. When it is determined from the access information that access to at least a portion of the data is to be provided, access is provided in accordance with the access information.

45 Claims, 33 Drawing Sheets

```
Customer ID              ← Business attribute #1 — 204 ⎫
Order #                  ← Business attribute #2 — 206 ⎬ 202
Ship date — 214                                         ⎭
SKU1
Number of orders for SKU1
Inventory level for SKU1 ← Business metric #1 — 210 ⎫
SKU2                                                 ⎬ 208
Number of orders for SKU2                            ⎪
Inventory level for SKU2 ← Business metric #2 — 212 ⎭
.
.
.
```

| Attribute name | Data type | Attribute value | Attribute # | Metric value flag |
|---|---|---|---|---|
| Customer | String | "SHOES_INC" | 1 | |
| Order No. | Integer | 42859 | 2 | |
| Ship date | String | "01/04/01" | | |
| SKU1 | Integer | 000195 | | |
| Number of orders – SKU1 | Integer | 4 | | |
| Inventory level for SKU1 | Integer | 97 | | 1 |
| SKU2 | Integer | 000228 | | |
| Number of orders – SKU2 | Integer | 16 | | |
| Inventory level for SKU2 | Integer | 31 | | 2 |

| 1502 | 1504 |
|---|---|
| Hash key | Hash value |
| Key 1 | String 1 |
| Key 2 | String 2 |

Mapping Table

| 1602 | 1604 |
|---|---|
| Hash key | Original record position (e.g., pointer) |
|  |  |

FIG. 24A

Monitor object

| Monitor Name 2802 |
|---|
| Monitor Author 2804 |
| Condition 2806 |
| One or more attributes 2808 (e.g., including one or more values) |
| Notification 2810 |
| Assignment 2812 |

*FIG. 28*

Exception object

| Exception identifier 2902 | Exception description 2904 | Event identifier 2906 |
|---|---|---|
| Trigger condition 2908 | Trigger type 2910 | One or more attributes (e.g., business metrics) 2912 |
| One or more attribute values 2914 | Monitor name 2916 | Monitor item 2918 |
| Notification/exception 2920 | Assign to 2922 | Priority 2924 |
| Detection time 2926 | Analysis 2928 | Analysis author 2930 |

| User: Peiwei | |
|---|---|
| | User Object |
| | Company: Vigilance  ~3204 |
| | Security group: A  ~3206 |
| | One or more attributes and associated values – RULE 13  ~3208 |
| | One or more filter objects – (e.g., attribute settings) indicating information that user wishes to view  ~3210 |

Security group object(s): Groups and associated list of rules indicating read/write access to exceptions/portions of exceptions

| Group1: Security group A  3212 | Read access for exceptions notified to themselves  ~3214 |
|---|---|
| Group2: Security group B  3216 | 1) Read/write access for exceptions created by monitors authored by themselves;<br>2) Read access for exceptions with analysis authored by someone in their company  ~3218 |

FIG. 36

Exception Desk

Beyer Weaver Thomas @ Vigilance Inc.

To view/change, enter ID: [    ] GO  OR  Go To: [    ] OFF  UPDATE MANY  FILTER  SORT Click on description below:

Filtered and sorted by your most recent filter and sort settings.
Showing 1-50 of 145 | Next Page | Last

| ID | Description | Detected At | Priority | Assigned To | Status | Closure On | Analysis Entries |
|---|---|---|---|---|---|---|---|
| 144 | Sales Order Did Not Ship by Line Creation Date + 30 day(s) for Order: 10002 - PC Int'l - 100DD4001 | May 18, 2001 11:43 AM | Medium | John E. Schneider | Open | Not Set | 3 May 19 2:43 PM |
| 137 | Sales Order Did Not Ship by Original Schedule Date for Order: 10030 - Compaq - 200DD2001 | May 18, 2001 9:43 AM | High | Chuck Lindsey | Open | May 20, 2001 | 1 May 18 2:31 PM |
| 133 | Supplier Delivery Not Received by Scheduled Delivery Date for PO: P900000105 - CreativDrive - 200SC3001 | May 17, 2001 5:45 PM | High | Richard K. Yoon | Open | May 20, 2001 | 2 May 19 4:04 PM |
| 125 | Sales Order On Hold occurred for Order: 10005 - iBus - PKG1000 | May 17, 2001 3:35 PM | Medium | Charlie Davis | Open | May 21, 2001 | 1 May 18 |

SECURITY SYSTEM FOR EVENT MONITORING, DETECTION AND NOTIFICATION SYSTEM

CROSS-REFERENCE TO RELATED APPLICATIONS

This application claims priority of U.S. Provisional Application No. 60/285,647, Attorney Docket No. VIGIP001P, entitled "BUSINESS EVENT MONITORING AND DETECTION SYSTEM," filed on Apr. 19, 2001, which is hereby incorporated by reference for all purposes.

This application also claims priority of U.S. Provisional Application No. 60/296,948, Attorney Docket No. VIGIP007P, entitled "EVENT MONITORING, DETECTION AND NOTIFICATION SYSTEM HAVING SECURITY AND COLLABORATIVE FUNCTIONS," filed on Jun. 8, 2001, which is hereby incorporated by reference for all purposes.

This application also claims priority of U.S. Provisional Application No. 60/299,669, Attorney Docket No. VIGIP006P, entitled "COLLABORATIVE RESOLUTION AND TRACKING OF DETECTED EVENTS AND CONDITIONS," filed on Jun. 19, 2001, which is hereby incorporated by reference for all purposes.

This invention is also related to U.S. patent application Ser. No. 09/886,393, Attorney Docket No. VIGIP001, filed on the same day as this patent application, naming B. Chen et al. as inventors, and entitled "DATA RETRIEVAL AND TRANSMISSION SYSTEM." That application is incorporated herein by reference in its entirety and for all purposes.

This invention is also related to U.S. patent application Ser. No. 09/886,397, Attorney Docket No. VIGIP002, filed on the same day as this patent application, naming K. Tu et al. as inventors, and entitled "EVENT MONITORING AND DETECTION SYSTEM." That application is incorporated herein by reference in its entirety and for all purposes.

This invention is also related to U.S. patent application Ser. No. 09/886,408, Attorney Docket No. VIGIP003, filed on the same day as this patent application, naming K. Tu et al. as inventors, and entitled "EVENT NOTIFICATION SYSTEM." That application is incorporated herein by reference in its entirety and for all purposes.

This invention is also related to U.S. patent application Ser. No. 09/886,403, Attorney Docket No. VIGIP005, filed on the same day as this patent application, naming P. Mi et al. as inventors, and entitled "EVENT MONITORING, DETECTION AND NOTIFICATION SYSTEM." That application is incorporated herein by reference in its entirety and for all purposes.

BACKGROUND OF THE INVENTION

1. Field of the Invention

The present invention relates to an event monitoring, detection, and notification system. More particularly, the present invention relates to accessing data associated with the detection, notification, and resolution of events.

2. Description of the Related Art

Modern business enterprises rely heavily on a wide variety of information technology, including both software and hardware, to implement business strategies, to allocate resources, to track the execution of business processes, and to provide an interface for communication with customers, vendors and their own personnel. These systems will hereinafter be referred to as "enterprise systems." Business processes executed by a business enterprise may be executed across enterprise system boundaries as well as within enterprise system boundaries.

Even during standard, non-peak operating conditions, the quantity of data that is transmitted by an enterprise system can be enormous. This data may be received by a business enterprise or produced by a business enterprise for internal use as well as for transmission outside the business enterprise system. However, regardless of the quantity of the data that is produced or transmitted, the quality of that data can vary greatly in content and importance. This variance can occur for a variety of reasons. For example, the data that is transferred among various entities within a business enterprise boundary or outside the business enterprise boundary may vary with the needs of those entities receiving or requesting the data. With the vast amount of data transmitted in enterprise systems and the varying content and importance of this data, detection of problems solely from that data is a complicated task. As a result, existing and potential problems that could arise during the execution of business processes dependent upon that data could go undetected. It would therefore be desirable if the content and importance of the data to the business enterprise producing and/or receiving the data could be indicated in the data transmitted by the enterprise system. Moreover, it would be beneficial if a mechanism for monitoring and detecting conditions based upon the transmitted data could be established.

Existing enterprise systems enable business enterprises to coordinate their internal and external activities in a variety of ways, including data transfer, analysis and processing. More particularly, such enterprise systems produce a flow of data that is used by business enterprises for tasks as diverse as the implementation of strategies for internal use such as accounting and the allocation of resources, and strategies for use across enterprise system boundaries such as order processing systems. Once received by the appropriate business or entity, the data is often parsed or analyzed for the information that is pertinent to the desired function to be performed by that entity. Unfortunately, this parsing and analysis is a time-consuming one, often requiring additional personnel to perform data collection and analysis.

One example of the data processing typically performed by many businesses is the processing of orders. Many businesses that supply products to consumers or retailers use order-processing systems to receive and process data associated with incoming orders. However, such order processing systems have limitations. As a result, additional software is often purchased or additional personnel may be hired to monitor its inventory to ensure that it can satisfy its incoming orders. Similarly, in order to monitor the timeliness of the processing of incoming orders, additional software products or personnel may be required to ensure that the ship dates fall within the expected or promised ship dates. Thus, additional resources are often required to ensure that ordered products are shipped in a timely manner, as well as to detect when products have not or cannot be shipped in a timely manner. As a result, business expenses that may be incurred to support such data analysis are not insubstantial. It would therefore be desirable if such additional resources typically required for analysis of data could be reduced or eliminated.

One method commonly used by businesses to track the data that is pertinent to their business is through the generation of reports. For instance, reports commonly generated often involve the use of spreadsheets. Although such report generation is a simple tool that may be easily adapted for all businesses, once the reports are generated, personnel hired by the business must manually review the data. As one example, the data within a single report may be correlated with other data in the same report. As another example, data within one report may need to be correlated with another report or multiple reports. Such manual interpretation of data is time consuming and requires numerous man-hours, increasing the business expenses required to successively operate a business. Moreover, such manual interpretation is at risk of misinterpretation due to the likelihood of human error. Accordingly, it would be preferable if the retrieval and monitoring of data could be automated.

Another problem with the generation of reports is that such reports merely reformat data for simplified viewing and data comparison. Moreover, since such report generation solely accomplishes the reformatting of data, those reports cannot be used for purposes of subsequent monitoring of that data. In other words, a report is a snapshot of data at a single point in time. More particularly, data values that are imported for purposes of a report will be values that are important to that business. However, data values change over time, and a single report cannot reflect such value changes. Thus, the mere generation of a report cannot be used for subsequent monitoring of that data as it changes over time. Even if multiple reports were generated, this does not enable or simplify the monitoring of the data illustrated in the generated reports. It would therefore be desirable if a mechanism were designed to enable the automated monitoring of valuable business data. Moreover, it would be beneficial if such a system could be customized for use by any business or industry.

In addition to the monitoring of valuable business data, it would be desirable if the data produced during the monitoring process could be securely stored. More particularly, it would be beneficial if security access could be established prior to providing data that is output as a result of the monitoring process. Similarly, it would be desirable if security access could be verified prior to modifying data used to track situations requiring resolution. Although some security features have been implemented with respect to existing monitoring and detection systems, such security features are traditionally not configurable with respect to those events that are to be monitored and detected. Moreover, these security features typically do not vary with the data for which access is being requested. Accordingly, it would be desirable if security features could be configured to correlate with those events that are to be monitored. In addition, it would be beneficial if access privileges could be varied with the data being requested, such as information being stored to track the event detection, monitoring, and resolution process.

In view of the above, it would be desirable if a business enterprise could attach a business context to data being transmitted by a business enterprise system to indicate the content and/or importance of the data. In addition, it would be beneficial if data transmitted by a business enterprise system could be monitored to detect various events deemed important to the business enterprise transmitting the data, such as an entity (e.g., department or group) within the business enterprise. Similarly, it would be desirable if the data transmitted by the business enterprise system could be monitored to detect various events deemed important to an entity (e.g., customer) external to the business enterprise system that is expecting to receive the data, products, services, or other information. Moreover, it would be beneficial if the data produced and tracked during the monitoring process could be securely stored for access by privileged parties.

SUMMARY OF THE INVENTION

The present invention enables access to system resources to be limited (e.g., granted or denied) in an event detection system. This is accomplished, in part, through a set of access information. The access information may simply be a set of access rules, but may also include further information that identifies applicability of access rules to different groups or entities.

In accordance with one embodiment, methods and apparatus for providing access in an event detection and tracking system are disclosed, where the event detection and tracking system is adapted for storing data associated with a plurality of detected events. An access request for access to at least a portion of data associated with one of the plurality of detected events is received and access information associated with the access request is obtained. It is then determined from the access information whether to provide access to at least a portion of the data associated with one of the plurality of detected events. When it is determined from the access information that access to at least a portion of the data is to be provided, access is provided in accordance with the access information.

In accordance with one embodiment, the access information may include a variety of security access rules. For instance, one set of rules may relate to the access of all data associated with a detected event, while another set of rules may relate to the access of specific portions of data associated with a detected event. Moreover, a rule may restrict access to the data or a portion thereof based upon the content of a portion of the data. In this manner, a content-based security system may be implemented.

Access rules may be implemented to support a variety of security features. In addition, various forms of access may be desirable. For instance, access may be provided in the form of read or write access. In addition each rule or set of rules may provide different levels of security. For instance, security may differ with respect to a single individual user, a security group corresponding to multiple users, or all individuals employed by a company. The access information may be associated with a user or group, and therefore the access information may include further preferences associated with the user or group.

In accordance with another aspect of the invention, a security feature enables monitoring configurations to be accessed in accordance with access information. For instance, those events that are to be monitored and conditions that are to be detected may be configurable, and it therefore may be preferable to limit access to such monitoring configurations.

In accordance with yet another aspect of the invention, security features are provided with respect to events that are configurable. For instance, it may be desirable to limit access to data that is output as the result of the monitoring process as well as data that is used during the monitoring process. Thus, this data may include data related to events as well as conditions that are configured. More particularly, each event may be defined by a set of event attributes, while each value for which data is to be monitored may be defined by a metric value associated with an event. As one example, data that is accessed may include one or more event attributes (e.g., that may be used to define an event) as well as values for those event attributes. Accordingly, access to data associated with configurable events may be limited according to information stored in relation to those configured events.

These and other features of the present invention will be described in more detail below in the detailed description of the invention and in conjunction with the following figures.

BRIEF DESCRIPTION OF THE DRAWINGS

FIGS. 24A through 24F together illustrate an exemplary graphical user interface that may be used to edit a notification list selected from notification lists such as those illustrated in FIG. 23 to establish the identities of individuals who are to receive notification messages as well as the manner in which notification messages are sent in accordance with one embodiment of the invention.

FIG. 28 is a diagram illustrating an exemplary monitor object that may be used to identify a particular configuration of monitoring conditions (e.g., condition and business attributes) in accordance with one embodiment of the invention.

FIG. 29 is a diagram illustrating an exemplary exception object that may be generated as a result of processing of a trigger condition such as that shown in FIG. 26.

FIG. 32 is a diagram illustrating an exemplary user object that may be used to store information associated with a user.

FIG. 33 is a diagram illustrating an exemplary security group object that may be used to access security rules associated with a security group.

FIG. 36 is an exemplary graphical user interface for an exception desk from which exceptions may be accessed.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Various embodiments of the invention enable data to be monitored in accordance with specific events. Similarly, data may be monitored in accordance with one or more conditions with respect to detected events. More particularly, data that is monitored may have meaning with respect to various events. For example, these events and associated event definitions may be useful to give data meaning within a particular business context. More particularly, the data may be flagged (e.g., labeled, marked, or indexed) to identify one or more business events of interest to a business. The resulting data may then be provided for access by various entities adapted for monitoring these business events. In addition, a notification message may be sent for various events detected within monitored data. More particularly, a notification module or server may send a notification message indicating that various events and/or conditions have been satisfied. In addition, the notification message may be sent in accordance with a set of notification preferences. For instance, notification preferences may indicate a preferred time for transmission or receipt of a notification message. In this manner, notification of various business events and states of these business events may be transmitted. In addition, a security feature of the present invention enables access to system resources to be limited (e.g., granted or denied) based upon access information associated with an access request. It is important to note that although the exemplary figures and description refer to the use of the present invention in a business context, the present invention is equally applicable to the monitoring and notification of events in other contexts as well.

Figure 1:
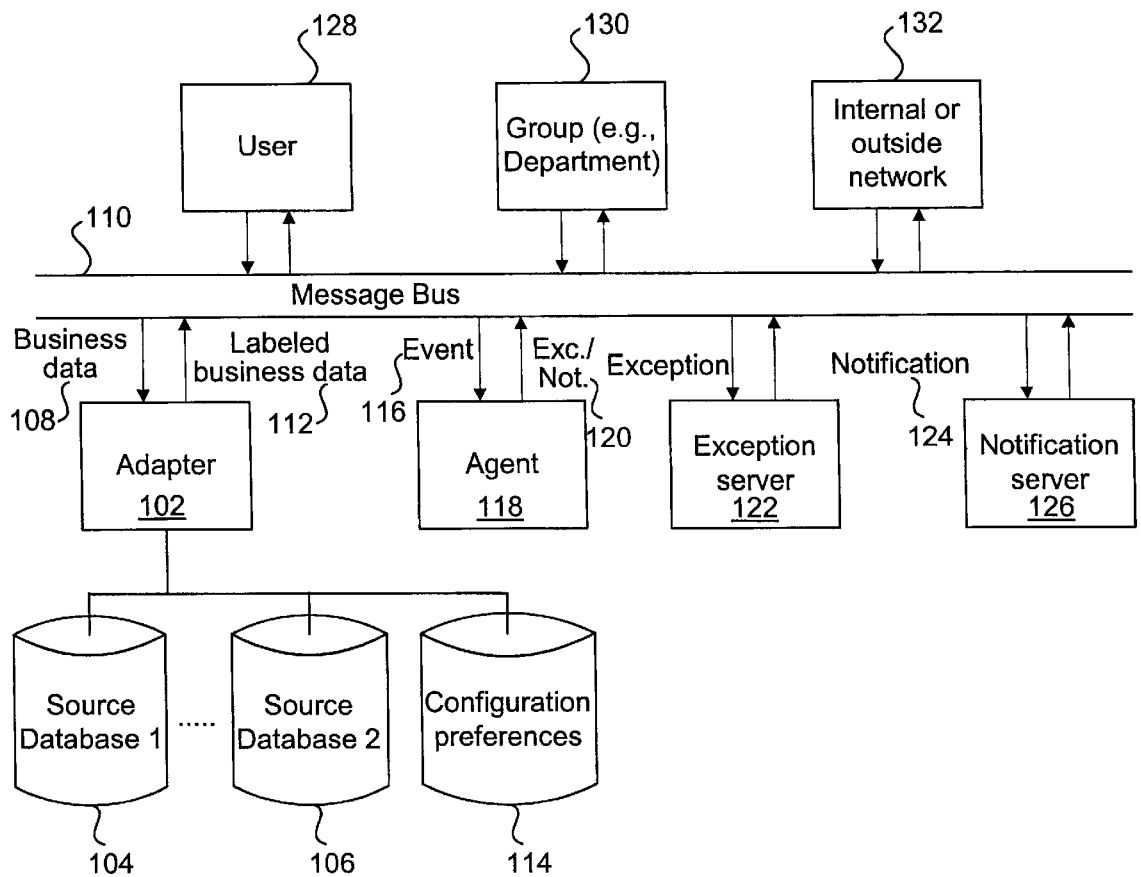
FIG. 1 is a block diagram illustrating one embodiment of the invention.

FIG. 1 is a system diagram illustrating one embodiment of the invention that may be implemented on a business site. As shown, an adapter 102 is provided for modifying data for use by a business. The term "business" will hereinafter be used to refer to any association, organization, company, corporation, or industry. Thus, the business need not be operated for profit. In the following exemplary figures, data that is retrieved is modified and transmitted for use by a business that processes orders. However, these figures are merely illustrative and therefore the present invention may be used for a variety of purposes and by a variety of businesses.

As shown in FIG. 1, the adapter 102 can obtain data from a variety of sources. For instance, as shown, the adapter 102 may retrieve data from one or more databases 104, 106. These databases 104, 106 may support a variety of protocols and therefore need not support the same protocol or database vendors. As a result, data may be acquired from a variety of sources and for a variety of purposes. As one example, the data may include data obtained from a source external to the business, such as customer data obtained at least in part from one or more customers. As another example, the data may be data generated internally such as the data stored for accounting purposes. In addition, the adapter 102 may obtain data 108 from a message bus 110. The adapter 102 operates in real-time or on a schedule to obtain data as well as modify the data received and/or obtained by the adapter 102. Although the adapter 102 may be connected directly to various components that enable event detection and notification, a message bus is preferred, since this facilitates and simplifies the addition and removal of components. In addition, since the message bus 110 connects other entities within or associated with the business such as users of a business enterprise system (e.g., business employees) to the event detection and notification system, the adapter 102 may obtain data provided by these entities via the message bus 110. It is also contemplated that the data may be obtained or received from a source outside the business, such as via the Internet.

Once data is obtained by the adapter 102, at least a portion of the data is flagged (e.g., labeled, marked or indexed) to identify one or more business events of interest to the business. In this manner, the data is given meaning within a particular business context. An exemplary diagram illustrating data that is flagged to identify business events of interest to a business will be shown and described in further detail below with reference to FIG. 2. The flagged data is then provided by the adapter 102 for access by other components. More particularly, the flagged data may be transmitted via the message bus 110. For instance, as described above, other components that enable detection and notification of various events or states of events may access the modified data via the message bus 110. In this manner, the business events identified by the modified data may be monitored and detected.

The content of the data and the manner in which the data is obtained by the adapter 102 may be configured as preferences 114. More particularly, configuration preferences may be stored in one or more databases as shown. In addition, although such preferences 114 may be coupled to the message bus 110, the preferences 114 may also be coupled to one or more modules or servers (e.g., adapter), as shown. In addition, although not illustrated, other modules such as the agent may also have configuration preferences, which may be stored in one or more databases, separately or in combination with the preferences 114. One method of configuring such retrieval preferences will be described in further detail below with reference to FIG. 5. Similarly, the preferences 114 may also indicate the content of the modified data to be transmitted, the events that are to be identified by the modified data, and the manner in which the modified data is to be transmitted. One method of configuring such sending preferences will be described in further detail below with reference to FIG. 6. The retrieval preferences and sending preferences may indicate preferences of the business as a whole, preferences of a particular entity within the business, or even preferences of a particular entity outside the business, such as a customer of the business. As one example, the shipping department of a business may indicate a first set of preferences so that inventory levels and ship dates can be monitored, while the accounting department of a business may indicate a second set of preferences to enable staffing and other resources to be tracked. As another example, a customer may request that a third set of preferences be established to ensure that its orders are shipped within three days of receipt. Thus, through the configuration of preferences 114, the content and manner in which data is retrieved and modified to identify various business events may be customized for a particular business or industry.

The modified data identifying one or more business events 116 are then obtained or intercepted by an agent 118. For instance, data that is published by an adapter 102 on a message bus such as the message bus 110 may be received by one or more agents 118 listening for events or specific events. Thus, the modified data is preferably sent in a format that is understandable by the agent 118. The agent 118 is adapted for detecting the events or monitoring the events such that an exception 120 (or notification) is generated when appropriate. More particularly, the agent 118 may monitor the events to detect various conditions as well as specific events. When one or more conditions are satisfied, the agent 118 may either wish to send a notification of the condition with respect to the event or generate an exception. A notification is sent merely to notify the recipient of the satisfaction of one or more conditions or states of specified business events. However, in addition to this information, an exception further enables the collaboration necessary to act on those events by multiple entities. In addition, an exception preferably enables the tracking and resolution of the exception. For instance, the exception may indicate one or more entities that are to be assigned the exception. In other words, one or more entities are given the responsibility to resolve the exception, while a notification may merely serve to notify an individual of the exception. In this manner, multiple entities may collaborate to resolve an issue. These entities may be individuals or groups of individuals, such as a department within a business. In summary, exception(s) 120 or notification(s) generated by the agent 118 may indicate a variety of circumstances requiring further action or attention by another component in the system. Similarly, the exception(s) 120 or notification(s) generated by the agent 118 may indicate circumstances requiring human intervention.

In one embodiment, the exception(s) 120 are intercepted by an exception server 122 that is adapted for generating an appropriate notification 124 of the event or state of the event. In addition, the exception server 122 enables collaboration between the entities that are assigned various exceptions. For instance, this may be accomplished through various graphical user interfaces that enable communication between the entities.

While notifications could be sent directly to the addressees, a notification server 126 may be used to provide mechanisms for managing notification messages and determining the manner and time that each notification message is to be sent. Thus, in this example, the notification 124 is received or obtained by a notification server 126 adapted for transmitting notification messages. As described above, the notification 124 that is received by the notification server 126 may be sent from the agent 118 or the exception server 122, as described above. The notification server 126 then sends a suitable notification message to one or more addressees, such as user 128 or group 130 (e.g., department). Such messages may also be transmitted to the entire network 132, which may be an internal network or may include a network external to the business, such as the Internet. The notification 124 may include a variety of information associated with the business event. In addition, the notification may be sent to one or more specified addressees in accordance with specified delivery parameters. More particularly, the delivery parameters may indicate the mode of delivery (e.g., email, facsimile, pager) as well as a time or time window for delivery.

The following example serves to illustrate the interaction of the adapter 102, the agent 118, the exception server 122, and the notification server 126. For example, consider the situation of a fire in a plant. In accordance with one embodiment, the adapter 102 captures data from an alarm system, which indicates the existence of the fire and possibly the building and/or specific location of the fire. The adapter 102 then publishes this event (e.g., "fire in Plant A"). An agent 118 that is watching for the publication of that event for Plant A detects the event when it occurs and publishes an occurrence of an exception. The exception server 122 subscribes to the exception event, logs it and further invokes the notification server 126 to notify the appropriate users 128 that the exception has occurred.

Figures 2, 3:
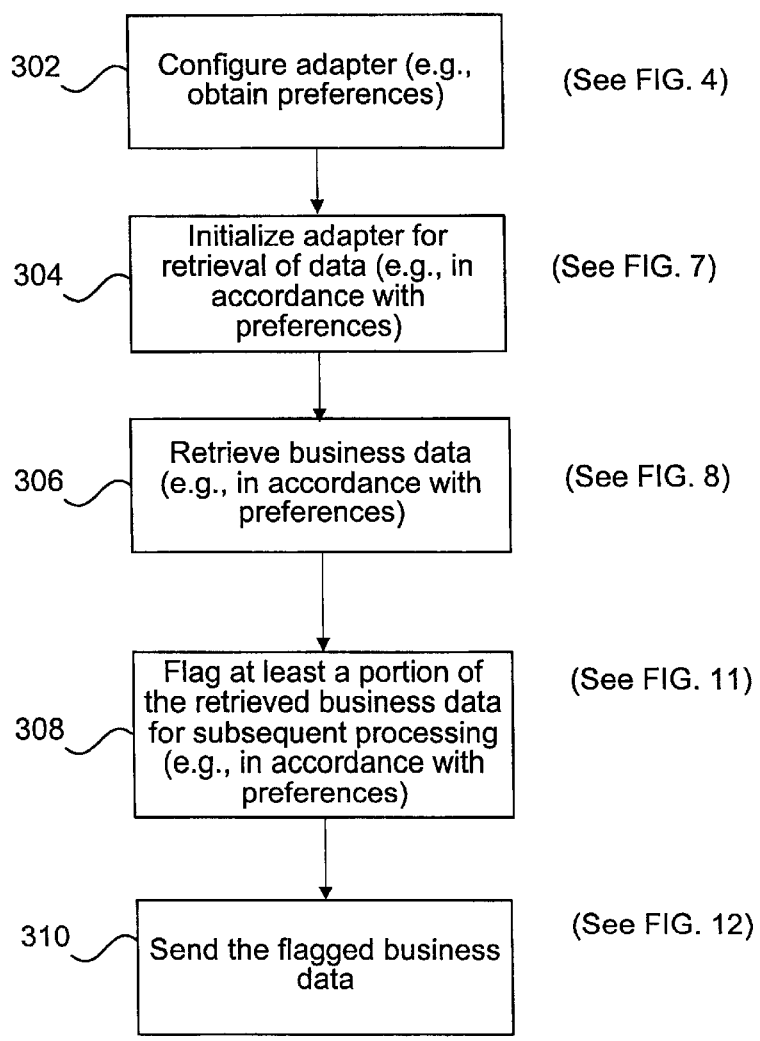
FIG. 2 is a diagram illustrating exemplary data that is retrieved and flagged in accordance with one embodiment of the invention.
FIG. 3 is a process flow diagram illustrating one method of providing flagged data for business event detection and monitoring in accordance with an embodiment of the invention.

Each business event is identified through the flagging (e.g., marking) of at least a portion of the retrieved data. FIG. 2 is a diagram illustrating exemplary data that is retrieved and flagged in accordance with one embodiment of the invention. In this example, the data that is retrieved has been flagged for use by a business that receives and processes orders. As shown, the data that is retrieved can include one or more values associated with one or more fields, which may vary with the business and purpose for which the data is used. For example, the values may be string, integer, floating point, or other value types. In this example, information for a customer order is provided. A business event may be any circumstance that a business deems important enough to require monitoring or detection. For instance, in this example, a business event may simply indicate that an order has been received or that various values require monitoring or further comparison. The data may be flagged such that a business event is identified by content of the data, importance of the data, and/or purpose of at least a portion of the data. More particularly, the content of the data may be identified by one or more business attributes 202. In this example, the business attributes 202 together indicate that the content of the data is a customer order. As shown, each business attribute 204, 206 may separately identify data that is important to the identified business event (e.g., customer order). In addition, the purpose of the data may be indicated by one or more business metrics 208 of interest to the business for which one or more values are to be monitored. In other words, through the business metrics, it is indicated that the purpose of at least this portion of the data is for monitoring of the associated business event. Thus, business metrics 208 may be considered to be a subset of business attributes 202. As shown, each business metric 210, 212 may separately identify data values such as inventory levels that are to be monitored or compared to another set of values. Although not flagged as a business attribute or business metric in this particular example, the ship date 214 of the particular order may be flagged to indicate that the ship date is to be monitored. This may be desirable, for instance, if an order is to be shipped within a particular date of receipt of the order. Accordingly, through flagging data, one or more values or fields may be labeled as values or fields of interest to one or more entities of the business. In this manner, each business event is defined for future monitoring, detection, and notification by the business.

Each business attribute and business metric may be identified in a variety of ways. For example, pointers, linked lists, arrays, or indices may be used to identify and track the attributes and metrics. In addition, labels that are more descriptive than data structures such as indices or arrays may be used to further define the event. Thus, these labels may serve as event descriptors for the flagged data. Moreover, these data structures may also be used to indicate the importance of the data that is flagged. For instance, the flagged data may be restructured or re-ordered to reflect the order of importance of the flagged data through the use of one or more indices that enable the flagged data to be ranked according to importance. More particularly, one index may be used to identify and prioritize business attributes while another index may be used to track and prioritize business metrics. However, in this example, the business attributes (identifying a customer order) and business metrics (identifying inventory levels) need not be prioritized. In this manner, another module or human receiving this flagged data may perform monitoring, detection, and notification functions based upon selected portions of the flagged data or perform these functions based upon the order of importance provided in the flagged data.

The flagging that is performed to identify a business event may also include the modification of the data in the form of restructuring the original data and/or the inclusion of additional data. As one example, the data may be re-ordered or restructured in a data structure such as an array such that the first N elements define the event. As another example, the flagging process may also include additional data as well as or instead of the association of business attributes and/or business metrics with the original data.

An adapter such as that illustrated at block 102 of FIG. 1 may be implemented in a variety of ways. FIG. 3 is a diagram illustrating one method of implementing an adapter capable of providing flagged data for business event detection and monitoring in accordance with an embodiment of the invention. In one embodiment, the invention is implemented in an object-oriented architecture and therefore multiple adapter instances may be simultaneously functioning to identify and define business events in accordance with predefined preferences. In other words, each adapter instance may have a different set of associated preferences, and therefore function to identify and define different types of business events. However, the adapter need not be implemented in an object-oriented architecture, and therefore this example is merely illustrative. The adapter may be designed specifically for use with a particular business or industry through providing predefined preferences that are not modifiable. However, the adapter is preferably designed such that it is generic for use with any type of business and for any purpose. Since the adapter is customizable for any business or industry, the adapter is first configured as shown at block 302 for the particular business or industry for which it is to be used. More particularly, the adapter may be configured with retrieval preferences indicating the content of the data and the manner in which the data is to be retrieved. For example, the retrieval preferences may indicate one or more sources of data to be retrieved, the frequency with which data is to be retrieved, and the type of data to be retrieved. Similarly, the adapter may be configured with sending preferences indicating the manner in which the retrieved data is to be flagged for transmission. For example, the sending preferences may indicate specific events to be identified within the retrieved data as well as specific information to be monitored. One method of configuring the adapter will be described in further detail below with reference to FIGS. 4–6.

Once the adapter is initialized to serve the particular business or industry, the adapter is initialized to operate according to the desired retrieval and sending preferences at block 304. For instance, a particular adapter instance may be initialized with the preferences obtained during configuration. One method of initializing the adapter will be described in further detail below with reference to FIG. 7. The data is then retrieved in accordance with the retrieval preferences at block 306. One method of retrieving data will be described in further detail below with reference to FIG. 8. At least a portion of the data retrieved is then flagged at block 308 in accordance with the sending preferences to identify one or more business events of interest to the business. As described above with reference to FIG. 2, a business event may be identified by a purpose of at least a portion of the data. For instance, through flagging the data, a business event may indicate that further monitoring of the flagged data fields is to be performed. A more detailed diagram illustrating flagged data such as that shown in FIG. 2 will be described in further detail below with reference to FIG. 11. The flagged data is then sent at block 310 (e.g., via a message bus). An exemplary message format that may be sent on a message bus such as that shown at block 110 of FIG. 1 will be described in further detail below with reference to FIG. 12. In this manner, data that is obtained from various sources (e.g., database, message bus, entity associated with the business) may be made accessible to one or more entities associated with the business.

Various entities may be configured to receive or retrieve flagged data produced by the adapter. One of the entities adapted for retrieving the flagged data is an agent such as that shown at block 118 of FIG. 1. As described above, the agent is adapted for monitoring the flagged data and generating a business exception (or notification) for various business events that are detected. In addition to merely detecting the existence of the event(s), the agent is preferably adapted for detecting one or more specific states of the flagged data. For instance, the agent is preferably adapted for detecting when one or more conditions are satisfied with respect to specific business events (or data associated with those events), as described above with reference to FIG. 1.

Figure 4:
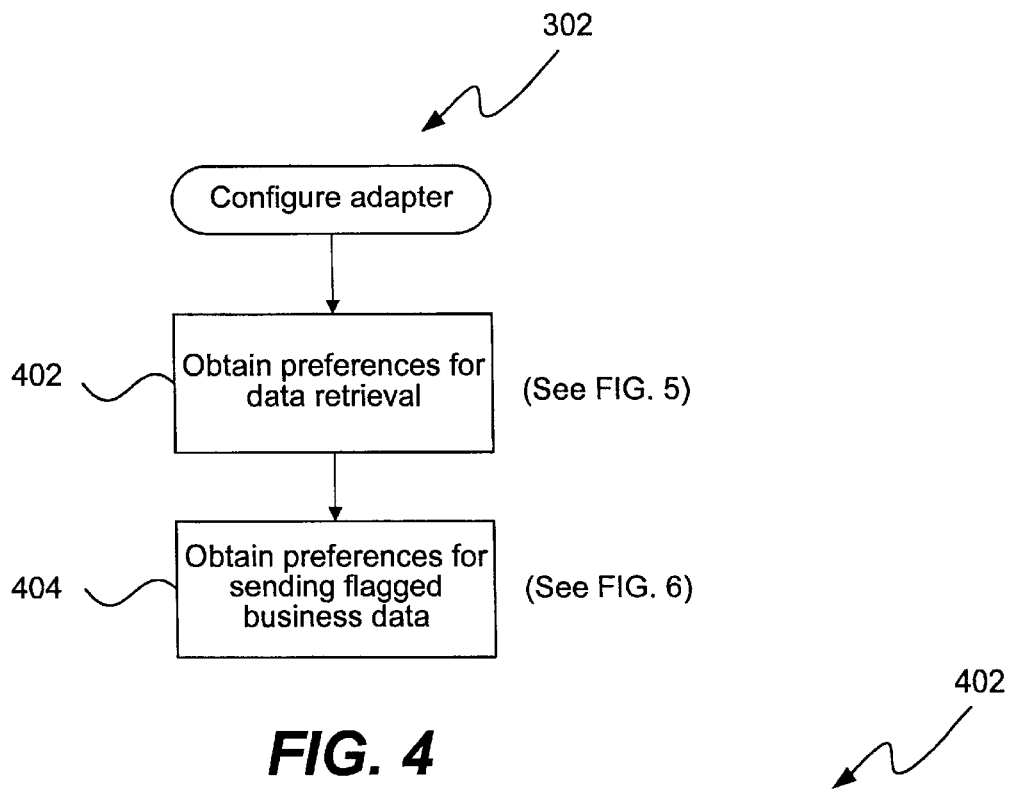
FIG. 4 is a process flow diagram illustrating one method of configuring an adapter as shown at block 302 of FIG. 3.

As described above, the adapter may be configured for the business or industry for which it is to be used. FIG. 4 is a diagram illustrating one method of configuring an adapter as shown at block 302 of FIG. 3. Configuration may include obtaining information including, but not limited to, retrieval preferences and sending preferences. As shown at block 402, retrieval preferences indicating one or more preferences for obtaining data for use by the business are obtained. One method of obtaining retrieval preferences will be described in further detail below with reference to FIG. 5. Similarly, sending preferences indicating one or more preferences for flagging the data to identify one or more business events of interest to the business are obtained at block 404. One method of obtaining sending preferences for marking and transmitting data identifying various business events will be described in further detail below with reference to FIG. 6.

Figure 5:
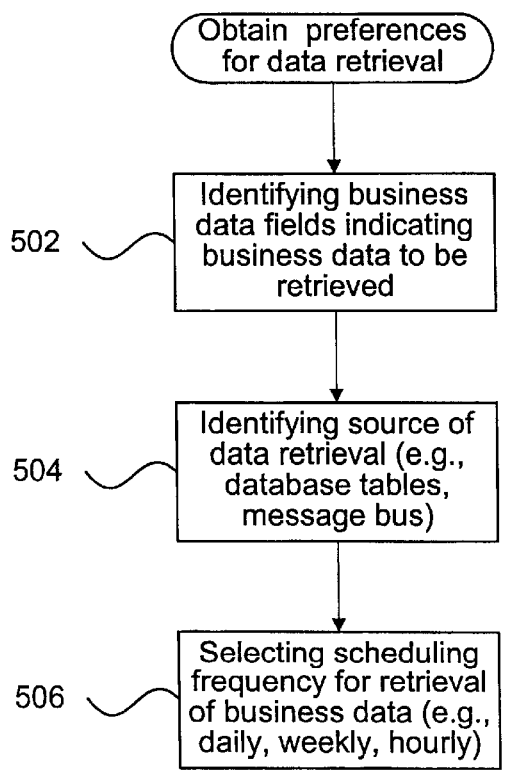
FIG. 5 is a process flow diagram illustrating one method of obtaining preferences for data retrieval as shown at block 402 of FIG. 4.

FIG. 5 is a diagram illustrating one method of obtaining preferences for data retrieval as shown at block 402 of FIG. 4. As described above, the retrieval preferences may indicate business preferences of the business providing the flagged data as well as customer preferences of a customer of the business. For example, the business may record preferences for each of its customers in order to ensure that each customer's needs are met. Thus, the customer preferences may indicate preferences of a business that is to receive at least a portion of the data or a business that is to receive products, services, or information from the business. As shown at block 502, the retrieval preferences may identify data fields indicating data to be retrieved. More particularly, it may be desirable to identify data values that fall within a particular range. For instance, it may be desirable only to monitor inventory levels that fall below customer order expectations. Thus, a data retrieval operator indicating the data to be retrieved for one or more of the indicated data fields may be provided. Various operators such as <, >, <=, >=, =, Like, Not Like, Between, Not Between, Begin With, Not Begin With, End With, Not End With, Contains, Not Contains, One of, and None Of may be used to indicate the data to be retrieved. In addition, one or more sources of data retrieval may be identified as shown at block 504. More particularly, the source of data retrieval may be one or more sources such as one or more message busses and/or one or more databases. In addition, a scheduling frequency for data retrieval may be selected as shown at block 506. For instance, it may be desirable to retrieve data hourly, daily, or weekly from various sources of data. In addition, it may also be desirable to retrieve data that falls within a particular range, such as within working hours (e.g., 9 to 5). Thus, data scheduling operators such as those set forth above may be used to specify the scheduling conditions for data retrieval. The scheduling frequency may be specified for the sources of data as a whole, or specifically for each individual source of data. For instance, it may be desirable to obtain data from the message bus more frequently than data from the databases, or specific databases. In this manner, the data to be retrieved, the source(s) of the data from which the data is to be retrieved, and the frequency with which the specified data is to be retrieved from the source(s) is configured.

Figure 6:
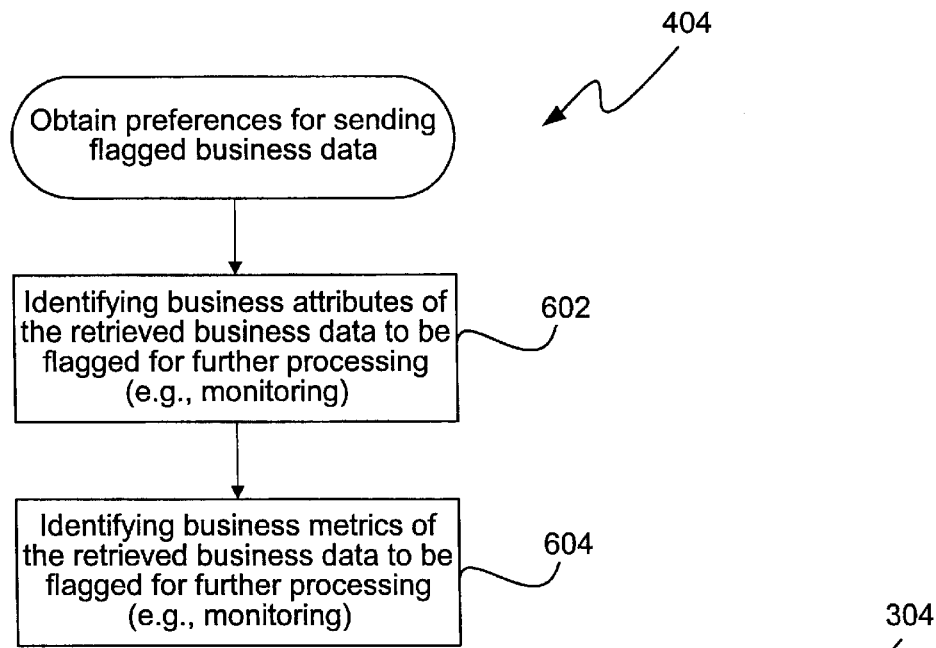
FIG. 6 is a process flow diagram illustrating one method of obtaining preferences for sending flagged data indicating pre-defined business events as shown at block 404 of FIG. 4.

Once the data is retrieved in accordance with the preferences for data retrieval, at least a portion of the data is flagged for transmission, thereby enabling other users or entities within the event detection and notification system to receive or otherwise obtain the flagged data. FIG. 6 is a diagram illustrating one method of obtaining preferences for sending flagged data as shown at block 404 of FIG. 4. As described above with reference to the retrieval preferences, the sending preferences may indicate business preferences of the business providing the flagged data as well as customer preferences of a customer of the business. For example, the business may record preferences for each of its customers in order to ensure that each customer's needs are met. Thus, the customer preferences may indicate preferences of a business that is to receive at least a portion of the data or a business that is to receive products, services, or information from the business. As shown, one or more business attributes of the retrieved data may be identified at block 602 to enable the business attributes to be flagged for further processing or monitoring. As described above, the business attributes together define a business event of interest to the business. In addition, as shown at block 604, one or more business metrics of the retrieved data may be flagged to indicate one or more numerical values to be monitored.

Figure 7:
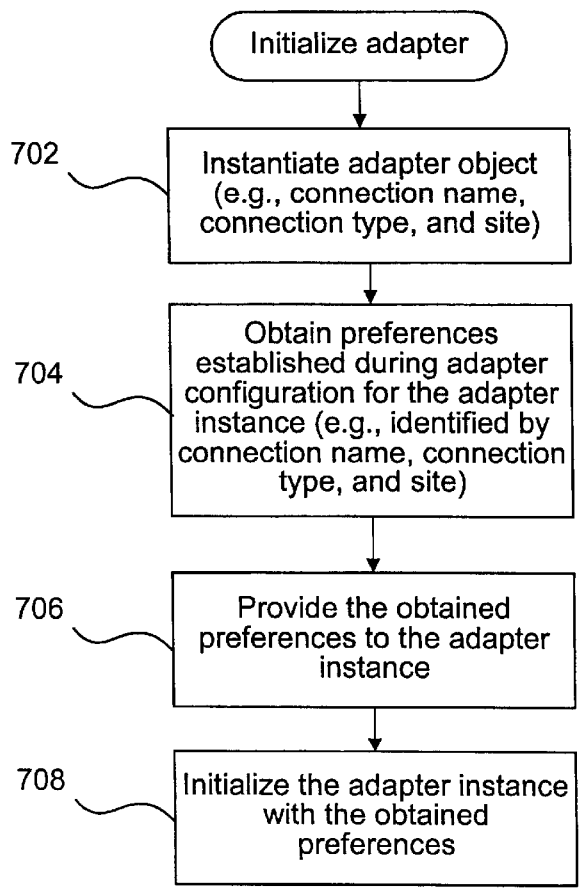
FIG. 7 is a process flow diagram illustrating one method of initializing an adapter as shown at block 304 of FIG. 3.

Once the adapter is configured as shown at block 302 of FIG. 3, the adapter may be initialized with the preferences obtained during configuration. FIG. 7 is a diagram illustrating one method of initializing an adapter as shown at block 304 of FIG. 3. As described above, multiple adapter instances may be instantiated for simultaneous execution. Thus, as shown at block 702, an adapter object is instantiated that preferably includes methods for obtaining data, flagging at least a portion of the data, and providing the flagged data for transmission. For example, an adapter may be instantiated for a particular connection name (e.g., Equipment), connection type (e.g., FabABC), and site (e.g., Company A). The preferences established during adapter configuration are then obtained for the adapter instance at block 704. The preferences obtained at block 704 are then provided to the adapter instance at block 706 to enable the adapter instance to be initialized with the obtained preferences at block 708. In this manner, an adapter instance may be initialized with retrieval preferences and sending preferences such as those described above with reference to FIG. 4 through FIG. 6. As described above, the retrieval preferences indicate the data to be obtained by the adapter object, while the sending preferences indicate data to be flagged and provided by the adapter object.

Figure 8:
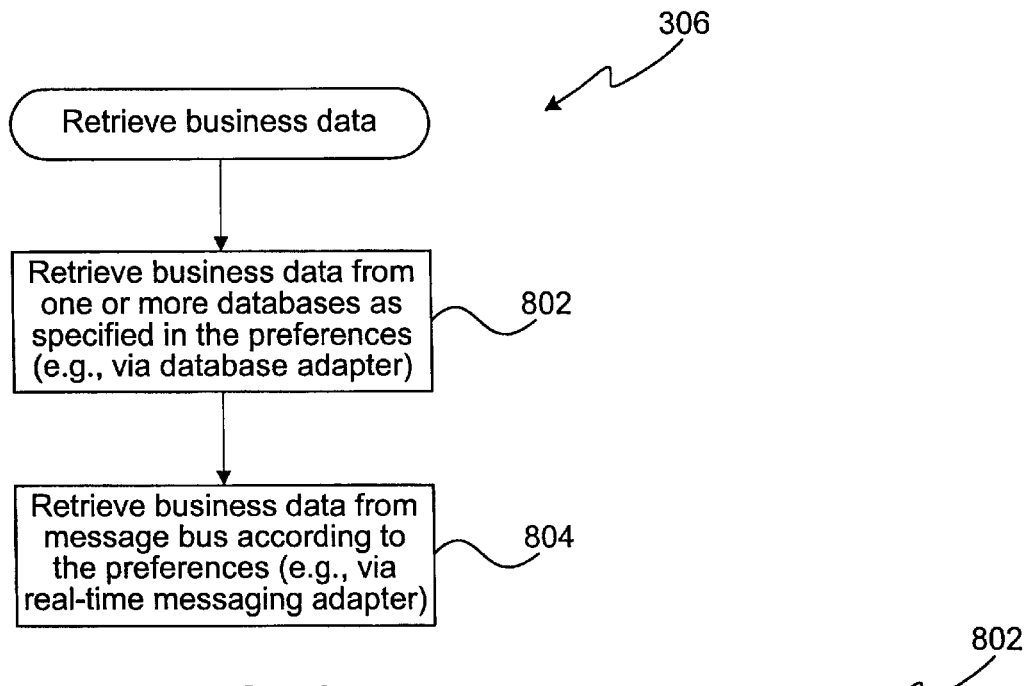
FIG. 8 is a process flow diagram illustrating one method of obtaining data as shown at block 306 of FIG. 3.

As described above with reference to block 306 of FIG. 3, data is retrieved in accordance with preferences obtained during configuration and used to initialize the adapter. FIG. 8 is a process flow diagram illustrating one method of obtaining data as shown at block 306 of FIG. 3. In one embodiment of the invention, two different adapters are used to retrieve data from databases and message buses, respectively. For instance, this may be accomplished through instantiating two different adapter objects. In this manner, two different adapters may be used to conform to different messaging schemes and protocols that may differ between the databases and message bus that are implemented. For instance, a rendezvous message bus available from Tibco Software, located at Palo Alto, Calif. may be used for communication between different system components such as the adapter, agent, exception server, and notification server, while each database may support different protocols. Thus, as shown at block 802, a database adapter retrieves data from one or more databases as specified in the preferences. In addition, a real-time messaging adapter retrieves data from one or more message buses having various message formats in accordance with the preferences as shown at block 804. Thus, through instantiating and initializing two different adapter objects, a database adapter and real-time messaging adapter may be implemented. More particularly, the database adapter object is initialized with the source specifying one or more databases, while the real-time messaging adapter object is initialized with the source specifying one or more message buses with various message formats.

Figure 9:
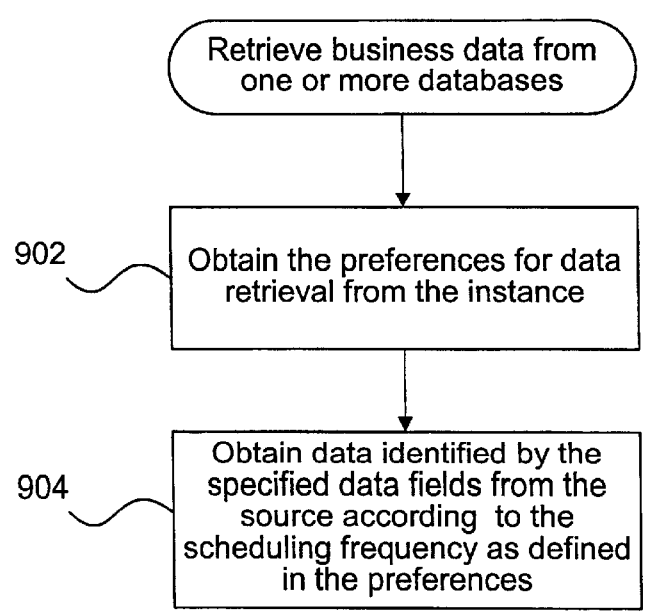
FIG. 9 is a process flow diagram illustrating one method of implementing a database adapter to retrieve data from one or more databases as shown at block 802 of FIG. 8.

The two different adapters are implemented similarly. FIG. 9 is a process flow diagram illustrating one method of implementing a database adapter to retrieve data from one or more databases as shown at block 802 of FIG. 8. First, the retrieval preferences for data retrieval may be retrieved from the instance at block 902. The retrieval preferences may indicate the data to be retrieved as well as one or more sources from which to obtain the data. Of course, the data to be retrieved from a particular source (e.g., database) may be all data from that source or only selected portions of the data from a particular source. More particularly, the database adapter is configured and initialized for retrieving data from one or more databases. In addition, the database adapter may be configured to obtain data repeatedly in accordance with a specified scheduling frequency. At block 904, the data indicated by the retrieval preferences of the database adapter are obtained from the specified sources (e.g., databases) according to the scheduling frequency as defined in the retrieval preferences. In this manner, data may be retrieved from one or more databases.

Figures 10, 11:
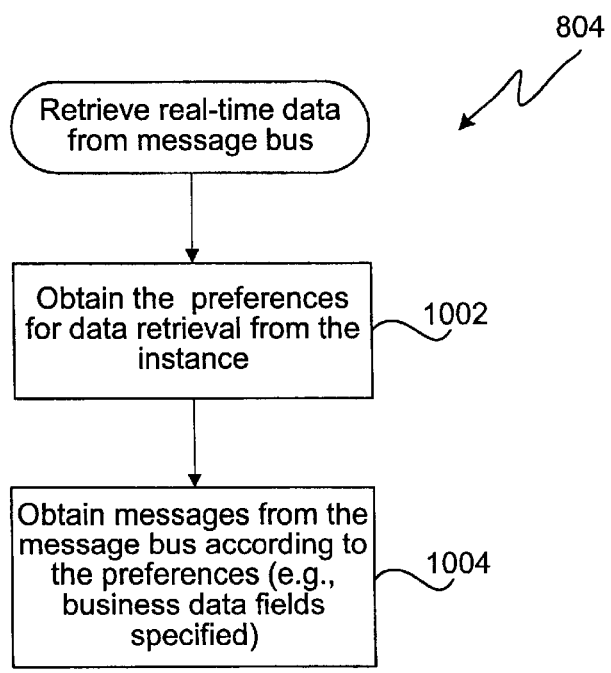
FIG. 10 is a process flow diagram illustrating one method of implementing a real-time adapter to retrieve data from one or more message buses as shown at block 804 of FIG. 8.
FIG. 11 is a diagram illustrating an exemplary data structure storing flagged data created at block 308 of FIG. 3, where the data structure identifies business attributes and business metrics such as those described with reference to FIG. 2.

A separate adapter is implemented for retrieving messages from the message bus. FIG. 10 is a process flow diagram illustrating one method of implementing a real-time adapter to retrieve data from one or more message buses as shown at block 804 of FIG. 8. First, the retrieval preferences for obtaining data may be retrieved from the instance at block 1002. The retrieval preferences may indicate the data to be retrieved as well as one or more sources from which to obtain the data. More particularly, the real-time messaging adapter is configured and initialized for retrieving data from one or more message buses having various message formats. At block 1004, the data indicated by the retrieval preferences of the real-time messaging adapter (e.g., corresponding to specified data fields) are obtained from the specified sources (e.g., message buses and message formats). Accordingly, the real-time messaging adapter retrieves data from the specified message buses.

As described above, in accordance with one embodiment of the invention, two different adapter objects are instantiated. However, it is contemplated that the database and real-time messaging adapters may be implemented separately without instantiating two different adapter objects. Moreover, the data retrieval functionality may be implemented as a single adapter rather than separately as two adapters. Thus, the above-described steps are merely illustrative and other methods of implementing the adapter are contemplated.

As described above with reference to block 308 of FIG. 3, at least a portion of the data obtained is flagged to identify one or more business events. FIG. 2 generally illustrates the use of one or more business attributes and/or one or more business metrics to identify a business event. FIG. 11 is a diagram illustrating an exemplary data structure that may be used to store data that is flagged or otherwise modified to identify business events. As shown, the data structure identifies business attributes 1102 and business metrics 1104 such as those described above with reference to FIG. 2. More particularly, each business attribute 1102 is identified (e.g., through the use of a number or index) as indicated by an attribute number 1106. Similarly, each business metric 1104 is identified through the use of a number or index). For instance, a business event (e.g., customer order) may be identified by the business attributes 1102 identifying the customer and order number. As shown, the business event (e.g., customer order) or associated business event (e.g., inventory level monitoring) may be further identified by the business metrics 1104 indicating inventory levels for each product ordered. Although the business attributes 1102 and business metrics 1104 are shown to be separate values here, the business attributes 1102 may also be business metrics 1104. In other words, those values tagged as business attributes 1102 may be used for subsequent value comparisons or monitoring. For instance, as shown, the customer field may be an attribute used to define the business event as well as be used for further event monitoring and/or value comparisons. Such a data structure is preferably implemented for each business event.

Although not illustrated in FIG. 11, the data structure may provide further information associated with the flagged data. For instance, a display sequence flag may be used to indicate a priority for each attribute and associated attribute value. In other words, the display sequence flag may be used by a business to indicate those attributes which are most important to it (or it's customers). More particularly, the display sequence flag may be used to prioritize information associated with multiple attributes that is provided in a notification message. This may be useful to select those attribute values to provide in a notification message where the display limits the amount of information that may be simultaneously displayed. For instance, this may be useful when a notification is sent to a pager having a limited display size.

Moreover, a timestamp flag may be used in various databases from which data is retrieved. The value of the timestamp flag may therefore be reflected in the data structure storing the flagged data. One use for a timestamp flag is to reflect the time that the data was stored or modified. In other words, when data is retrieved, the time stamp present in the database records may be used to ensure that the same data is not retrieved twice.

In addition, a primary key flag may be used to indicate one or more attributes from which values are to be used to form a key associated with the event. In this manner, a key may be generated that can be subsequently used to obtain data for the event. For example, the key may be a hash key stored in association with a hash value, described below. In this manner, a mechanism for creating a hash key may be provided in the flagged data.

Similarly, an interested field flag may be used to indicate one or more attributes from which values are to be obtained and stored in association with the event. For example, values associated with those attributes that have been flagged as interested fields may be used to generate a hash value for the event that may be accessed using the hash key, described above. In this manner, a single value for the event may be generated as a hash value for retrieval using a hash key.

Figure 12:
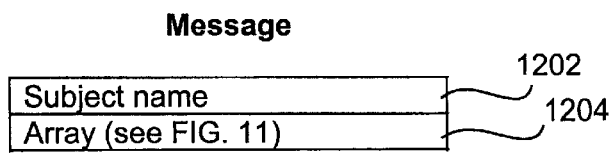
FIG. 12 is a block diagram illustrating an exemplary data structure that may be provided at block 310 of FIG. 3.

When the adapter provides the flagged data in a data structure such as that illustrated in FIG. 11, it preferably provides a message header and a message body. FIG. 12 is a block diagram illustrating an exemplary data structure that may be provided at block 310 of FIG. 3 for use in event monitoring. A header traditionally identifies a source and destination of the message. However, as shown, a subject may be provided as a message header 1202 to indicate one or more events for which data is provided in an associated message body 1204. The subject is preferably composed from the flagged data (e.g., the fields associated with the portion of the data that has been flagged). More particularly, the subject may be composed from business attributes and/or metrics that are flagged in the previously obtained data. For instance, the business attributes and/or metrics may be concatenated to form a single subject. The flagged data for one or more business events for that particular subject are then provided in the body 1204 of the message. The resulting message may then be sent via the message bus. An agent may then be able to select messages from the message bus according to the subject provided in the message header 1202.

As described above with reference to block 310 of FIG. 3, the flagged data identifying the business events is ultimately sent to the appropriate component(s) or transmitted on a message bus for retrieval by the appropriate component(s). However, there may be instances when data associated with an event may have already been sent. In this case, it may be preferable to send the data associated with the event only when the values have changed from the values previously received and/or transmitted for that event. Thus, it is useful to identify value changes associated with a particular event. In order to identify value changes of data associated with a particular event, it may be useful to store at least a portion of the data for that event to enable subsequent value comparisons. The data that is stored preferably includes the values for the flagged data fields. For instance, the data that is stored may include values associated with business attributes and/or values associated with business metrics for that event.

Figure 13:
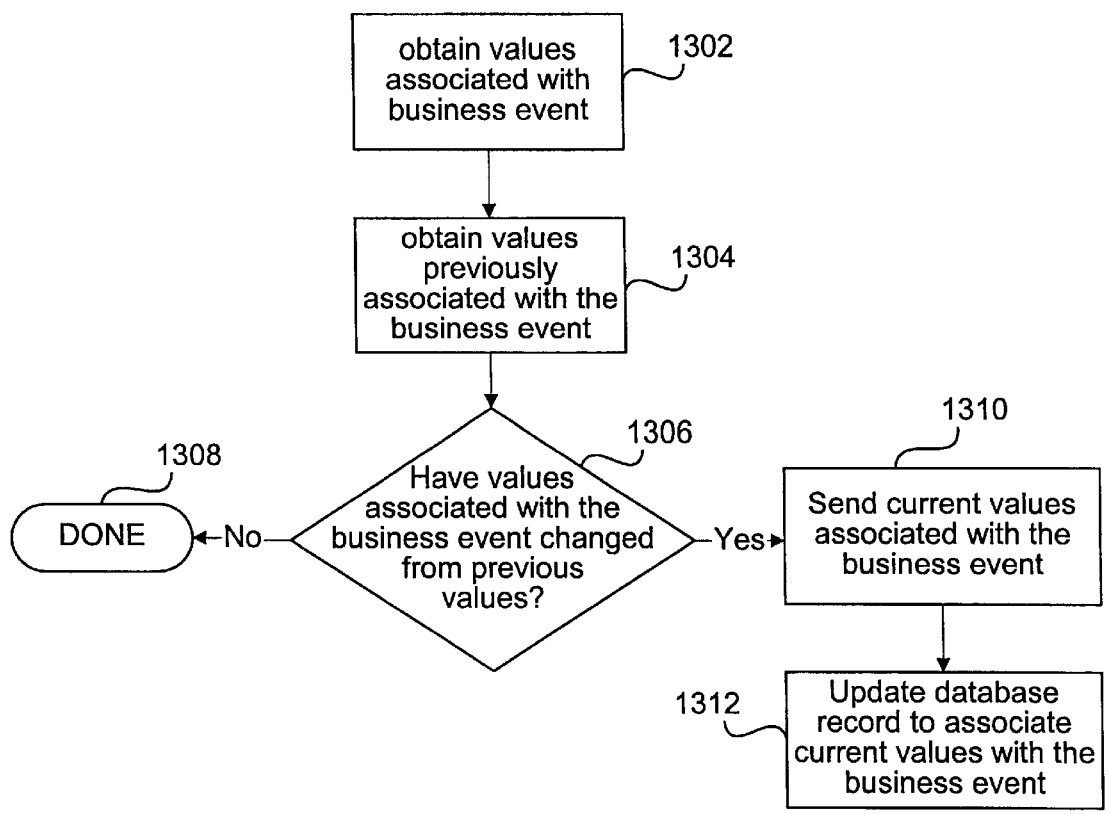
FIG. 13 is a process flow diagram illustrating one method of identifying values obtained at block 304 of FIG. 3 for a particular business event that have changed from values previously associated with the business event prior to sending flagged business data at block 310 of FIG. 3.

FIG. 13 is a process flow diagram illustrating one method of identifying values obtained at block 304 of FIG. 3 for a particular business event that have changed from values previously associated with the business event prior to sending the flagged data at block 310 of FIG. 3. As shown at block 1302, information indicating a first set of one or more values associated with a business event are obtained or received. In addition, information indicating a second set of one or more values previously associated with the business event are obtained (e.g., from a stored record) at block 1304. The information is then compared to enable the two sets of values to be compared. If it is determined that the values associated with the business event have not changed from values previously associated with that business event at block 1306, the process ends at block 1308. In other words, the values have not changed and therefore would not need to be re-transmitted. Thus, the values for that event may be removed from the flagged data prior to providing the flagged data (e.g., transmitting the flagged data). Moreover, the record storing data or otherwise identifying or indicating one or more values for that event need not be updated. However, if it is determined that one or more of the values associated with the event have changed, the current values associated with the business event are sent at block 1310 and the database record is updated accordingly at block 1312 to associate the current values with the business event. The values associated with the event and compared for value changes may include values associated with the flagged portion of the data, but may further include other values that have not been flagged. For instance, the values for a single event may include values associated with business attributes defining the event as well as values associated with business metrics identifying values that are significant to the business event, or values that are to be subsequently monitored. As described above, each of the values may have been obtained from a message bus or database.

One exemplary way to identify value changes associated with a business event is through the use of a hash table that maintains data for business events. A hash table is commonly used to provide fast access to objects either by name (e.g., string) or numerical key. A hash table is generally treated as an array with an index. Thus, the performance of the hash table used often depends on the algorithm used to convert a key into an index.

Figure 14:
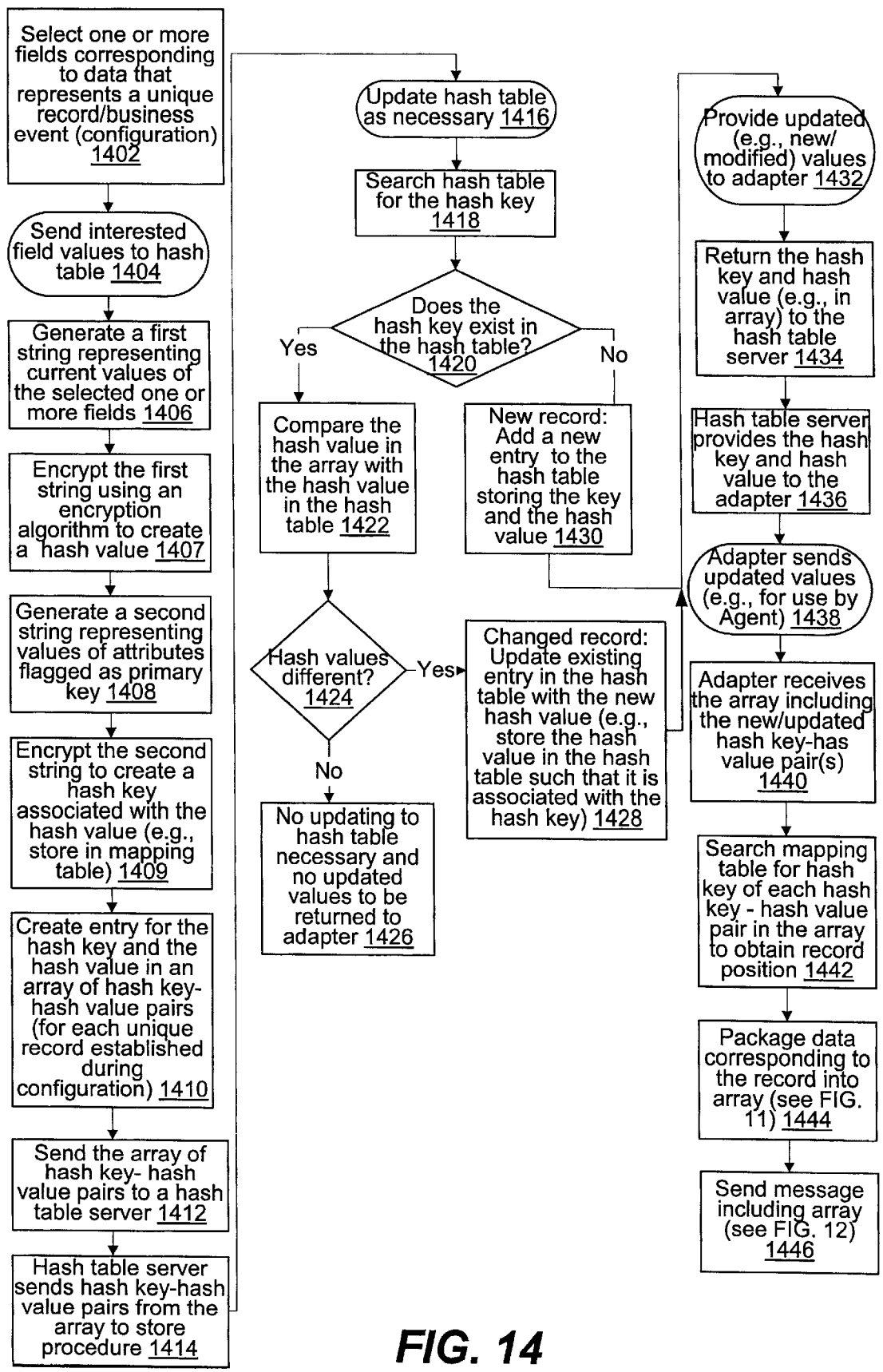
FIG. 14 is a process flow diagram illustrating a specific method of identifying modified values as shown in FIG. 13.

FIG. 14 is a process flow diagram illustrating a specific method of identifying modified values associated with a business event as shown in FIG. 13 through the use of a hash table. As described above with reference to block 302 of FIG. 3 and FIG. 4 through FIG. 6, when the adapter is configured, the data is flagged such that a business event is identified as shown at block 1402. For instance, one or more fields corresponding to a business event may be selected during configuration and subsequently flagged such that a unique record is represented. As shown at block 1404, the values associated with these fields are then sent to a hash table to enable information indicating these values to be stored, as will be described as follows with reference to blocks 1406–1414. More particularly, a first string representing current values of one or more of the selected fields is generated at block 1406. For example, a string may be generated from values for selected interested fields of those fields that represent a unique event, as described above with reference to FIG. 11. More particularly, interested fields may be a subset of all fields (e.g., attributes) that define an event. The first string is then encrypted using an encryption algorithm to create a hash value at block 1407. A hash key is then generated. More particularly, a second string representing values of attributes previously flagged as "primary key" as described above with reference to FIG. 11 may be generated at block 1408. The second string is then encrypted to create a hash key associated with the hash value at block 1409. In this manner, various attribute values (e.g., primary key values) may be used to create a hash key. The hash key may then be stored in a mapping table. An exemplary hash table and an exemplary mapping table will be described in further detail below with reference to FIG. 15 and FIG. 16, respectively. An entry is then created in an array of hash key-hash value pairs and the hash key and the hash value are stored in this entry at block 1410. The array of hash key-hash value pairs is then sent to a hash table server at block 1412. The hash table server then sends each hash key-hash value pair from the array to a store procedure at block 1414. In this manner, information indicating the value combination for each business event is sent to the hash table.

As shown at block 1416, the hash table is then updated as necessary to reflect the most recent information it has received for each business event. The updating process is described with reference to blocks 1418–1430. For instance, the hash table is searched at block 1418 for the first hash key. If at block 1420 it is determined that the hash key exists in the hash table, the hash value for that entry in the hash table is compared to the value received from the array at block 1422. If it is determined at block 1424 that the hash values are not different, the hash table need not be updated and there are no updated values to be returned to the adapter, as shown at block 1426. However, if it is determined at block 1424 that the hash values are different, the existing entry in the hash table is updated at block 1428 with the new hash value. In other words, the hash value is stored in the hash table such that it is associated with the hash key. If it is determined at block 1420 that the hash key does not exist in the hash table, a new record is created by adding a new entry to the hash table storing the key and the hash value at block 1430.

In addition to updating the hash table that tracks the most recent value combinations for any given business event, the updated values (e.g., new event or modified values) are also provided to the adapter for transmission to the appropriate entity. Moreover, even when the event is not a new event for which data is being transmitted and the values associated with the event have not been modified, it may be desirable to send the flagged data for that event. In other words, it may be preferable to re-transmit identical data for a particular event rather than filtering that data.

As shown at block 1432, the updated values for the event (e.g., new or modified values) are provided to the adapter for transmission. Thus, as shown at block 1434, the hash key and the hash value (e.g., from the array storing the hash key-hash value pairs) are returned to a hash table server. For example, an array of hash key-hash value pairs may be returned to the hash table server. The hash table server then provides the hash key and the hash value (e.g., array of hash key-hash value pairs) to the adapter 1436 for subsequent transmission.

Once the adapter receives the updated values, the adapter sends the updated values as shown at block 1438 (e.g., for use by an agent). For instance, the adapter may receive an array including new and/or updated hash key-hash value pair(s) at block 1440. A mapping table such as that illustrated in FIG. 16 may then be searched at block 1442 for a hash key for each hash key-hash value pair in the array to obtain a pointer or record position for that data record. The flagged data in that data record is then packaged for transmission at block 1444. For instance, the flagged data may be packaged into an array such as that illustrated in FIG. 11. A message including the array such as that shown in FIG. 12 is then sent at block 1446.

Figures 15, 16, 17:
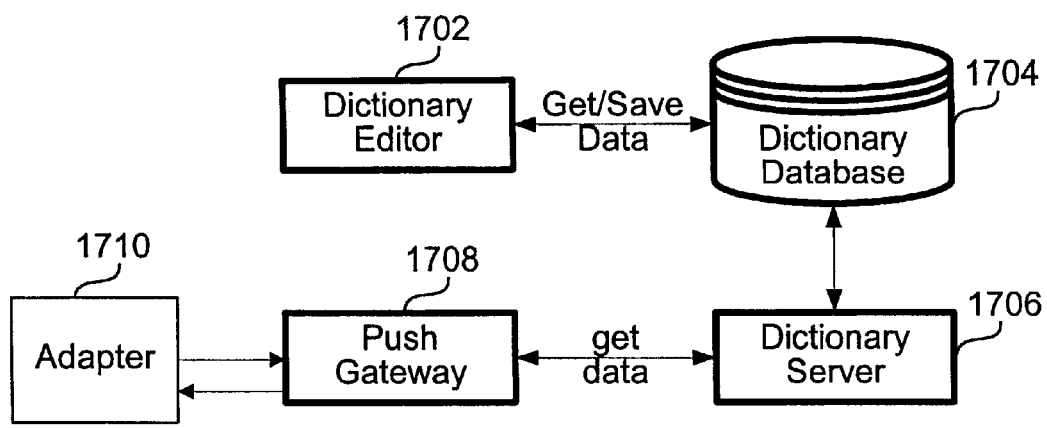
FIG. 15 is a diagram illustrating an exemplary hash array that is packaged and sent to a hash table server as shown at blocks 1434 of FIG. 14.
FIG. 16 is a diagram illustrating an exemplary mapping table that is searched at block 1442 of FIG. 14 to identify a record associated with a hash key.
FIG. 17 is a diagram illustrating an exemplary configuration that may be used to define preferences for data retrieval, flagging, and transmission such as those described with reference to FIG. 4 through FIG. 6.

FIG. 15 is a diagram illustrating an exemplary hash array that is packaged and sent to a hash table server as shown at block 1434 of FIG. 14. As shown, a hash key 1502 and hash value 1504 of each hash key-hash value pair is provided in the array. In this manner, the appropriate hash key-hash value pairs may be provided to the adapter.

Once the value changes for a previous event or values for a new event have been detected, the actual values rather than the "composite" values (e.g., strings) will be transmitted by the adapter. Thus, the data record for the event is preferably obtained to retrieve these values. FIG. 16 is a diagram illustrating an exemplary mapping table that is searched at block 1442 of FIG. 14 to identify a record associated with a hash key. More particularly, as shown, a hash key 1602 is associated with a record position 1604 or pointer associated with a particular data record. In this manner, the actual data record associated with the hash key may easily be obtained.

FIG. 17 is a diagram illustrating an exemplary configuration that may be used to define preferences for data retrieval, flagging, and transmission such as those described above with reference to FIG. 4 through FIG. 6. More particularly, preferences ultimately stored in a database as shown at block 114 of FIG. 1 may be established through a dictionary editor 1702 that enables retrieval and sending preferences to be established via a graphical user interface. More particularly, the dictionary editor 1702 enables retrieval and sending preferences to be defined and stored in a dictionary database 1704. For instance, the dictionary editor 1702 enables a business to define various events, business attributes and business metrics that are suitable for its particular business and/or industry. A dictionary server 1706 enables preferences stored in the dictionary database to be obtained by the adapter via a push gateway 1708. More particularly, as described above with reference to block 704 of FIG. 7, preferences established during adapter configuration for an adapter instance 1710 are obtained and provided to the adapter instance 1710. This may be accomplished by sending information identifying the adapter instance 1710 to the push gateway 1708. The push gateway 1708 then obtains the preferences established during adapter configuration from the dictionary database 1704 via the dictionary server 1706. The push gateway 1708 then sends the preferences to the adapter instance 1710.

Various algorithms may be used to adjust memory usage when retrieving data from one or more source databases such as at block 306 of FIG. 3 described above. For instance, a maximum number of records to be retrieved may be established by a business using the adapter. In addition, a delay may be inserted between the processing and publishing of each message by the adapter. In this manner, memory usage may be minimized while preventing the loss of messages due to fast publication rate.

Figure 18:
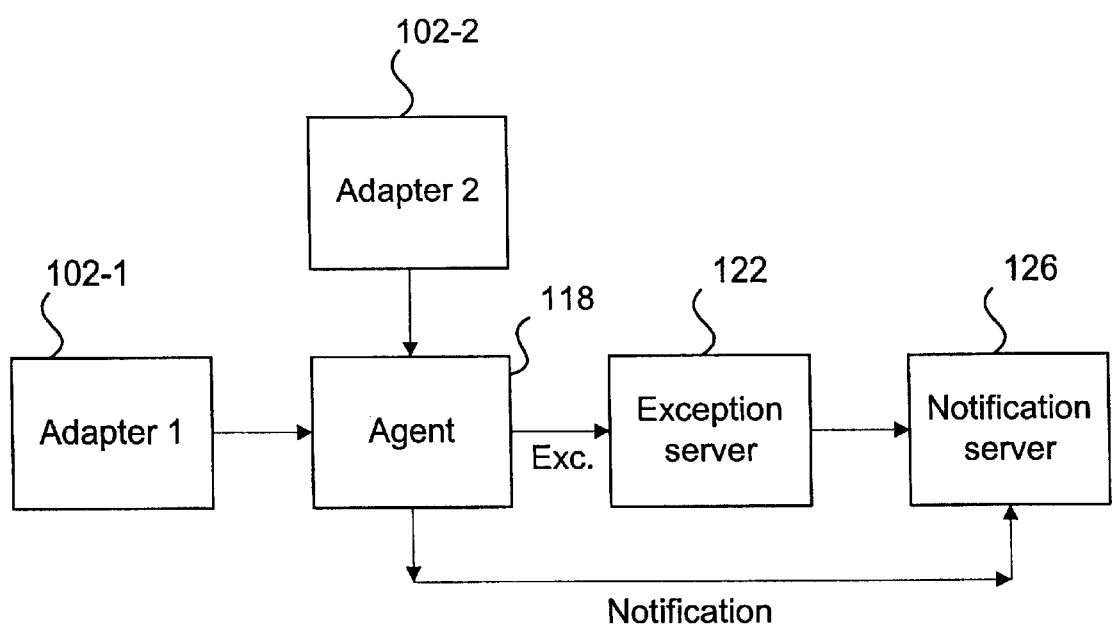
FIG. 18 is a diagram illustrating possible interactions between an agent and one or more adapters to generate a notification or exception message in accordance with one embodiment of the invention.

FIG. 18 is a diagram illustrating possible interactions between an agent and one or more adapters to generate a notification or exception message in accordance with one embodiment of the invention. Although the adapter(s) and agent preferably communicate via a message bus, FIG. 18 represents the transfer of data among the components (e.g., via message bus or directly between the components). As described above with reference to FIG. 1, the modified data identifying one or more business events are obtained or intercepted by an agent 118. For instance, data that is published by one or more adapters 102-1, 102-2 on a message bus may be received by one or more agents 118 listening for events or specific events. More particularly, the agent 118 is adapted for detecting the events or monitoring the events such that an exception (or notification) is generated when appropriate. As shown in FIG. 1, a separate exception server 122 and notification server 126 may be provided to manage exceptions and notifications generated by one or more agents 118.

Figure 19:
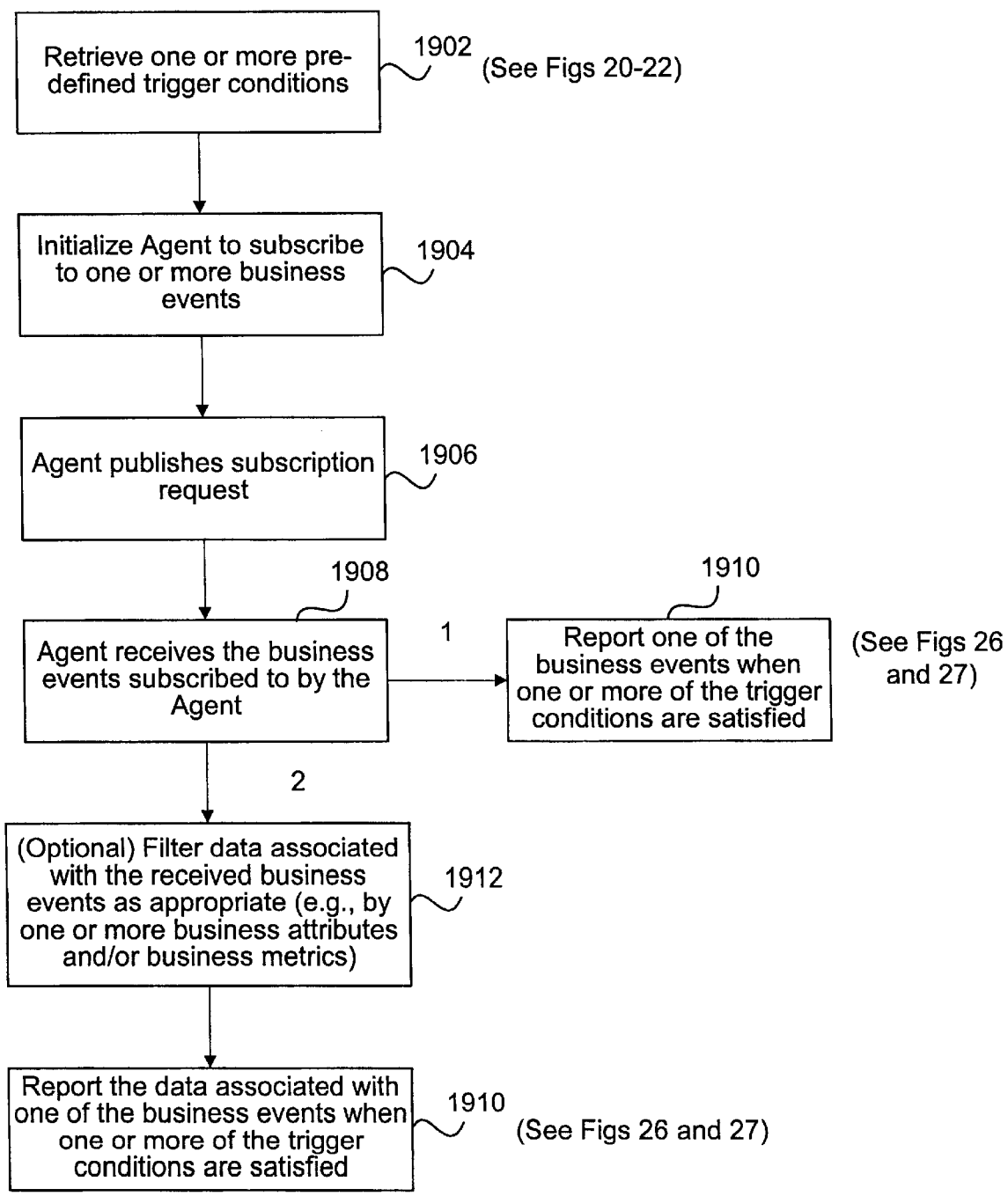
FIG. 19 is a process flow diagram illustrating a method of reporting the satisfaction of one or more trigger conditions in accordance with one embodiment of the invention.

Once the adapter is configured to modify data to identify various events (or otherwise associate events with data), the data that is output by the adapter may be monitored for detection of selected events. Similarly, the data may be monitored for detection of states or trigger conditions that are satisfied with respect to the associated events. FIG. 19 is a process flow diagram illustrating a method of reporting the satisfaction of one or more trigger conditions in accordance with one embodiment of the invention. Although the agent may simply report the detection of various events, there may be further monitoring in association with these events. Thus, in accordance with one embodiment of the invention, the agent is configurable such that the agent monitors in accordance with a set of pre-defined trigger conditions. More particularly, in order to monitor data received by the agent from one or more adapters, the agent obtains a set of conditions that are to be satisfied with respect to various events prior to reporting the events, the satisfaction of the condition(s), or other pertinent information or data. Thus, at block 1902, the agent retrieves a set of one or more pre-defined trigger conditions at block 1902. For example, the conditions may be retrieved from a storage medium that is common to one or more agents. An exemplary graphical user interface that may be used to enter a trigger condition will be described in further detail below with reference to FIGS. 20–25. The agent is further initialized at block 1904 to subscribe to one or more events. The agent then publishes a subscription request at block 1906 to subscribe to selected events. In other words, the agent listens for specific events and therefore may receive a subset of the data produced by the adapter. In this manner, the agent may receive only the data associated with events subscribed to by the agent, as shown at block 1908. As the agent receives data output by one or more adapters, the agent generates a message in accordance with selected events. More particularly, as shown at block 1910, the agent reports an event when one or more of the trigger conditions (e.g., received at block 1902) are satisfied. Exemplary trigger conditions and the associated monitoring process will be described in further detail below with reference to FIG. 26 and FIG. 27.

As described above, the agent subscribes to specific events, and therefore limits the events for which it receives data. However, the agent may wish to further limit the data that it processes. More particularly, it may be desirable to filter the data associated with the received events at block 1912. As one example, the agent may only wish to receive specific attributes or metrics associated with an event rather than all data associated with that event. As another example, the agent may only wish to receive the flagged attributes and/or metrics associated with a particular event. Once the data is filtered, the agent may report one of the events when one or more of the trigger conditions are satisfied, as described above with reference to block 1910. Reporting the event may include a variety of messaging schemes, including the generation of a notification or exception message.

Figure 20:
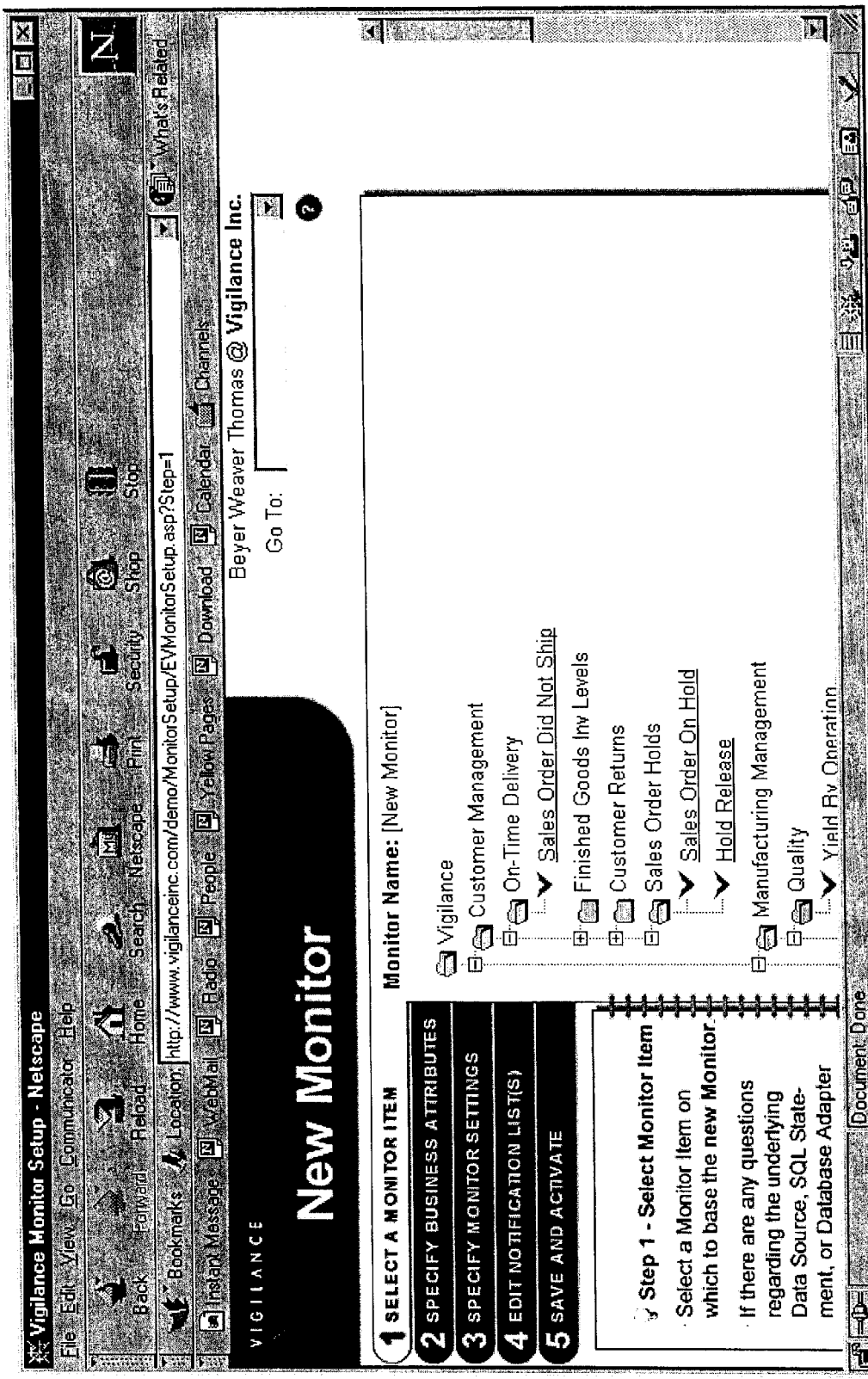
FIG. 20 is an exemplary graphical user interface that may be used to initiate the configuration of monitoring conditions through the selection of trigger conditions and associated attribute values in accordance with one embodiment of the invention.
Figure 21:
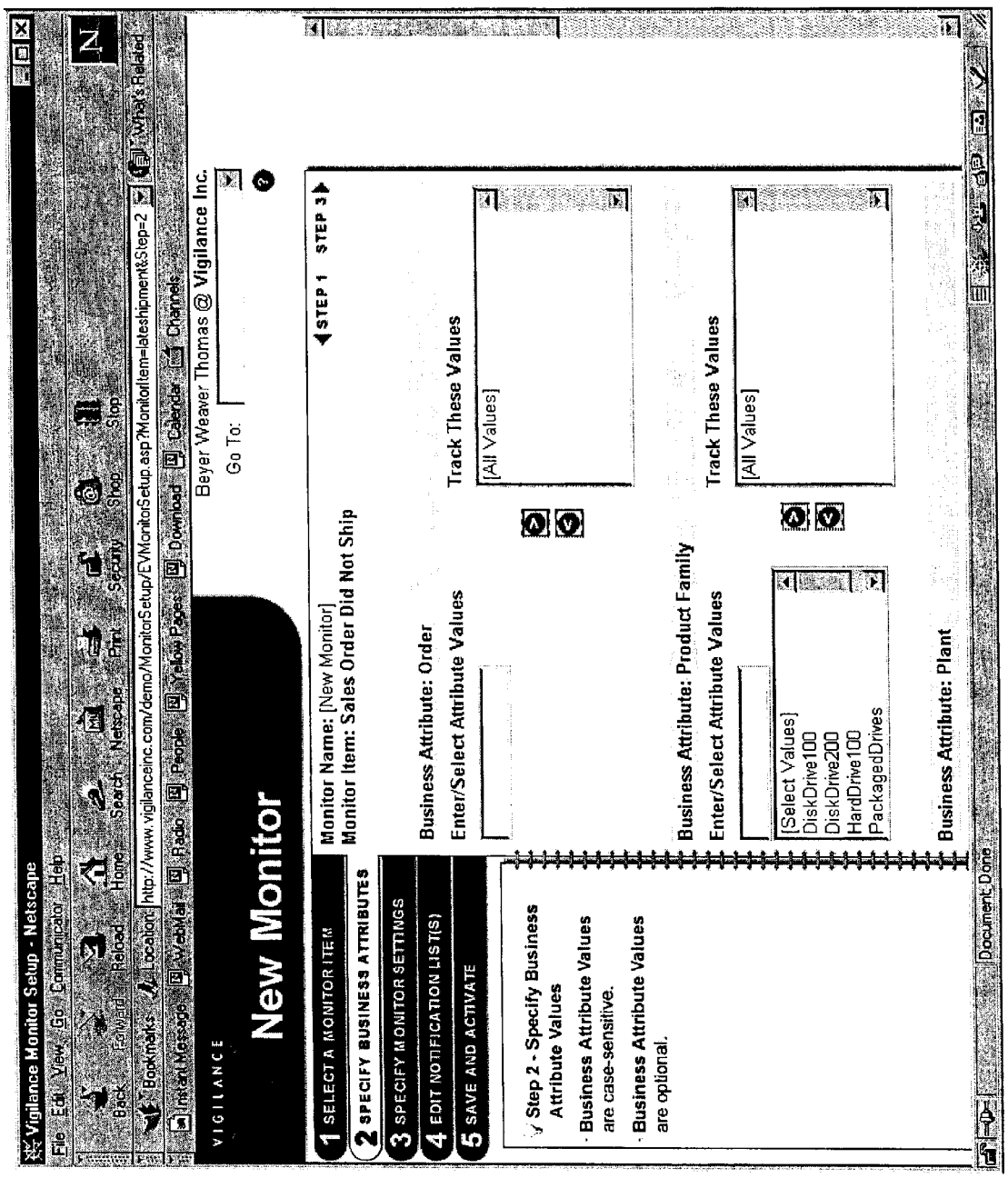
FIG. 21 is an exemplary graphical user interface that may be used to select one or more attributes for which values are to be monitored via selected trigger conditions.
Figure 22:
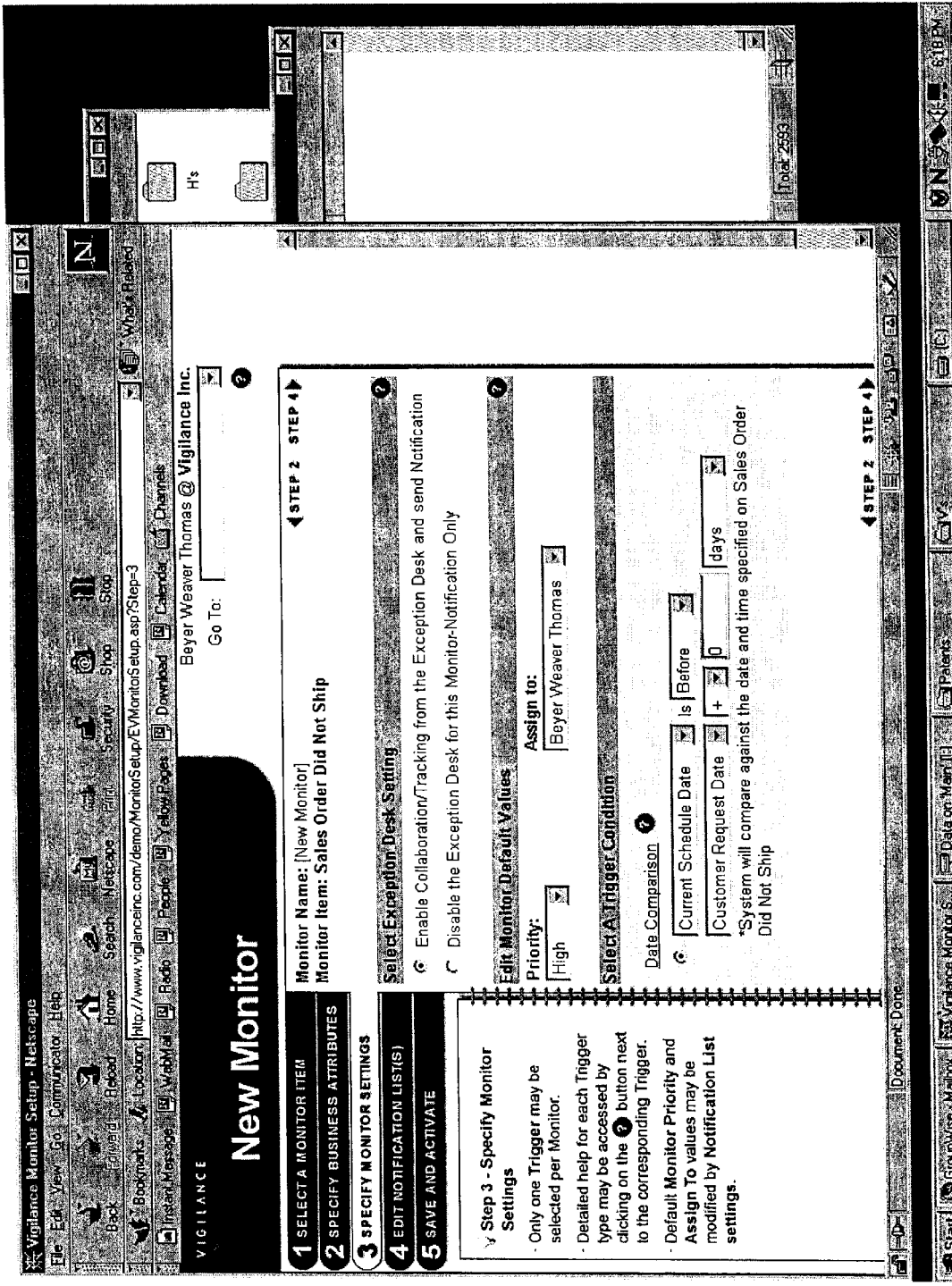
FIG. 22 is an exemplary graphical user interface that may be used to select a trigger condition in accordance with one embodiment of the invention.

FIGS. 20–22 together illustrate an exemplary graphical user interface via which a trigger condition may be entered. A trigger condition may be defined independent from the events being monitored. For example, the trigger conditions may be defined separately from the attributes or metrics associated with the monitored events. In other words, the trigger conditions may be defined separately from those metrics being evaluated by the trigger conditions. Alternatively, a trigger condition may be defined such that the condition is associated with one or more specific events (e.g., via specifying one or more event attributes or metrics to be evaluated by the condition). Once the trigger condition(s) are entered, they may be stored for retrieval by one or more agents.

FIG. 20 is an exemplary graphical user interface that may be used to initiate the configuration of monitoring conditions through the selection of trigger conditions and associated attribute values to be monitored in accordance with one embodiment of the invention. In accordance with one embodiment of the invention, a monitor object is instantiated for each condition and associated attributes (or metrics) for which values are to be monitored. Each monitor object may be thought of as a mechanism for identifying attributes to be extracted (e.g., from a database or message bus). Alternatively, the monitor may be considered to be a mechanism for filtering data already obtained (e.g., from the adapter). An exemplary monitor object will be described in further detail below with reference to FIG. 28. In this manner, a user may specify that the condition is to be satisfied with respect to selected attributes or metrics. In addition, such attributes (or metrics) may be selected or entered to indicate values which are to trigger the sending of a notification or exception message (e.g., with respect to various addressees). As shown in FIG. 20, by clicking on the appropriate hypertext link, a monitor item may be selected. For example, monitoring may be initiated with respect to "On-Time Delivery" by clicking on the corresponding hypertext link. Through selecting the monitor item according to item name (e.g., event name), a condition, business attributes, and notification/exception preferences may be specified and associated with the specified monitor item. In this manner, a plurality of monitor settings may be established, and therefore may be easily modified or deleted, as appropriate. If an appropriate monitor item name does not exist, a new monitor item may be entered. For example, it may be desirable to monitor "Late Deliveries," and therefore a suitable monitor item may be created. In this manner, one or more events may be specified for which monitoring is to be performed. For example, through examining the subject of each message received by the agent, the specified events may be identified and the associated flagged data may be retrieved for further processing.

FIG. 21 is an exemplary graphical user interface that may be used to select one or more attributes for which values are to be monitored (e.g., via selected trigger conditions). In other words, a user may wish to specify specific attributes for which values are to be monitored in association with a particular event. In this manner, an exception or notification message may be generated for particular instances of an exception. As shown, one or more business attributes may be selected. In addition, specific values associated with those business attributes may be selected for further monitoring. In other words, a set of flagged data may be monitored for a set of one or more specific events, as well as specific attributes or metrics (and specific values of these attributes/metrics). In this manner, the appropriate flagged data may be monitored or obtained as well as filtered. Thus, once the data indicating the specified events, attributes and metrics is obtained, it may then be determined whether one or more conditions are satisfied with respect to the specified events, as well as with respect to specified attributes, metrics and associated values. In addition, these attribute/metric values may be used to indicate that an exception/notification message is to be sent for specific instances of an exception rather than for all instances of an exception.

FIG. 22 is an exemplary graphical user interface that may be used to select a trigger condition in accordance with one embodiment of the invention. Through this interface, collaboration may be enabled through an exception desk setting that enables exceptions that are generated to be viewed, accessed, and modified by multiple parties. For example, as shown, by clicking on the hypertext link corresponding to the "Select Exception Desk Setting," collaboration and tracking from an exception desk may be enabled or disabled. More particularly, exceptions present on the exception desk may be viewed, accessed and/or modified by those parties having security access to the exceptions (or various portions of the generated exceptions). In addition, a priority may be assigned to the notification or exception to indicate an order in which the notification(s) and/or exception(s) are to be processed. Moreover, a corresponding exception may be assigned to a party (e.g., Beyer, Weaver & Thomas) for subsequent resolution. In this manner, collaboration among one or more parties may be enabled to resolve a situation (e.g., event) in accordance with specified priorities.

One or more trigger conditions may be obtained as shown, which are to be satisfied prior to the sending of a notification or exception. In addition, a condition may have an associated condition type. More particularly, the condition type may be selected separately from the condition, thereby enabling a condition to be defined such that the condition type is associated with one or more events (or event attributes) for which the condition is to be satisfied. Several exemplary trigger condition types will be described in further detail below with reference to FIG. 26. One exemplary condition type is event attribute comparison. In this example, date comparison is used as one instance of event attribute comparison to compare specified attributes (e.g., current schedule date and customer request date) in accordance with the specified condition. Thus, one or more event attributes associated with one or more events may be selected. In this manner, a condition may be associated with a specific event (e.g., sales order did not ship) as well as one or more event attributes (e.g., current schedule date and customer request date). The condition type (and condition) may be newly created or selected from a set of stored condition types (and conditions).

Figure 23:
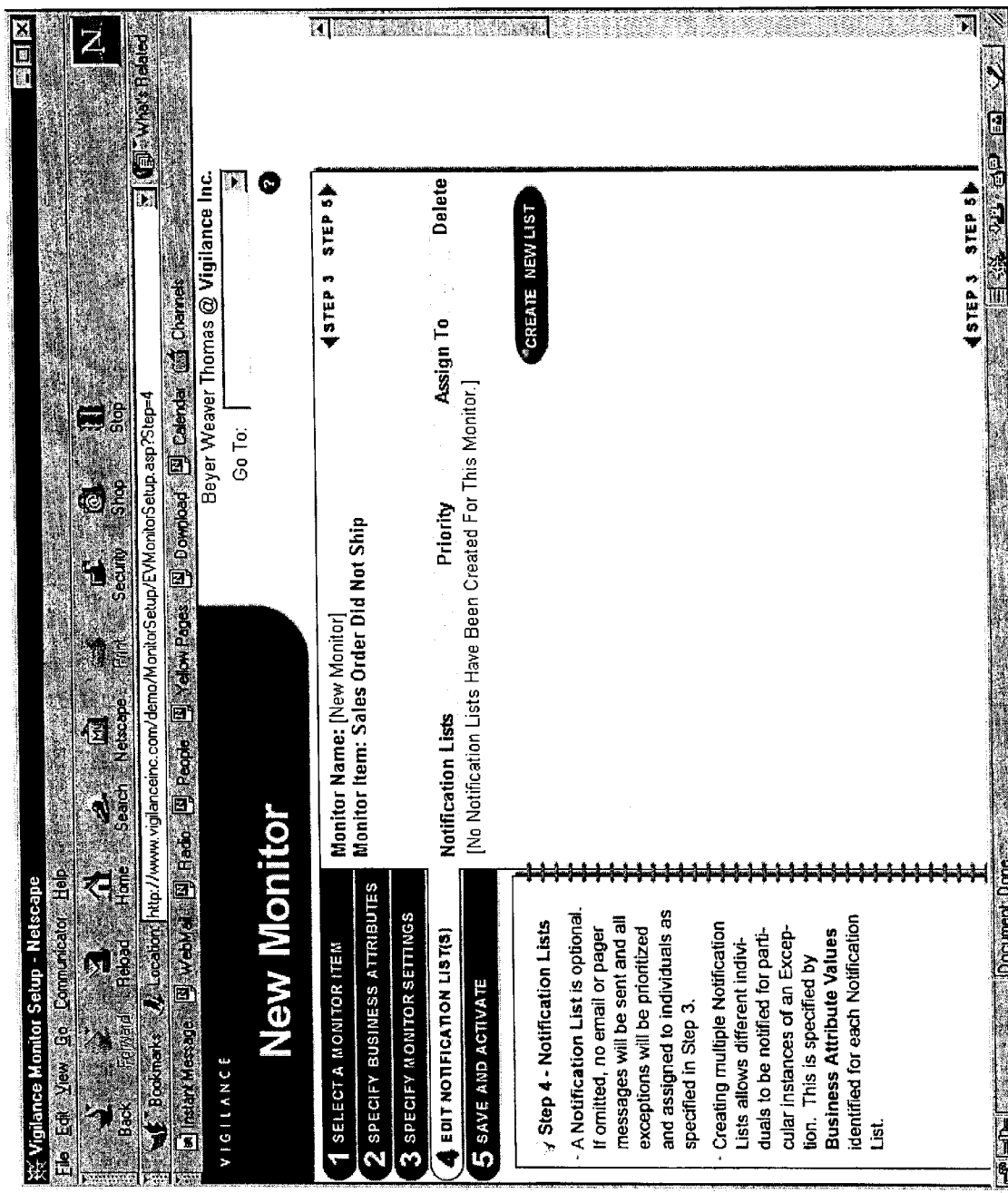
FIG. 23 is an exemplary graphical user interface that may be used to view and edit a notification list from multiple notification lists that establish the identities of individuals who are to receive notification messages as well as the manner in which notification messages are sent in accordance with one embodiment of the invention.

In addition to specifying a condition that must be satisfied prior to sending a notification or exception, a set of notification preferences may be obtained that indicate the manner in which a notification message is to be transmitted. FIG. 23 is an exemplary graphical user interface that may be used to view and edit a notification list that establishes the identities of individuals who are to receive notification messages as well as the manner in which notification messages are sent in accordance with one embodiment of the invention. Once a notification list is selected (e.g., from a plurality of notification lists) or created, the notification list may be edited.

FIGS. 24A through 24F together illustrate an exemplary graphical user interface that may be used to edit a notification list selected from notification lists such as those illustrated in FIG. 23 to establish the identities of individuals who are to receive notification messages as well as the manner in which notification messages are sent in accordance with one embodiment of the invention. Through this graphical user interface, a set of notification preferences may be obtained from a user. The set of notification preferences may then be associated with one or more events, one or more conditions, or a set of one or more individuals. More particularly, the set of notification preferences is preferably associated with the monitor item to enable a notification message to be sent in accordance with the set of notification preferences when it is determined that the associated condition(s) are satisfied with respect to one or more events.

Figure 24A:
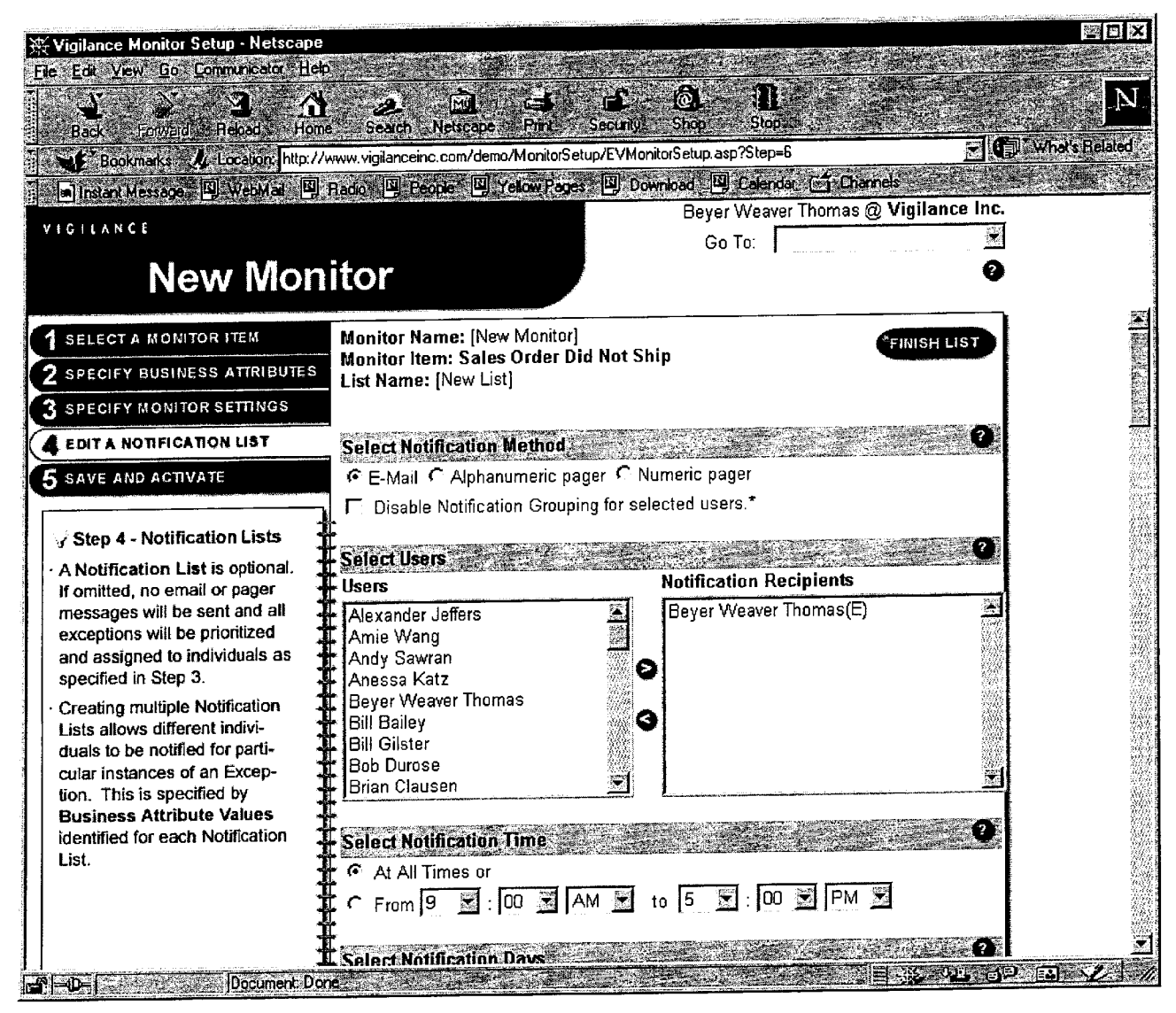

The set of notification preferences may indicate a communication medium via which a notification message is to be sent. As shown in FIG. 24A, a user may select a "notification method" (i.e., communication medium) via which the notification message is to be sent. For example, as shown, the communication medium may be at least one of electronic mail, alphanumeric pager, numeric pager, or voice mail. Thus, the notification message may be sent via one or more selected communication mediums. In addition, notification grouping may be disabled (or enabled) for selected users, thereby enabling the users to receive (or not receive) notifications addressed to a particular group that is associated with the users.

The set of notification preferences also preferably indicate one or more individuals to whom the notification message is to be sent. As shown, a list of users may be presented to enable one or more users to be selected as "notification recipients" for notification messages sent in association with the specified monitor. In this example, the notification recipient is "Beyer Weaver Thomas." Since the notification recipient for this particular example is a group, all members of this group will be notified (unless notification grouping is disabled for specific members of the group).

As shown in FIG. 24A, the set of notification preferences may also indicate a notification timing preference. For instance, the notification timing preference may indicate one or more times or time ranges during which a notification message is to be sent in association with the notification list and the specified monitor. In this example, the notification timing preference indicates that a notification message sent in association with the monitor can be sent at any time. However, a specific time or time range may be specified as desired.

Figure 24B:
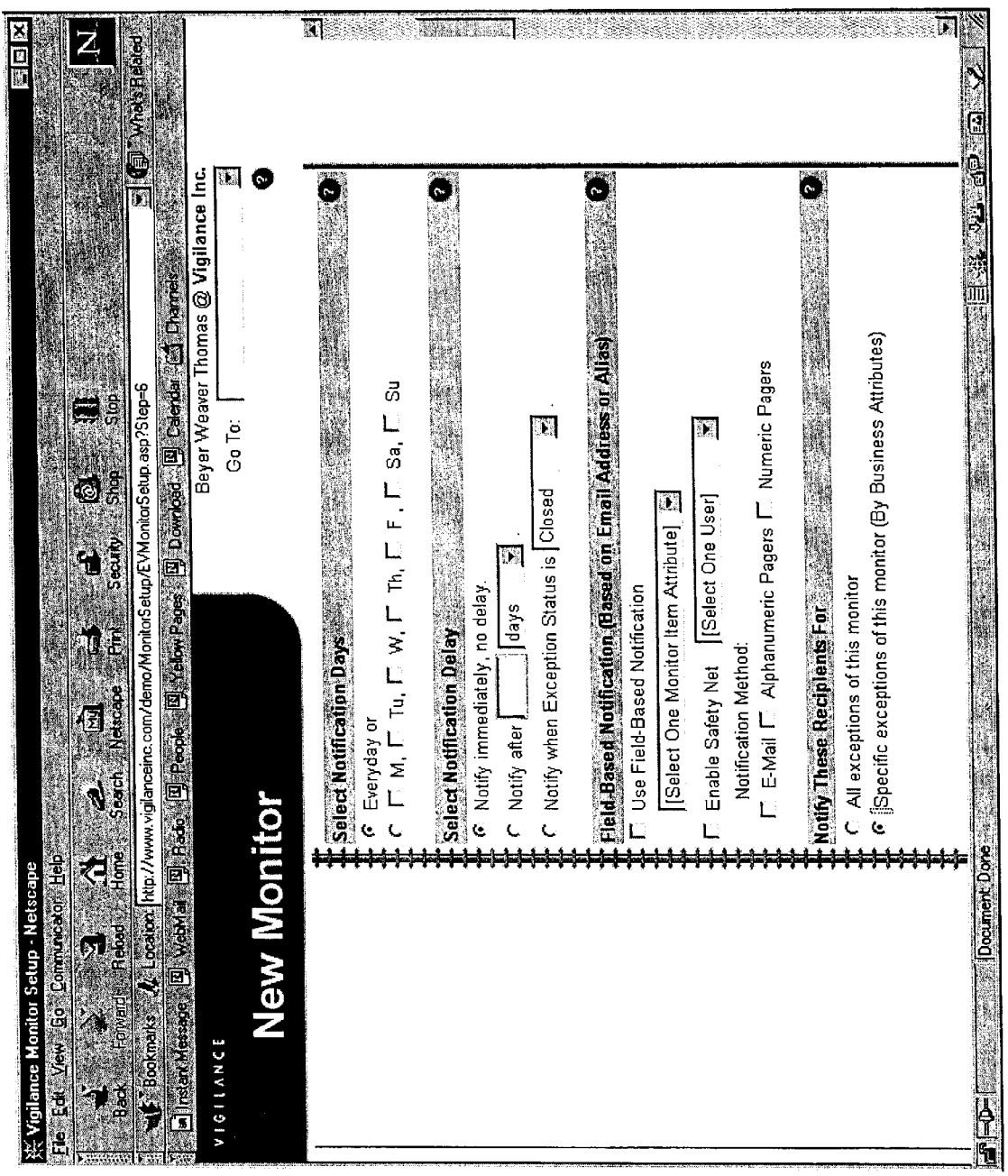

Similarly, as shown in FIG. 24B, the notification timing preference may also indicate a specific day or multiple days during which a notification message is to be sent when a condition is satisfied with respect to the specified monitor. In addition to days and times, the notification timing preference may indicate that a notification message is to be sent after a specified delay or, alternatively, may indicate that a notification message is to be sent immediately (with no delay) upon detection of satisfaction of a condition with respect to one or more events.

In addition to sending a notification based upon the existence or creation of an exception, a notification message may also be sent when the exception status for the associated exception is a particular status (e.g., closed) or when the status has changed. More particularly, the status of the exception for which a notification message is transmitted may be stored in an exception object or other suitable data structure. In this manner, each exception and its associated status may be tracked to enable collaboration among multiple parties. Moreover, each exception may be viewed and tracked by multiple users for resolution of the exception. For instance, an exception desk may be used to illustrate exceptions as well as a status associated with each exception. Of course, it may be preferable to present only those exceptions that are pending (e.g., not closed) in the exception desk.

In addition, it may be desirable to use a field-based notification, which enables one or more individuals to receive a notification message with respect to one or more selected event attributes. For example, an event attribute (which may also be included as a monitor item attribute in the monitor object, as shown) may be a customer identifier, such as "Vigilance." In addition, a specific individual or group of individuals may be assigned a particular customer (e.g., Vigilance). Therefore, it may be desirable to notify this individual or group of individuals as the responsible parties with respect to a particular attribute (e.g., customer identifier) as well as a specific attribute value (e.g., customer identifier=Vigilance). Thus, the set of notification preferences may map one or more individuals to one or more event attributes and/or associated attribute value(s). In other words, the set of notification preferences maps one or more of the set of event attributes (e.g., customer identifier) to one or more individuals (e.g., Kevin) to whom the notification message is to be transmitted. Thus, when the condition is satisfied with respect to a set of one or more event attributes (e.g., customer identifier) associated with one or more of the specified set of events (e.g., sales order did not ship) to which the agent has subscribed, the appropriate individual(s) to be notified may be identified. More particularly, in accordance with one embodiment, the set of notification preferences maps one or more values (e.g., Vigilance) of the attribute(s) (e.g., customer identifier) to the individual(s) to whom the notification message is to be transmitted. In this manner, notification messages may be segregated based upon event attribute to enable responsible parties to be notified.

In addition, it may be desirable to enable a "safety net" such that a specific user (e.g., email address) or alias is automatically notified in association with the monitor item (e.g., satisfaction of a condition specified in the monitor item with respect to one or more events and/or event attributes). For example, through the specification of a safety net, a fallback mechanism is established to ensure that all exceptions for which notifications are sent are ultimately resolved via an appropriate channel. For instance, the safety net may be a manager of a particular group responsible for resolving the exception. A separate notification method may be established for the field-based notification. For example, as described above, the notification method (i.e., communication medium) may be an e-mail, alphanumeric pager, or numeric pager.

Figure 24C:
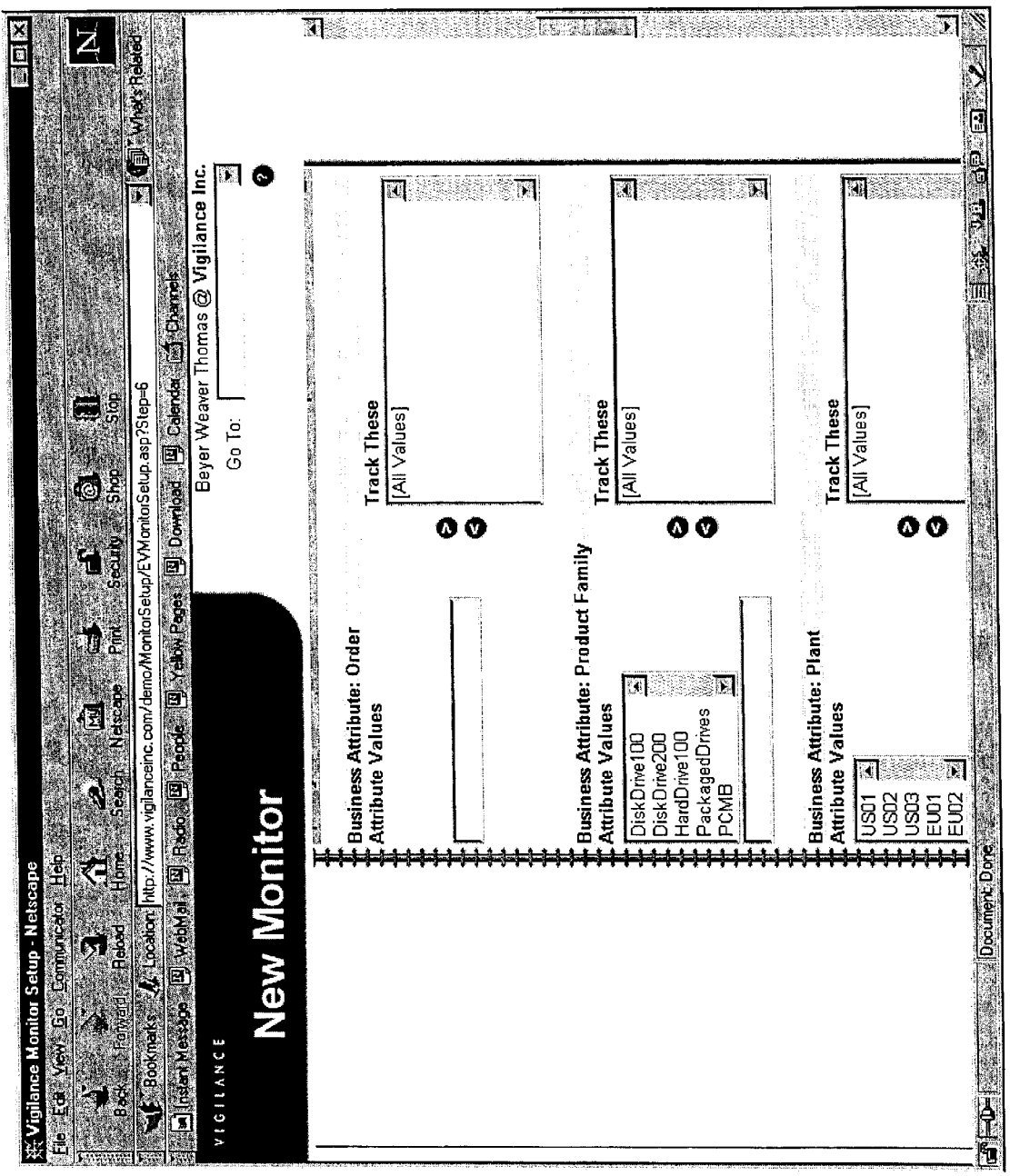

As further illustrated in FIG. 24B, it may be desirable to notify recipients of all exceptions of the monitor or specific exceptions of the monitor. More particularly, a specific exception may be specified by one or more business attributes. In other words, it may be desirable for the agent to determine whether the condition is satisfied with respect to one or more event attributes associated with one or more events. For instance, as described above, the monitor item may identify an event (e.g., sales order did not ship) for which one or more event attributes are to be compared. As shown in FIG. 24C, it may be desirable track all values of an event attribute (e.g., business attribute) for detection of satisfaction of the specified condition. However, in some circumstances, it may be desirable to indicate in the set of notification preferences a set of one or more values for one or more of the event attributes for which the notification message is to be sent. In other words, rather than sending a notification message upon satisfaction of the condition for all values of the one or more attributes associated with the condition, it may be desirable to send a notification message only when the condition is satisfied with respect to specific values of the attributes. For example, as shown in FIG. 24C, possible business attributes for a particular event include "product family" and "plant." It may be desirable to assign a particular individual or group the responsibility to resolve issues for a particular product or plant. Thus, specific attribute values may be selected for purposes of this particular monitor to enable notifications to be tailored to the responsible parties.

Figure 24D:
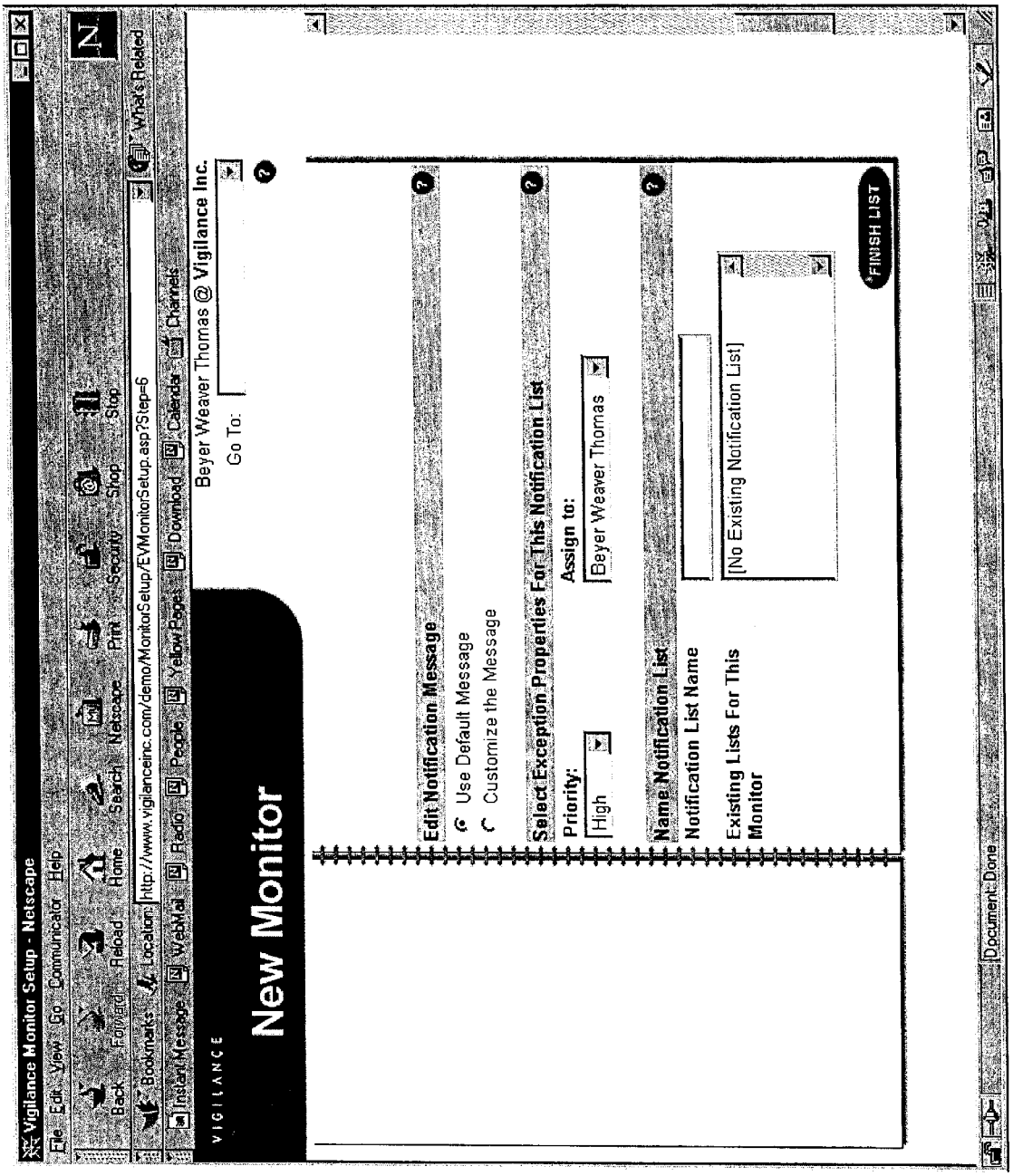

As shown in FIG. 24D, the notification message that is ultimately sent may be a default message or a customized message. In this example, the message that is sent is a default message. In addition, exception properties for the notification list may be specified. More particularly, a priority may be associated with the exception as well as the associated notification list. In addition, the exception generated upon satisfaction of the specified condition may be assigned to a particular individual or entity, as shown. As shown, a set of notification preferences to be associated with the monitor and exception that is generated may be identified by a notification list name. In addition, all existing notification lists associated with the monitor may be identified.

Figure 24E:
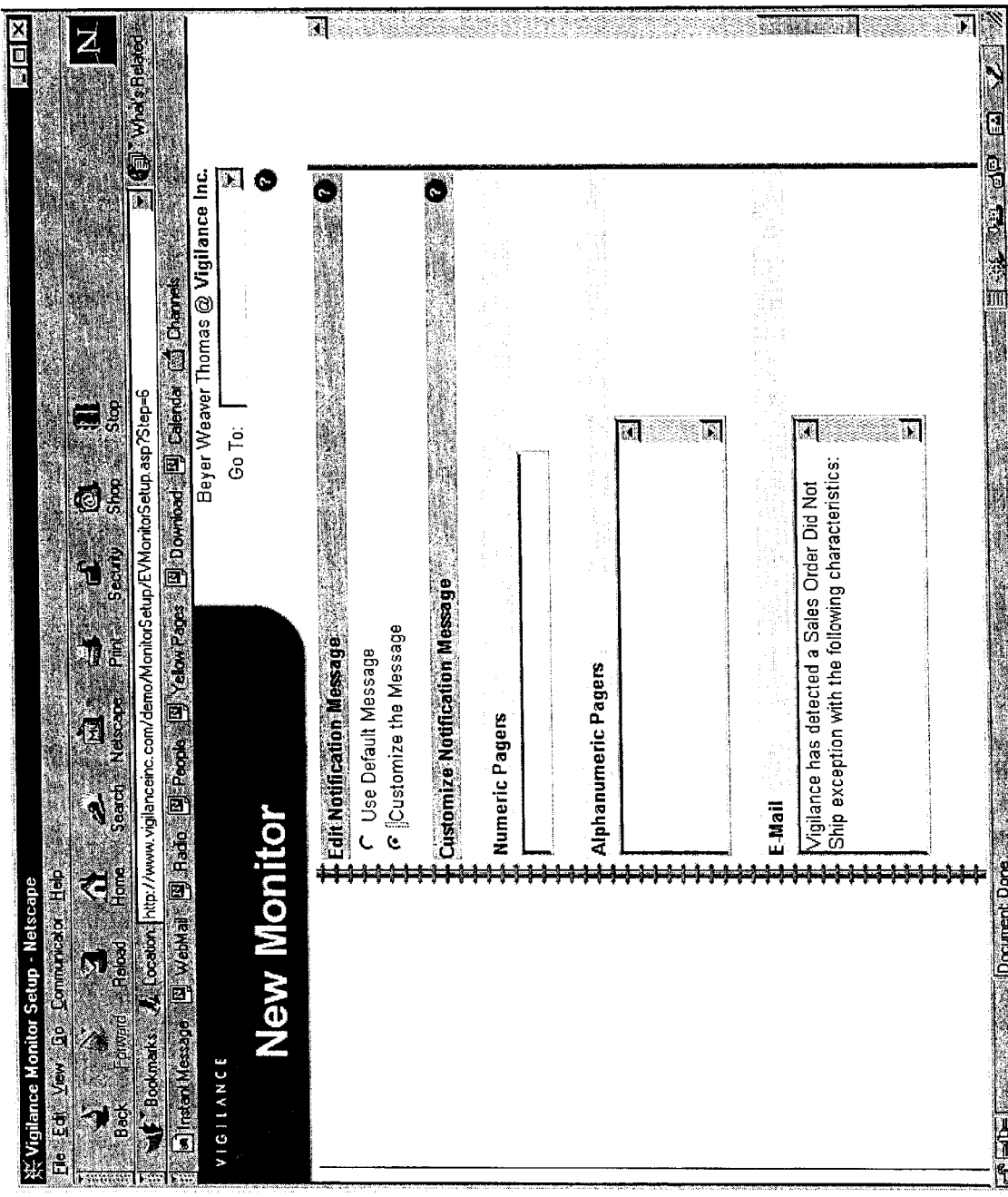
Figure 24F:
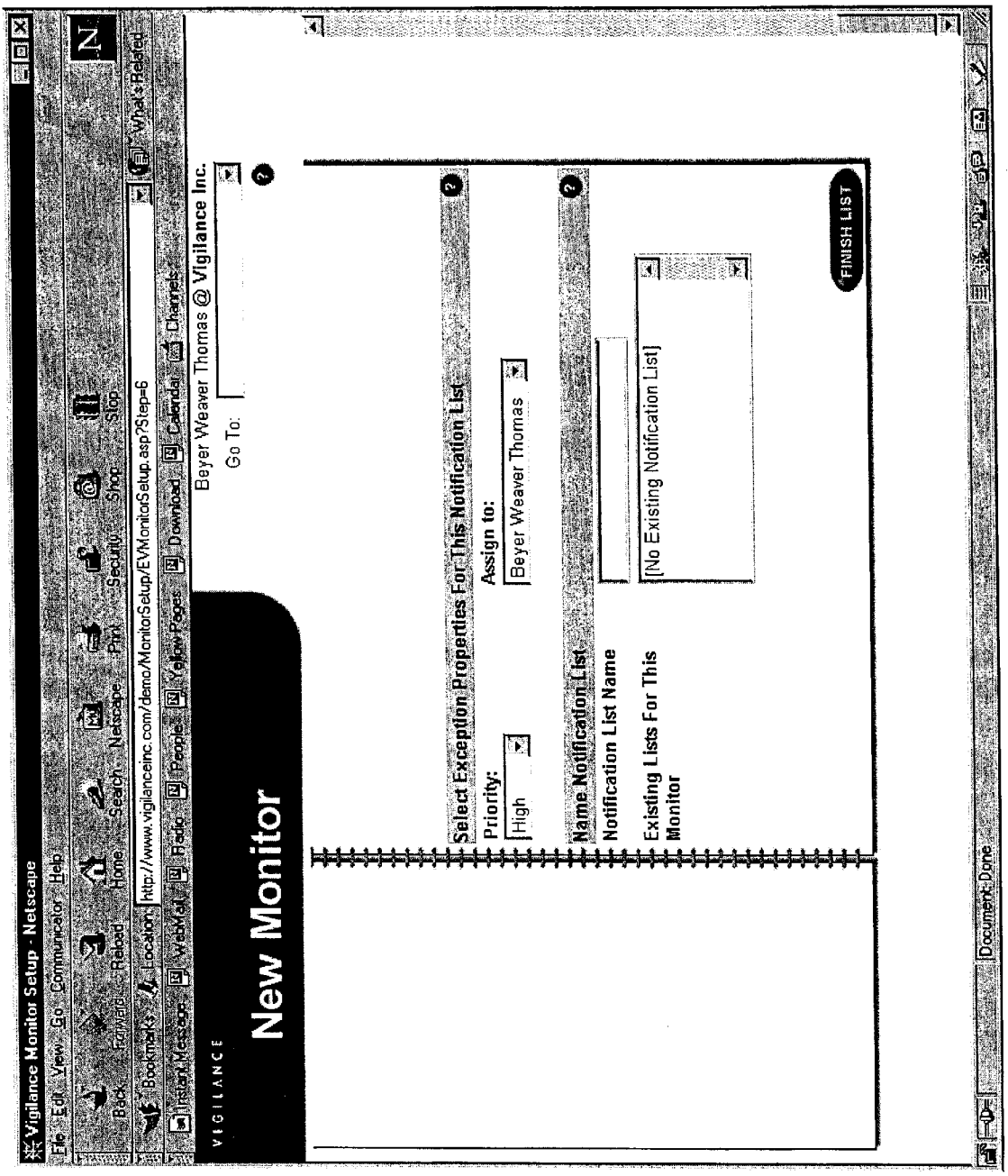

FIG. 24E is an exemplary graphical user interface that may be used to customize a notification message. More particularly, as shown, a customized message may be provided for different communication mediums (e.g., numeric pager, alphanumeric pager, and e-mail). Thus, the notification message associated with the obtained set of notification preferences may be obtained prior to sending the notification message. In addition, exception properties may be provided for the set of notification preferences (e.g., notification list), as described above with reference to FIG. 24D corresponding to a default message. Similarly, one or more sets of notification preferences may be associated with a single monitor through specifying one or more notification lists.

Figure 25:
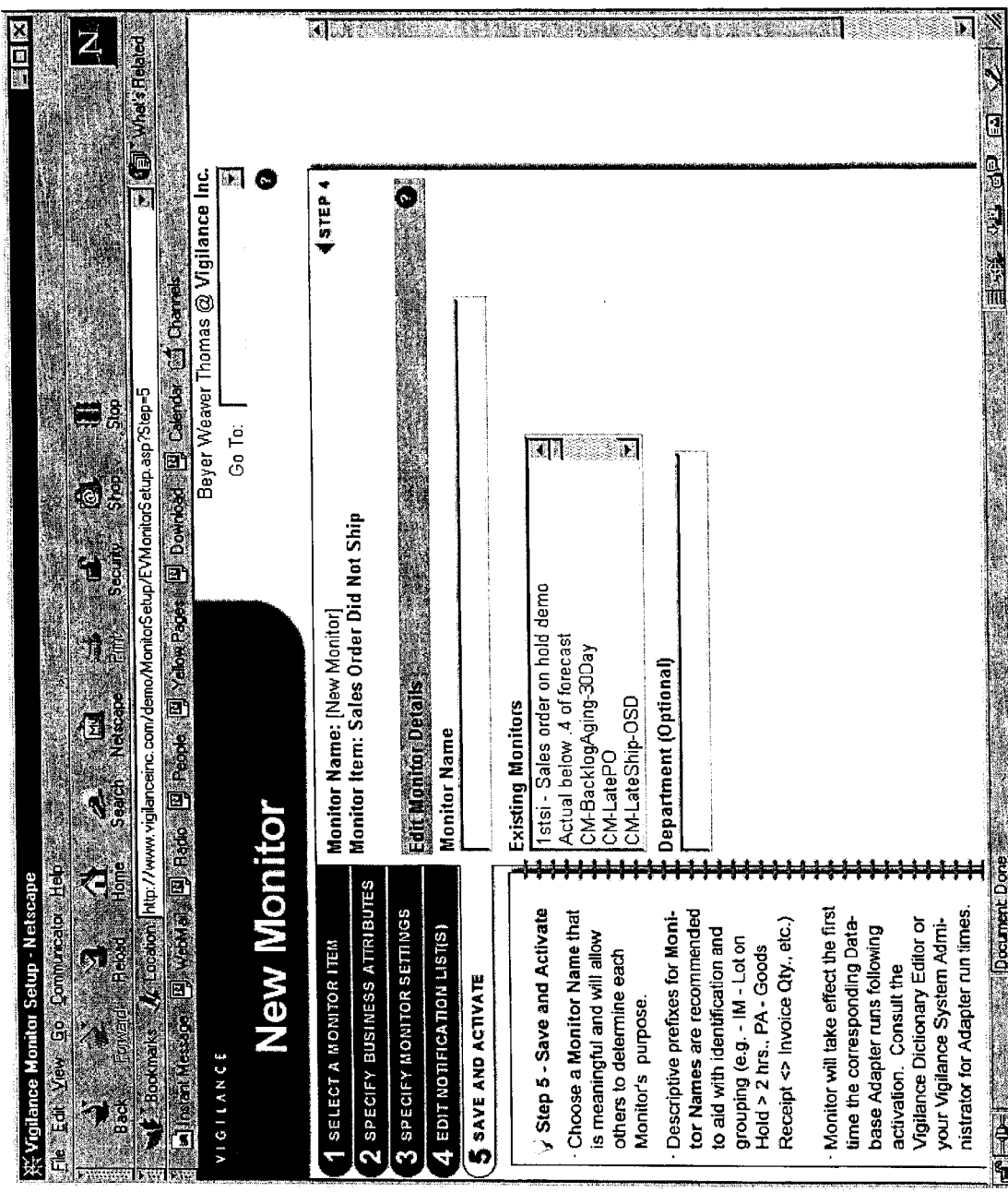
FIG. 25 is an exemplary graphical user interface that may be used to save and activate the monitoring configuration (e.g., trigger condition, business attributes, and notification list) according to a monitor name identifying a monitor item to be tracked in accordance with one embodiment of the invention.

FIG. 25 is an exemplary graphical user interface that may be used to save and activate the monitoring configuration (e.g., trigger condition, business attributes, and notification list) according to a monitor name identifying a monitor item to be tracked in accordance with one embodiment of the invention. As shown, the monitor may be saved when a monitor name is selected. The monitor preferably is activated when the adapter runs, thereby enabling monitoring of the data that is output by the adapter.

Figure 26:
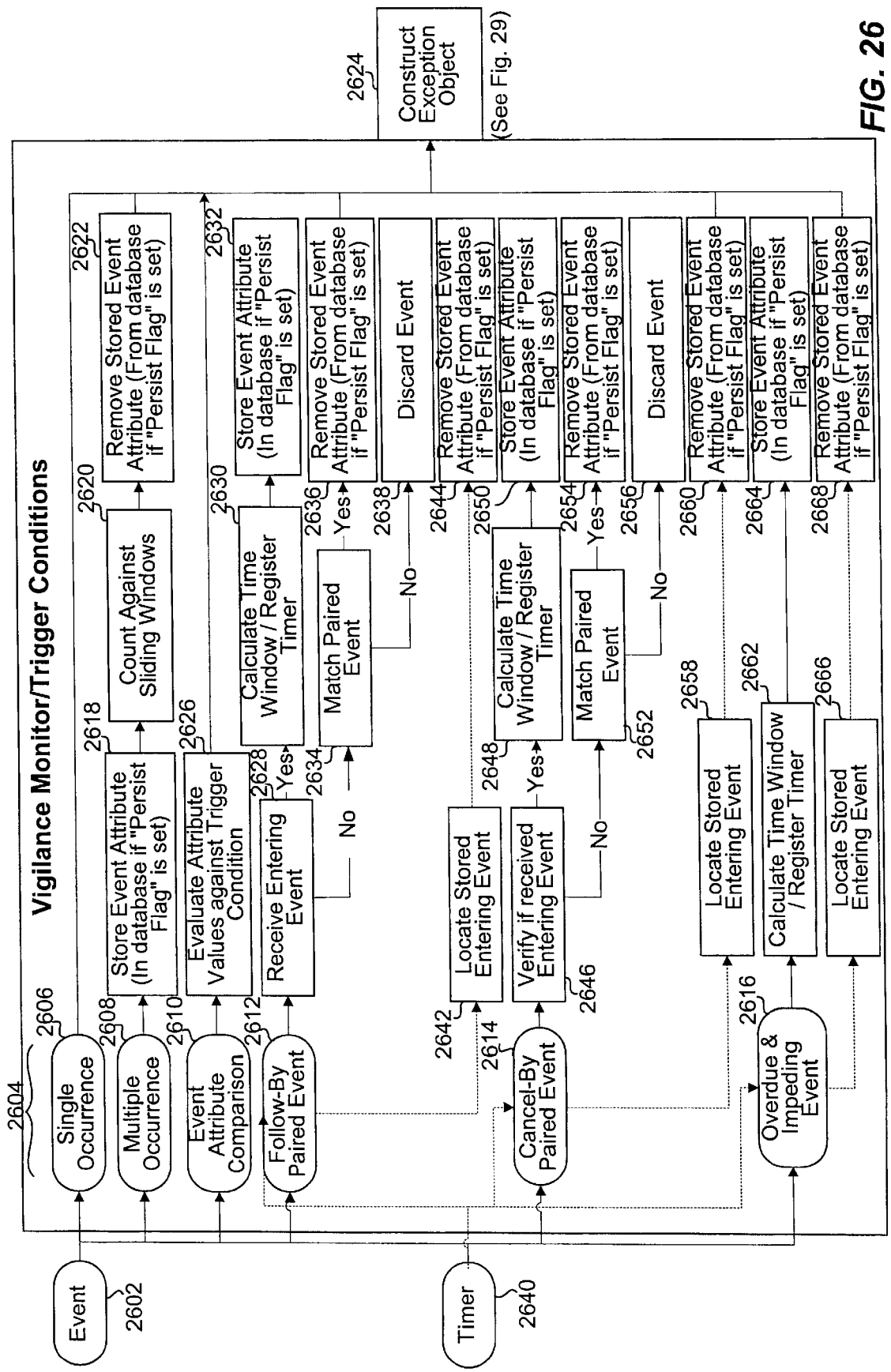
FIG. 26 is a process flow diagram illustrating a method of processing trigger conditions in accordance with one embodiment of the invention.

Each monitor may be separately instantiated as a separate monitor object for each trigger condition for which satisfaction is to be detected. FIG. 26 is a process flow diagram illustrating a method of processing trigger conditions in accordance with one embodiment of the invention. As shown, when an event and associated data is received at block 2602, one or more conditions may be satisfied. A variety of trigger conditions are contemplated, and therefore those presented are merely illustrative. Moreover, each condition preferably has an associated condition type that is processed accordingly. However, a condition type is not required, but merely facilitates the processing of numerous conditions. As shown, exemplary condition types 2604 include a single occurrence condition type 2606, a multiple occurrence condition type 2608, an event attribute comparison condition type 2610, a follow-by paired event condition type 2612, a cancel-by paired event condition type 2614, and overdue/impending event condition types 2616.

As described above, the adapter produces data associated with a plurality of events, while the agent may wish to monitor that data for a subset of those events. For instance, the agent may send a subscription request for flagged data associated with a specified set of events. The single occurrence condition type 2606 indicates that one of the specified set of events is to occur a single time for satisfaction of the condition to occur, while the multiple occurrence condition type 2608 indicates that one of the specified set of events is to occur a specified number of times for satisfaction of the condition to occur. For example, the multiple occurrence condition type 2608 may be satisfied when the specified event is to occur the specified number of times within a specified period of time. Thus, in order to track the occurrences of the event (e.g., one or more attributes), it may be desirable to store the event attributes until the condition is satisfied. In addition, a persist flag may be set to indicate that at least one of the occurrences has been detected during the specified time window (e.g., 2 hours). The persist flag may then be reset once the condition has been satisfied for the specified number of times or the specified period of time has lapsed without satisfaction of the condition the specified period of times. Thus, as shown at block 2618, data associated with the event (e.g., one or more event attributes and/or metrics) may be stored in a database when the persist flag is set. In addition, it may be desirable to increment a counter each time the condition is satisfied. This counter may then be compared against a sliding window corresponding to the specified period of time (e.g., 2 hours) at block 2620. In other words, the event must occur multiple times within a specified window of time. When the multiple occurrence condition has been satisfied at block 2622, the stored event data (e.g., attributes and/or metrics) may be removed from memory. More particularly, in accordance with one embodiment, in order to satisfy the multiple occurrence condition, the event must occur during an appropriate sliding window corresponding to the specified period of time, as indicated by the persist flag.

When a condition such as the single occurrence condition 2606 or multiple occurrence condition 2608 is satisfied, an exception is generated at block 2624. More particularly, generation of an exception may include the instantiation of an exception object. An exemplary exception object that may be generated will be described in further detail below with reference to FIG. 29. The exception that is generated may be assigned to an individual, group or entity for resolution (e.g., via the collaboration process). In addition, an individual or group may be notified of the exception requiring action. One method of sending a notification message in accordance with a set of notification preferences will be described in further detail below with reference to FIG. 30.

The event attribute comparison condition type 2610 indicates one or more event attributes for which one or more values are to be compared. For example, two or more values may be compared or evaluated using the specified condition. For example, the condition may include one or more operators (e.g., <, >, =). As another example, the event attribute comparison condition type 2610 may be a boolean expression including one or more event attributes. The attribute values are then evaluated using the specified condition at block 2626. When the condition is satisfied, an exception object is constructed at block 2624.

The follow-by paired event type 2612 indicates that a first one of the specified set of events is to be followed by a second one of the specified set of events. In addition, it may be desirable to require that both events must occur (or be detected) within a specified period of time. For example, it may be desirable to detect when a first event (e.g., order placed) is followed (or not followed) by a second event (e.g., order shipped) within a specified period of time (e.g., two weeks). As another example, it may be desirable to detect a "ready for shipment within promised ship date—2 days" event subsequent to an "order placed" event. In this manner, two different events may be effectively "joined." In this example, an entering event is received at block 2628. A time window or register timer is calculated at block 2630. Data (e.g., attributes and/or metrics) associated with the event are stored at block 2632 if the persist flag is set. When it is determined that the appropriate second following event has been detected (e.g., within the specified period of time), this paired event has been matched at block 2634. The stored event data may then be removed from the database at block 2636 if the persist flag is set. In addition, an exception is generated (e.g., via construction of an exception object) at block 2624. However, if the second following event is determined not to match the "paired event" specifications at block 2634, the second following event may be discarded. In other words, this second following event need not be stored if it is not the correct "following event." A timer mechanism 2640 is preferably maintained in order to determine whether timing requirements are satisfied. In addition, timing flows (e.g., fired timer events) are further indicated by dotted lines. Thus, in this example, if the second following event is never received, or not received within the specified time, the stored event data for the entering event (i.e., first event) is located at block 2642 and discarded at block 2644. More particularly, the persist flag may be checked to verify that the event is to be discarded in association with the follow-by paired event condition.

The cancel-by paired event type 2614 indicates a first one of the specified set of events to be canceled upon detection of a second one of the specified set of events. More particularly, it may be desirable to cancel the first event when the second event occurs or is detected within a specified period of time of the first event. For example, the first event may be a "scheduled machine maintenance" which may be canceled by occurrence or detection of the second event, "machine up within 2 days." Thus, when the first, entering event is received at block 2646, a time window or register timer is calculated at block 2648 to ensure that both events occur within the same time window. Event data (e.g., event attributes and/or metrics) may then be stored at block 2650 (e.g., when the persist flag is set). When the second matching event is detected at block 2652, the data associated with the first, entering event may be removed at block 2654 (e.g, when the persist flag is set) and an exception object may be constructed and transmitted at block 2624. However, if the second event that is received is not the correct matching event, the data associated with the first event may be discarded at block 2654. If the second event is not received or not received within the specified time window, the data associated with the stored entering, first event may be located at block 2658 and discarded at block 2660 (e.g., if the persist flag is set). In this manner, it is possible for managers to evaluate personnel such as those responsible for machine maintenance.

The overdue and impending event types 2616 operate similarly. As implied by their names, an event is overdue or impending when the associated condition is satisfied. For instance, it may be desirable to notify the appropriate department of an impending promised ship date (e.g., 2 days before the promised ship date). Similarly, it may be desirable to notify the appropriate department when the shipment is overdue (e.g., the promised ship date has lapsed). Thus, as shown at block 2662, a time window or register timer may be calculated to determine whether the event has been received within a specified period of time. Data associated with the event (e.g., attributes and/or metrics) may be stored at block 2664 when the persist flag is set. Similarly, after the specified period of time has elapsed, the event data may be located at block 2666 and removed at block 2668 (e.g., if the persist flag is set).

Although specific examples of conditions with respect to various condition types are described above, other condition types are contemplated. For example, it may be desirable to simply detect two different events within a specified period of time, without requiring that one of the events occur before the other. For instance, it may be desirable to detect that an order has been shipped as well as invoiced. Thus, one of the condition types may be a time-based pair indicating a first one of the specified set of events to be detected within a specified period of time within a second one of the specified set of events.

Figure 27:
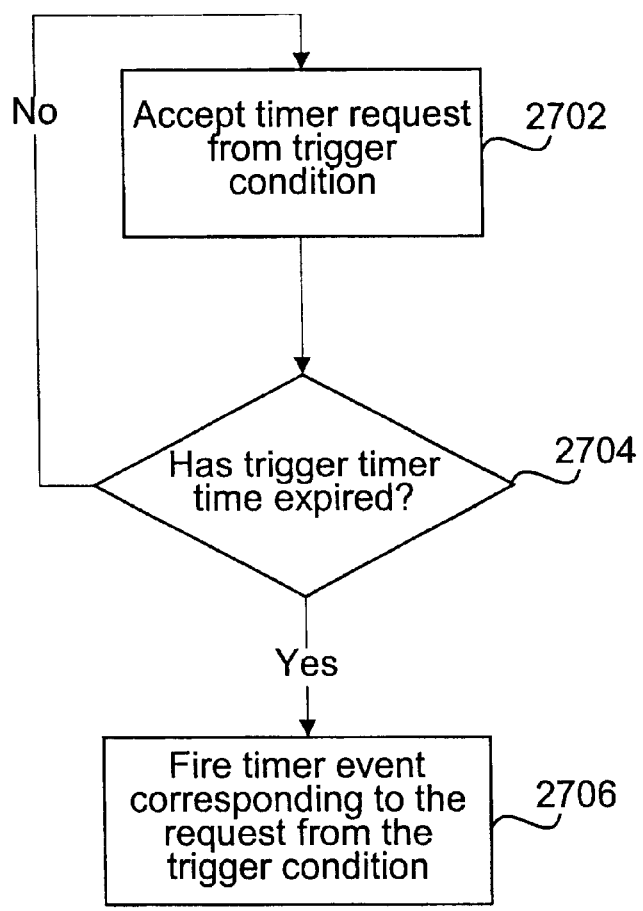
FIG. 27 is a process flow diagram illustrating a method of implementing a timing mechanism for processing trigger conditions such as those illustrated in FIG. 26 in accordance with one embodiment of the invention.

FIG. 27 is a process flow diagram illustrating a method of implementing a timing mechanism for processing trigger conditions such as those illustrated in FIG. 26 in accordance with one embodiment of the invention. As shown, a time request may be accepted from a trigger condition at block 2702. If it is determined at block 2704 that the trigger timer has expired (i.e., it is trigger time), the appropriate timer event corresponding to the request from the trigger condition is fired at block 2706.

FIG. 28 is a diagram illustrating an exemplary monitor object that may be used to identify a particular configuration of monitoring conditions (e.g., condition and business attributes) in accordance with one embodiment of the invention. As shown, the monitor object is identified by a monitor name 2802 and author/creator 2804 of the monitor. In addition, the monitor object includes a condition 2806 that is to be satisfied with respect to one or more events and/or event attributes 2808, and may also indicate specific attribute values associated with the event attributes for which data is to be monitored. In addition, the monitor indicates whether a notification message 2810 is to be transmitted, as well as whether the generated exception is to be assigned 2812 to one or more individuals for resolution.

Once the appropriate information is obtained via the monitor object during monitoring using one or more specified conditions, an exception and/or notification may be generated. More particularly, a single exception object may be used to store and transmit information associated with both assignment and notification of an exception. In this manner, the exception object may serve as a notification indicator to indicate to a notification server that a condition has been satisfied with respect to an event, requiring that a notification message be sent as appropriate. FIG. 29 is a diagram illustrating an exemplary exception object that may be generated as a result of processing of a trigger condition such as that shown in FIG. 26. The exception (and exception object) is identified by an exception identifier 2902 and may have an associated exception description 2904 that provides a more detailed textual description of the exception. For example, this text may include information such as the possible causes of the exception and one or more desired ways to resolve the exception or event that caused the exception to be generated. In addition, an event that triggered the exception is identified by an event identifier 2906. In addition, the trigger condition 2908, associated trigger condition type 2910, one or more business attributes and/or metrics 2912, and any specific attribute and/or metric values 2914 may be indicated as well. Other information that may be included in the exception object is the monitor object name 2916, the monitor item (or pointer to the monitor item) 2918, an indicator 2920 that indicates whether the message is a notification or exception. More particularly, when the message is an exception that requires resolution, it is preferably added to the exception desk so that it may be visible to those parties who have read and/or write access to the exception or portions thereof. In addition, when an exception is generated, an assign to field 2922 indicates one or more individuals, aliases or entities to whom the exception is to be assigned for resolution (e.g., via the collaboration process). A priority 2924 may be assigned to the exception to enable a plurality of exceptions to be resolved in the appropriate order. A time at which satisfaction of the condition with respect to the event (and associated attributes, metrics, and specified values) is detected is indicated by a detection time 2926. An analysis field 2928 enables one or more individuals to whom the exception has been assigned to provide an analysis for the exception. For instance, the analysis may be a simple textual field. However, it may be desirable to store such analysis as a linked list or other data structure to enable a collaborative discussion among the responsible parties to be tracked and recorded. In addition, one or more analysis authors 2930 are preferably identified.

As described above, a notification message may be sent in addition to or instead of sending an exception. In other words, it may be desirable to merely send a notification indicating that an exception has been generated rather than assigning that exception to one or more responsible parties for resolution. For instance, a notification may be desirable when a meeting reminder is sent to an individual or group of individuals. On the other hand, where a situation requires correction in a timely manner, the exception is preferably assigned for resolution and tracked via the collaboration process (e.g., via the exception desk).

Figure 30:
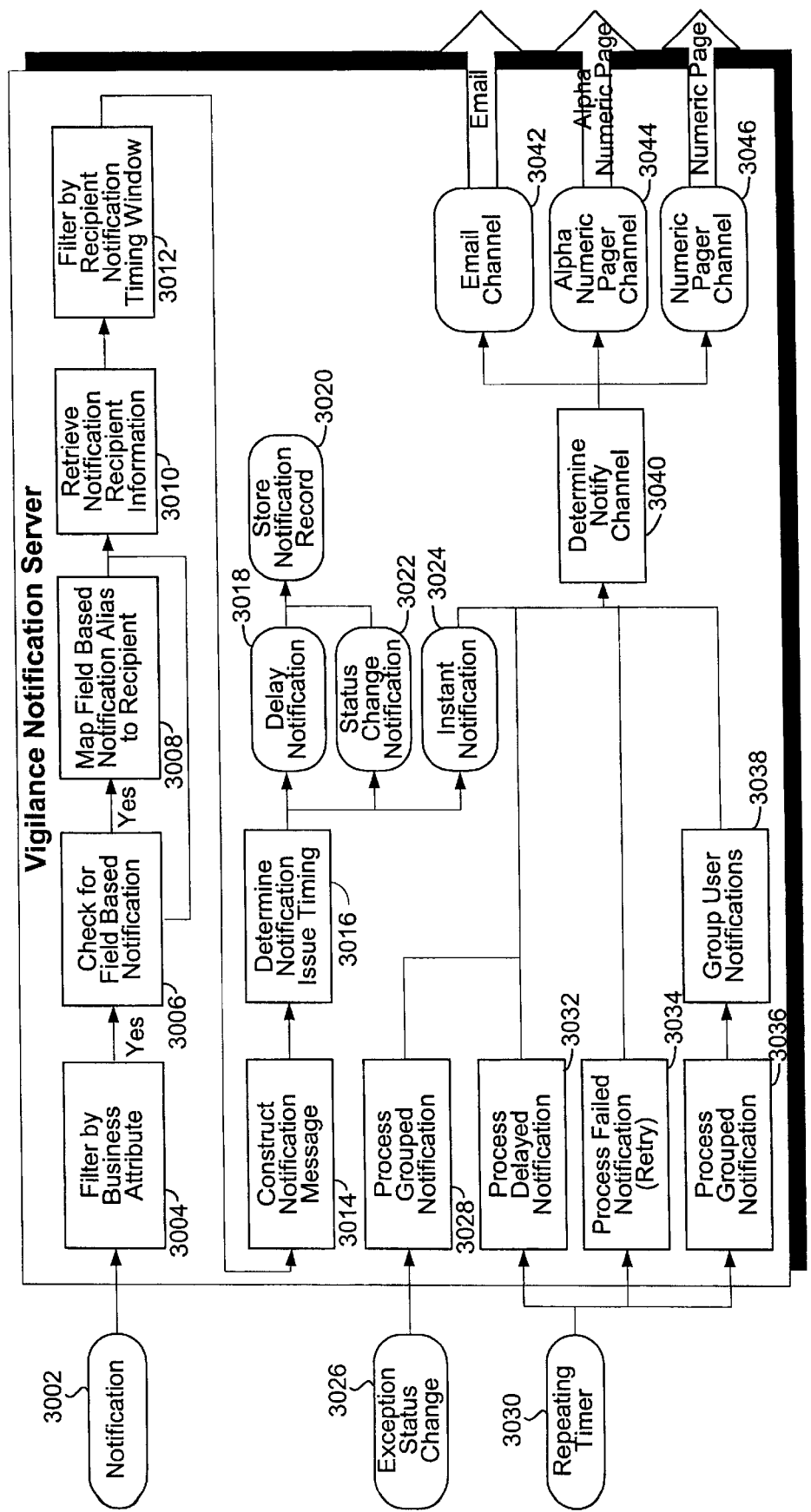
FIG. 30 is a process flow diagram illustrating one method of generating a notification message in accordance with one embodiment of the invention.

FIG. 30 is a process flow diagram illustrating one method of generating a notification message in accordance with one embodiment of the invention. As shown, when a notification message is received at block 3002, it may be desirable for the notification server to further filter the notifications at block 3004 according to one or more business attributes (and/or associated values). More particularly, as described above, the set of notification preferences may specify one or more values for one or more of the event attributes for which the notification message is to be sent. In addition, as described above with reference to FIG. 24B, a field-based notification may be enabled based upon one or more event attributes, thereby enabling responsible parties to be notified regarding events with respect to one or more event attributes as well as specific event attribute values. Thus, the notification server checks whether field-based notification is enabled at block 3006. As described above, each event has one or more associated event attributes. Thus, the set of notification preferences may map one or more of the event attributes (as well as associated attribute values) to one or more entities to whom the notification message is to be transmitted. These attributes may be those that are relevant to the condition that has been triggered or, alternatively, may simply be event attributes that are pertinent to the routing of notification messages. For example, although the customer identifier may not be pertinent to identifying a late shipment, the customer identifier may be pertinent to determining who is to receive a notification in relation to the detected event. An entity that is capable of being notified may be, for example, a company, department or group, an individual, or an alias. The field based notification entity or alias may then be mapped to determine the appropriate and intended recipient(s) 3008. Thus, through this mapping, the notification recipient information is received at block 3010.

Notification recipient information typically includes identifying information, such as an email address and name where an alias has previously been provided. Moreover, each entity (e.g., individual) or notification recipient may have a set of notification preferences associated therewith. For example, an individual may have a notification medium preference indicating that the individual wishes to receive all notifications via a specific pager number. As another example, the individual may have a notification timing preference indicating that the individual wishes to receive all notifications during working hours (e.g., 9:00 am–5:00 pm). Thus, at block 3012 the notification message may be filtered according to a specific timing preference.

The notification message that is ultimately sent may be constructed from various portions of information provided in the exception object, as well as other information that may be obtained from various sources. In addition, as described above, the notification message may be a default message or may be a customized message. Thus, an appropriate notification message is constructed at block 3014.

A set of notification preferences may also be associated with an event, condition, or issue (e.g., exception) to be resolved. Thus, a timing preference for the particular issue for which the notification is being transmitted may be determined at block 3016. For example, as described above with reference to FIG. 24B, it may be desirable to delay notification 3018. If delaying the notification is appropriate, the notification may be stored at 3020 such that it can be sent at a later time or date. Similarly, it may be desirable to send a second notification message when the one or more conditions are no longer satisfied with respect to the one or more of the specified set of events. For example, it may be desirable to send a notification message when the status of the exception is a particular status (e.g., closed) or has changed. Thus, a status change notification is sent at block 3022. It may be desirable when the status of an exception has changed to store the notification message or record as shown at block 3020 for subsequent retrieval (e.g., with a further status change). Of course, it may be preferable to send an immediate notification message as shown at block 3024.

When the status of the exception has changed 3026, it may be desirable to repeat some of the above-described steps. For instance, rather than re-sending a stored notification message, it may be desirable to compose a second, updated message. Therefore, although not shown in FIG. 30, it may be desirable to repeat steps such as construct notification message 3014.

As described above, notification grouping enables specified users to receive notifications addressed to a particular group (e.g., department). Thus, a grouped notification may be processed at block 3028. This grouped notification may be processed upon an exception status change as shown at block 3026. However, such a grouped notification may also be processed via a notification message that is sent without requiring an exception status change, as described below with reference to block 3036.

A timer mechanism operates as a repeating timer 3030 to ensure that notifications are sent at the appropriate time. Thus, a delayed notification is processed at block 3032 accordingly. Similarly, a failed notification may be processed (i.e., retried) at block 3034. Similarly, a grouped notification 3036 that does not require an exception status change may be processed to enable notifications directed to a particular group to be sent to each associated user as shown at block 3038.

For each notification recipient, the appropriate notification preferences are applied. As described above, each notification recipient may have an associated set of notification preferences. Thus, the appropriate notification medium (i.e., notification channel) is determined at block 3040. Thus, depending upon the specified notification medium, the notification message may be sent via a variety of communication mechanisms. For example, as shown, a notification message may be sent via electronic mail 3042, alpha-numeric pager 3044, or numeric pager 3046. However, these notification mediums are merely illustrative. For example, other suitable mediums (e.g., phone, cell phone) may be used.

As described above, data is generated and preferably stored with respect to detected events. In one embodiment, this data is embodied in the form of an exception and stored in an exception object. Exceptions may be generated when an event is detected, as well as when a condition is satisfied with respect to the detected event. In order to track the resolution of events with respect to detected conditions, an "Exception Desk" may be provided to enable multiple parties to collaboratively interact to resolve the exceptions. More particularly, a party accessing the Exception desk may wish to view as well as modify portions of an exception. However, it may be undesirable to enable all users to modify or view the data associated with an exception. Thus, a security feature of the present invention limits accessibility to users to information available from the Exception Desk.

Figure 31:
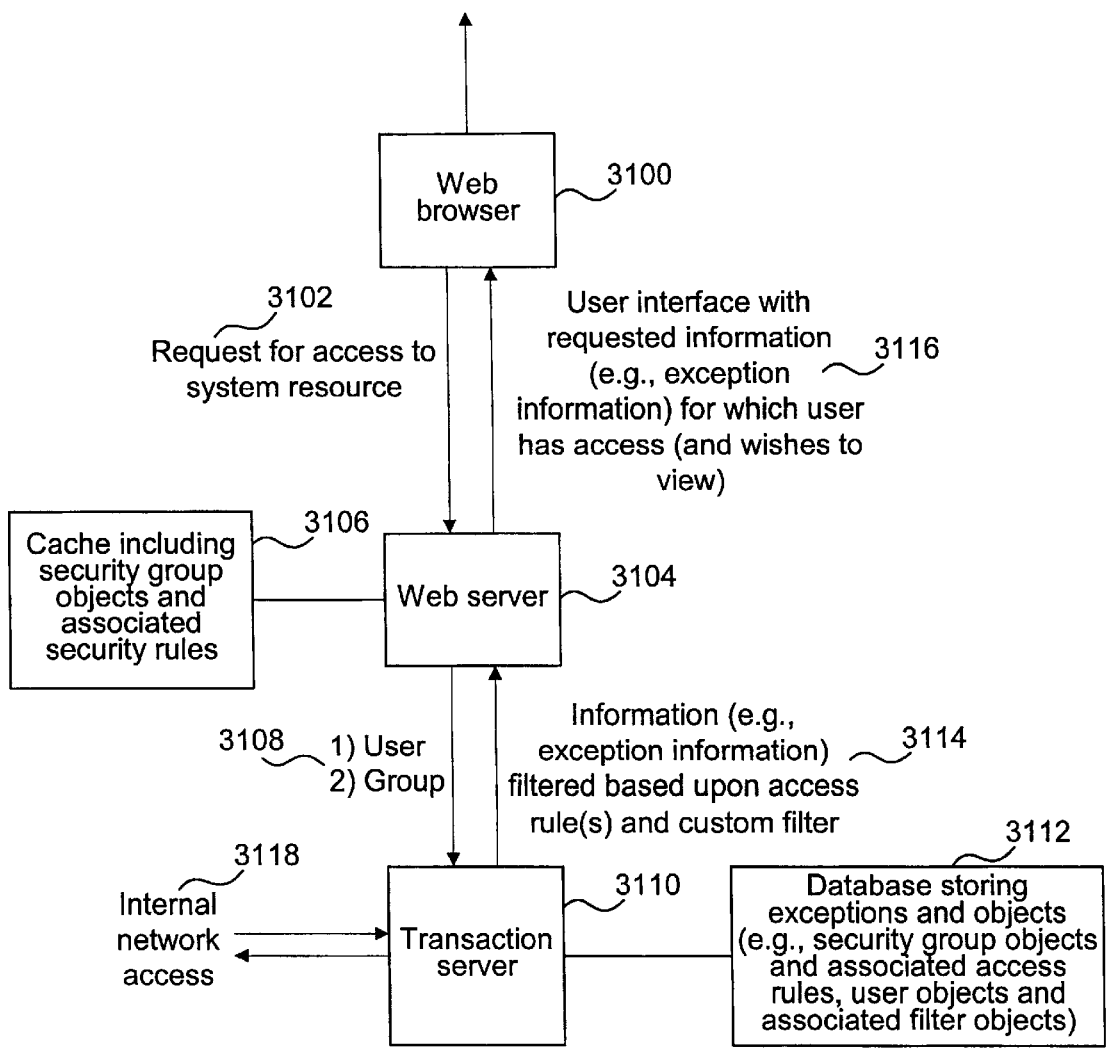
FIG. 31 is a process flow diagram illustrating an exemplary system in which a security system of the present invention may be implemented.

FIG. 31 is a diagram illustrating an exemplary system in which a security feature of the present invention may be implemented. As shown, a user may use a web browser 3100 to send an access request for access to a system resource 3102 (e.g., exception or portion thereof) to web server 3104. More particularly, the web server 3104 preferably has a cache 3106 associated therewith that stores selected access information, such as security group objects and associated access rules. An exemplary security group object will be described in further detail below with reference to FIG. 33. The web server 3104 authenticates the user and then generates a user interface in accordance with security rules appropriate for that user, as will be described in further detail below with reference to FIG. 35. More particularly, the web server 3104 determines the access group associated with the user and obtains the security rules associated with that access group from the cache 3106. For instance, since the cache preferably does not store state information, the web server 3104 may obtain a group identifier as well as a username from the user when the user logs in to the system. The web server 3104 may then provide the username and security group information as shown at 3108 to a transaction server 3110 capable of applying (i.e., implementing) the security rules to provide access to data (e.g., exception information) associated with detected events. Alternatively, if the user is not required to enter an associated security group identifier upon system access, the web server 3104 may provide the username to the transaction server 3110, which is preferably capable of determining the appropriate security group for the user and providing that information to the web server 3104. Regardless of the mechanism for determining the appropriate security group, the web server 3104 generates a graphical user interface appropriate for the access information (e.g., i.e., security group).

Once the user has gained access to the web server 3104 and an appropriate user interface has been provided, the transaction server 3110 determines whether to grant access to the requested system resource 3102. As described above, the requested system resource 3102 may be data associated with one or more of a plurality of detected events (e.g., exception or portion thereof). In order to determine whether to grant access to the requested system resource, the transaction server obtains information associated with the access request and determines from the access information whether to provide access to the requested resource (e.g., data associated with a detected event).

In accordance with one embodiment of the invention, the transaction server 3110 has access to a database 3112 that stores two separate types of information. First, the database 3112 stores data associated with detected events. As described above, this data may be stored in the form of exception objects. Second, the database 3112 stores access information. More particularly, the access information preferably includes 1) one or more security group objects, each having one or more associated access rules; and 2) one or more user objects, each preferably indicating a security group and therefore an associated security group object. Additionally, each user object may have one or more associated filter objects indicating a mechanism for filtering data (e.g., exception data) that is presented to the user. For instance, each filter object may indicate one or more event attributes for which values are to be viewed. Exemplary security group objects and user objects will be described in further detail below with reference to FIG. 32 and FIG. 33. In addition, exemplary security access rules will be described in further detail below with reference to FIG. 34.

When the transaction server 3110 determines from the access information that access to the service or data requested (e.g., exception information) is to be provided, access to this information is provided in accordance with the access information. More particularly, access will vary in accordance with the security rules configured for the relevant security group, as will be described in further detail below. Thus, exception information is filtered based upon one or more access rules. This filtered information may be further filtered via a custom filter (e.g., specified by one or more filter objects) indicating the information that is to be viewed by the user. This information is then provided at 3114 to the web server 3104 and presented via a user interface as shown at 3116. In this manner, a suitable user interface may be presented to the user, providing access to exception information (e.g., read and/or write access) to those exceptions (or portions thereof) for which the user has access (and wishes to view).

Although the security system may be implemented to enable a user to send an access request via the Internet, the security system may also be implemented to enable internal access 3118 (e.g., via an internal network). For instance, the user may operate anonymously, or may optionally provide a username and/or security group identifier that may be used to obtain the appropriate access rules. As described above with reference to FIG. 31, it is preferable to implement the security system of FIG. 31 using a separate web server and transaction server. More particularly, the user interface is provided via the web server 3104, while the business and security logic is implemented at the transaction server 3110. However, although the security system is shown in FIG. 31 to be implemented with reference to a separate web server and transaction server, these functions can also be combined at a single server or in an alternate system configuration.

As described above, access information may be associated with a user from which the access request is received. For instance, the access information may be directly or indirectly associated with the user (e.g., via a security group to which the user belongs). The access information may therefore include a user object as well as an associated security group object.

FIG. 32 is a diagram illustrating an exemplary user object that may be used to store information associated with a user. As shown, a user 3202 and company 3204 may be identified. In addition, a security group 3206 associated with the user is provided. Moreover, it may be desirable to enable a user to access exceptions where attribute(s) and associated values match settings in their user profile. Thus, the user specified attribute(s) and associated value(s) may be stored as shown at block 3208 to be accessed during application of Rule 13, which will be described in further detail below with reference to FIG. 34. In addition, the user may wish to filter data (e.g., attributes) that is viewed. In other words, the user may wish to indicate information that he or she is interested in viewing. Accordingly, one or more filter objects 3210 may be provided to indicate one or more attributes that the user wishes to view.

FIG. 33 is a diagram illustrating an exemplary security group object that may be used to access security rules associated with a security group. Each security group object is associated with one or more access rules. In this example, a first security group 3212 is associated with a first set of access rules 3214 and a second security group 3216 is associated with a second set of access rules 3218. As shown, the first set of access rules 3214 indicates that the user has read access for exceptions for which the user is notified. Similarly, the second set of access rules 3218 includes two rules. The first rule indicates that the user has read and write access for exceptions created by a monitor object that was authored by the user. The second rule indicates that the user has read access for exceptions with an analysis authored by someone in their company.

Figure 34A:
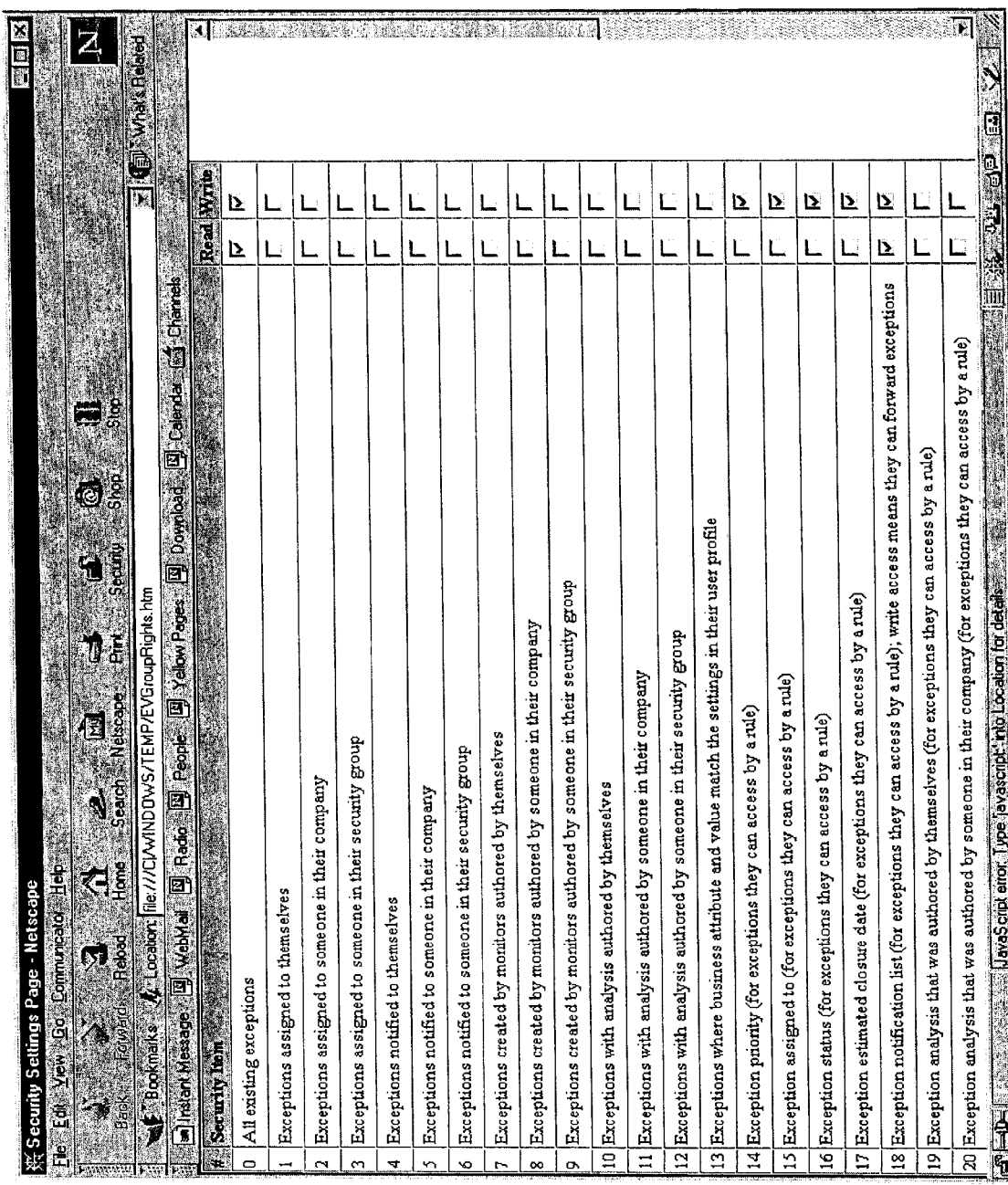
FIG. 34 is an exemplary graphical user interface that may be used to configure rules associated with a security group.
Figure 34B:
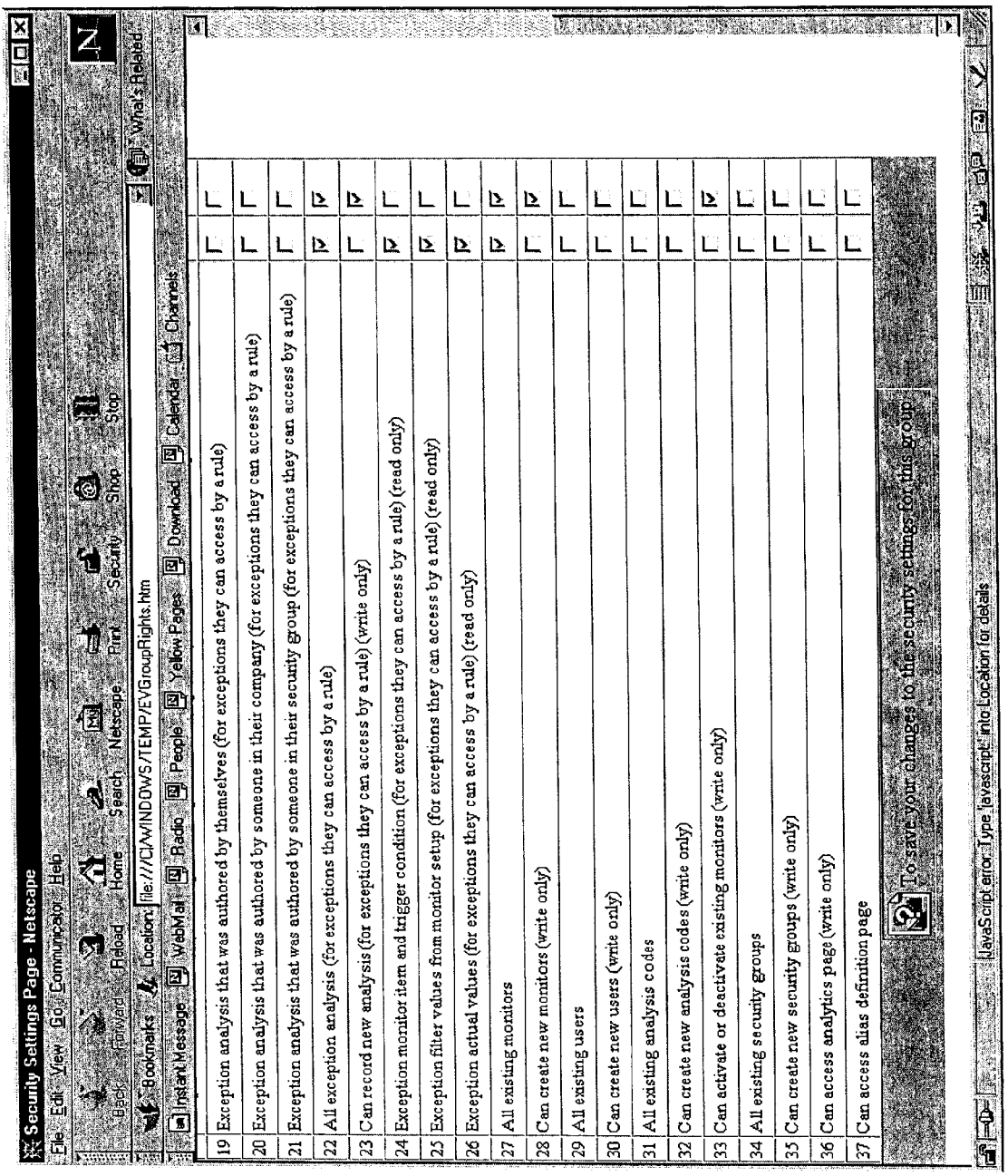

As described above, the access information preferably includes one or more rules that may be obtained and implemented in association with an access request. FIG. 34 is an exemplary graphical user interface illustrating exemplary rules that may be configured in association with a security group (or user). The exemplary rules are numbered as Rule 0 through Rule 37. In addition, in accordance with one embodiment, each rule indicates whether read access and/or write access is enabled.

Each rule may indicate whether access to the requested data or service is provided. More particularly, with respect to exceptions, the access that is granted may be read access and/or write access with respect to an entire exception or a portion of an exception. Moreover, access may be global (e.g., with respect to all exceptions) or access may be provided with respect to exceptions designated by the specific rule.

Rules 0–13 relate to which exceptions can be accessed. For instance, Rule 0 indicates whether read and/or write access to all exceptions on the Exception Desk is granted to the security group. In other words, this particular access rule indicates whether access to data associated with all detected events is enabled. Of course, other rules are contemplated that indicate whether access is granted to data (or a portion thereof) associated with selected detected events.

A rule may indicate whether access to at least a portion of data related to a detected event is to be provided or granted based upon content of a portion of the data. In other words, access to all portions (i.e., fields) of an exception may be granted (or denied) based upon the content of one of the portions of the exception. For instance, Rule 1 indicates whether access is granted to those exceptions that have been assigned to the user. As described above, an exception may indicate that a condition has been satisfied with respect to a detected event. Thus, Rule 1 indicates whether access is granted based upon the entity or entities responsible for resolution of the condition. As indicated with respect to Rule 1, the entity responsible for resolution of the condition may be the user. However, the entity responsible for resolution of the condition may also be one or more individuals in a security group with which the user is associated or one or more individuals in a company associated with the user. Thus, Rule 2 and Rule 3 indicate whether access is granted to those exceptions that have been assigned to someone in the user's company or one or more individuals in their security group, respectively.

Similarly to Rules 1–3 which relate to the "assign to" field of an exception, Rules 4–6 relate to the field of the exception that indicates the entity or entities to be notified of the exception. More particularly, Rule 4 indicates whether access is granted to those exceptions for which the user is notified. Thus, the rule indicates whether access is granted based upon the entity or entities to be notified of the condition. As indicated with respect to Rule 4, the entity to be notified may be the user. However, the entity to be notified of the condition may also be one or more individuals in a security group with which the user is associated or one or more individuals in a company associated with the user. Thus, Rule 5 and Rule 6 indicate whether access is granted to those exceptions for which notifications have been sent to someone in the user's company or one or more individuals in their security group, respectively.

As described above, a set of monitor information such as the event(s) and conditions to be detected may be configured through the use of a monitor object. More particularly, as described above with reference to the "set monitor" option, a monitor object may be instantiated for the purpose of storing a set of monitor information. In addition, the "author" of this monitor (or monitor object) is preferably maintained. Thus, access to an exception may be enabled based upon an author of the set of monitor information, as shown with reference to Rules 7–9. More particularly, access may be granted or denied when the author of the monitor is the user, someone in their security group, or someone in their company.

As illustrated with respect to Rules 7–9, a particular rule may provide or deny access based upon a source of at least a portion of the data (e.g., exception) associated with a detected event. For instance, access may be granted when the source is a user from which the access request is received, an individual within a security group associated with the user, or an individual employed by a company associated with the user. Thus, a rule may indicate whether access is granted based upon a creator of at least a portion of the data (e.g., data stored in an exception). Thus, the creator or author is preferably identified in the data (e.g., "analysis author" field of the exception). For instance, Rules 10–12 indicate whether access is granted based upon an author of analysis associated with one of the exceptions. More particularly, Rules 10–12 indicate whether access is granted when the author is a user from which the access request is received, an individual in a security group associated with the user, or an individual in a company associated with the user, respectively. In this manner, security may be limited based upon information that tracks a sequence of one or more collaboration processes performed to resolve a condition associated with an exception or detected event.

As described above with respect to the data retrieval, monitoring, and detection functionality, each event may be defined by a set of event attributes. Thus, the data in an exception may also include a set of values associated with one or more of the set of event attributes. It may therefore be desirable to grant or deny access based upon attribute settings. For instance, as described above with reference to FIG. 32, the user object (or associated user profile) may indicate one or more attributes as well as associated values in which the user is interested. Rule 13 indicates whether access to an exception (or portion thereof) is to be provided based upon the set of values associated with the specified event attributes. In other words, access to exceptions may be granted when business attributes and values match or are approximately equal to settings in the user profile. For instance, the user profile may indicate one or more values or a value range of one or more event attributes. The exception data may therefore be provided, for example, when these values or value range(s) include the values in the data for which access is being requested.

It may be desirable to limit access with respect to the portion of the data (e.g., exception) that may be accessed, regardless of the content of the data. In other words, access may be granted to a portion of the exception rather than the entire exception. For instance, Rule 14 indicates whether read and/or write access is provided to the priority field (indicating a priority for resolution of the event and/or detected condition) of exceptions.

In addition, with respect to Rule 15, access may be granted to the "assign to" field of one or more exceptions. As described above, the data associated with a detected event preferably includes an assignment indicator (e.g., "assign to" field) indicating one or more individuals responsible for resolution of the condition. Thus, Rule 15 indicates whether access is granted to the assignment indicator.

Similarly, Rule 16 indicates whether access is granted to the "status" field of the exception. In other words, where the exception data indicates a status associated with the detected event, the access information (e.g., rule) indicates whether access is granted to the status indicated in the exception data. Rule 17 similarly indicates whether read and/or write access is available for an "estimated closure date" field of the exception.

As described above, a set of notification preferences (e.g., notification list) may be used to set forth a variety of information that may be used to transmit a notification message. Thus, it may be desirable to indicate whether the notification list may be accessed (e.g., read/write access). Thus, Rule 18 indicates whether read and/or write access is provided for the exception notification list portion of the exceptions that are available on the Exception Desk. When write access is granted, the exception may also be forwarded (e.g., via a separate notification list).

As described above with reference to Rules 0–13, access to data (e.g., exception data) may be granted based upon the content of a portion of the data. Similarly, access that is granted based upon content of a portion of the data may be granted in relation to a portion of the data rather than the entire data (e.g., the entire exception). As described above, the contents of an "authored by" field associated with an analysis portion of the exception may be used to determine whether an exception may be accessed. Similarly, the contents of an "authored by" field may be used to determine which analysis portion of an exception may be accessed, as shown with reference to Rules 19–21. More particularly, the analysis portion may be accessed when an associated "authored by" field indicates that the author is the user, an individual within the user's security group, or someone in the company for which the user is employed, respectively. Thus, a rule may indicate whether access to a portion of the exception data is to be provided based upon the contents of a portion of the data. For instance, as shown with reference to Rules 19–21, access to a first portion (e.g., analysis field) of the exception may be determined based upon the contents of a second portion of the exception (e.g., authored by field). Of course, it is contemplated that access to the contents of a portion of the exception data may be determined from the contents of that portion of the data.

Rule 22, however, indicates whether read access is granted to all exception analysis portions, regardless of the content of the exception. Similarly, Rule 23 indicates whether new analysis can be recorded (e.g., by the user or group for which the rule is configured). More particularly, as described above, each exception may include one or more analysis portions associated with resolution of the condition. Thus, Rules 22 and 23 indicate whether access is granted to one or more of the analysis portions.

Other exemplary rules include Rules 24–37, as shown. For instance, Rule 24 relates to access to a particular monitor item and trigger condition defined with respect to that monitor item. In addition, Rule 25 indicates whether access to one or more attribute values provided in an exception is to be provided. For instance, such values may be used for filtering during data retrieval and/or monitoring of events. Similarly, Rule 26 relates to access to event attributes and associated values, such as those that may be detected during monitoring.

As described above, a set of monitor information (e.g., information stored in a monitor object) may be used during the monitoring of data. Therefore, Rules 27 and 28 indicate whether access to such monitor information is granted and whether new monitors (e.g., new monitoring configurations) can be created, respectively. Similarly, Rule 33 indicates whether a user (or group) can activate or deactivate existing monitors (e.g., monitoring information). In this manner, access to information used to configure monitoring conditions may be granted or limited.

Rules 34–35 indicate whether a user (or group) can access (e.g., view or modify) existing security groups, or create new security groups, respectively. In other words, a set of access rules may be configured and associated with a security group. Accordingly, the security group configuration may be used to enable security settings to be associated with different groups of users.

Figure 35:
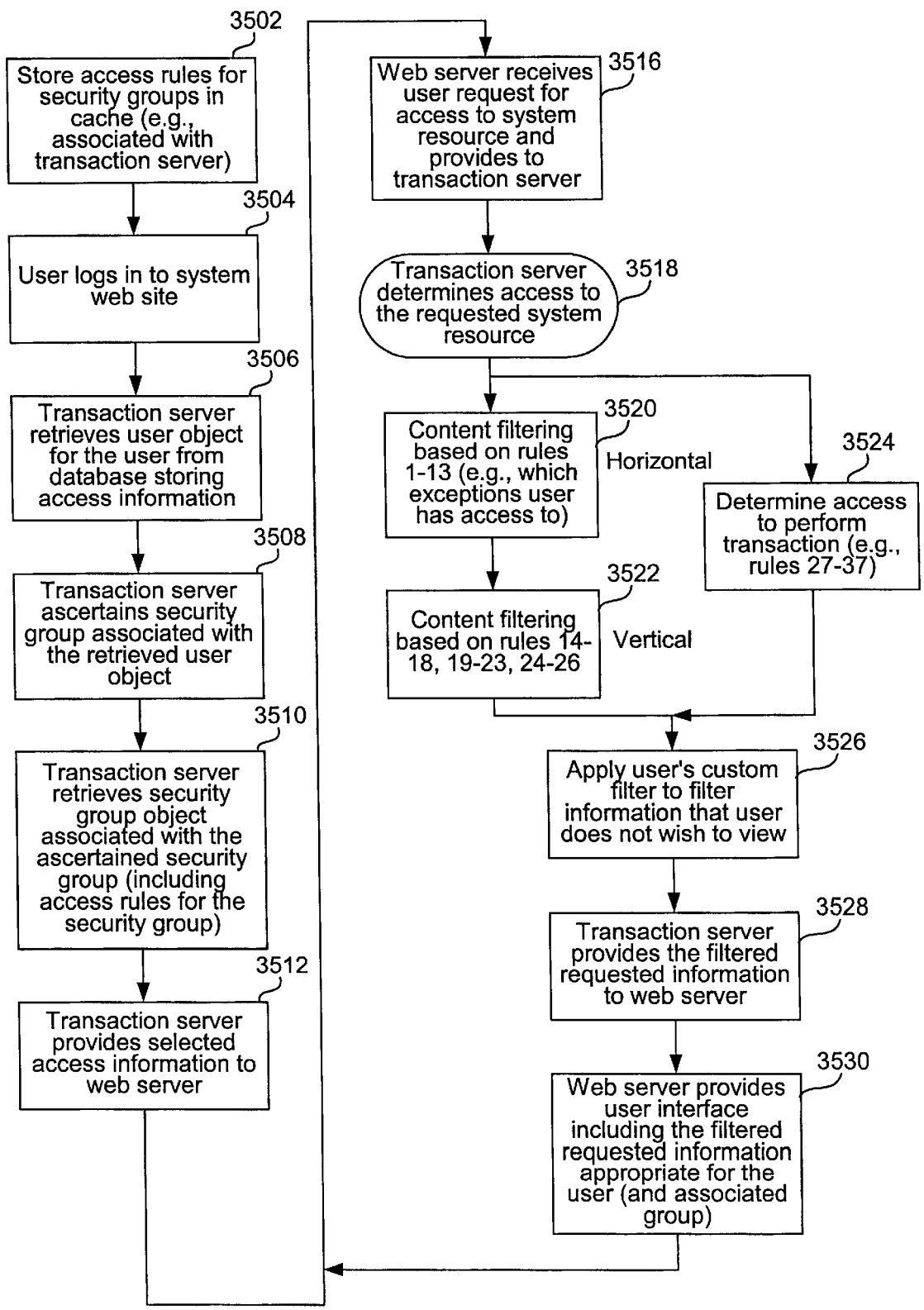
FIG. 35 is a process flow diagram illustrating a method of implementing a security system in accordance with one embodiment of the invention.

FIG. 35 is a process flow diagram illustrating a method of implementing a security system in accordance with one embodiment of the invention. As shown at block 3502, one or more access rules for each security group are preferably stored in a cache for access by a web server, thereby enabling the web server to provide data (e.g., exception information) using a user interface appropriate to the user's security clearance. In addition, all necessary access information is preferably stored in a database available to the transaction server, enabling the transaction server to implement security and business logic. As shown at block 3504, a user logs in to the system web site. The transaction server then retrieves a user object for the user from the database at block 3506, determines the appropriate security group associated with the user object 3508, and retrieves the security group object and associated access rules at block 3510. The transaction server provides the security group to the web server at block 3512, which may then provide the appropriate user interface for the user in accordance with the user's request for access to a system resource, as will be described in further detail below with reference to blocks 3516–3530.

Once the user interface is provided, the web server and transaction server may together process a request for access to a system resource. More particularly, the web server receives an access request at block 3516 and provides the request to the transaction server. The transaction server then determines whether access should be granted to the requested system resource at block 3518, described with reference to blocks 3520–3530. More particularly, horizontal filtering is performed at block 3520. Horizontal filtering includes content filtering based upon which exceptions may be accessed. For example, horizontal filtering may include processing based upon Rules 1–13 described above. In other words, the entire data associated with a detected event may be accessed. In addition, vertical filtering is performed at block 3522. Vertical filtering indicates which portions of exceptions may be accessed. For example, vertical filtering may include processing based upon Rules 14–26. In addition, security access decisions related to other functions, such as those related to configuration of monitoring conditions, are processed at block 3524. For example, such determinations may be made with respect to Rules 27–37.

Once access is determined, the user's custom filter may be applied at block 3526 to filter information according to the user's viewing preferences. The transaction server then provides the filtered requested information to the web server at block 3528 in accordance with the applied rules. The web server then provides a user interface including the requested information for which the user has access (and which the user wishes to view) at block 3530.

FIG. 36 is an exemplary graphical user interface for an exception desk from which exceptions may be accessed. As shown, the exception desk may include multiple entries, each corresponding to a different exception. Thus, the exception desk may be used to access exceptions, as well as portions of exceptions. In accordance with the security feature, such access may be limited, and therefore various exceptions (or portions thereof) may not be accessible from the exception desk. In other words, various exceptions (or portions thereof) may not be viewable or modifiable via the exception desk. For instance, as shown, the "Analysis Entries" may not be viewable depending upon the contents of the "Assigned To" field. However, it is important to note that the Exception Desk and information illustrated with respect to each exception is merely illustrative. Thus, an exception may include any information related to the detection of an event. Moreover, information related to a detected event may be presented in a variety of ways via the Exception Desk.

Various embodiments of the invention monitor data and generate notifications based upon valuable business data through a variety of processes. As described above, data may be captured and flagged to identify various "business events" or metrics to enable these events or metrics to be tracked and monitored. Thus, the flagged data may be used to capture and identify the most valuable data that is pertinent to the internal operation of a business. This data may then be used to enable important management decisions to be made within a business using the data available to it. Moreover, through the use of the flagged data, business operations may be effectively monitored. As a result, notification messages may be sent based upon detected events and/or conditions, thereby enabling businesses to use this information to their economic advantage. In addition, a security feature may be applied to limit access to various features of the system, including exceptions (or portions thereof). Accordingly, the present invention may be used as a valuable tool by a business to evaluate the effectiveness of its employees as well as its operations.

Figure 37:
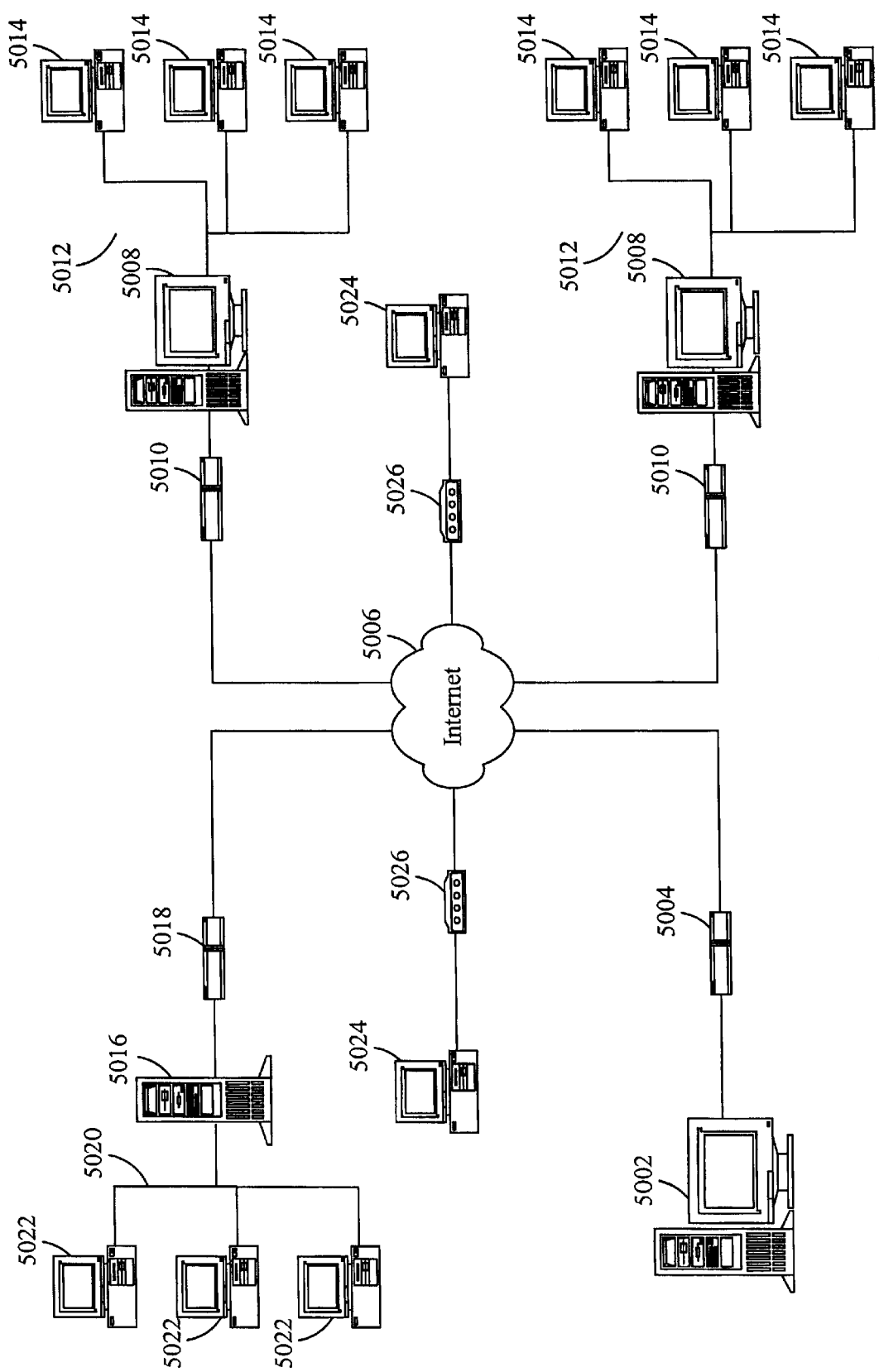
FIG. 37 is a block diagram of a hardware environment in which the various embodiments of the present invention may be implemented.

The invention may be installed for use at a server for use by a specific business. However, the invention may also be installed for use across a network such as the Internet, thereby enabling communication among multiple entities as well as data retrieval from disparate sources. FIG. 37 is a block diagram of a hardware environment in which the various embodiments of the present invention may be implemented. The web site at which communications within a business, and potentially between businesses and customers (e.g., consumers or other businesses), are facilitated according to the invention is located on a server 5002, which is connected by a router 5004 to the Internet 5006. For instance, the server 5002 may be located at a business wishing to track various events within its business. Other businesses (represented by servers 5008) may also be connected to the Internet via routers 5010 in order to receive the transmission of data (e.g., flagged data), events, metrics, exceptions, and/or notifications from the server 5002. The invention may also be installed for internal use by these other businesses 5008 to enable them to generate their own data (e.g., flagged data), events, exceptions, and/or notifications for internal use as described above or for transmission via the Internet 5006. Business servers 5008 may have networks 5012 associated therewith interconnecting a plurality of personal computers or work stations 5014. Customers of the business (represented by computers 5022 and 5024) may be connected to the Internet in a variety of ways. For example, a consumer may be connected from his home via a modem 5026, or from his workplace via a network 5020, a file server 5016, and a router 5018. It will be understood that, according to various embodiments of the invention, consumers may gain access to the web site on server 5002 via a variety of hardware configurations.

Similarly, businesses may be coupled to the web site on server 5002 in order to receive the transmission of communications as well as data from the web site. For example, a business may consist of an individual on his home computer 5024. Similarly, a consumer may be an employee who accesses the web site from his computer 5014 at his place of employment which is a business. For instance, the business may be a supplier, manufacturer or reseller. It will also be understood that the hardware environment of FIG. 37 is shown for illustrative purposes and that a wide variety of hardware environments may be employed to implement the various embodiments of the present invention. It should also be understood that specific embodiments of the methods and processes described herein are implemented as computer program instructions, i.e., software, in the memory of server 5002.

Various embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the present invention is described within the context of a business, the use of the term event (and associated attributes and metrics) may be applicable to any data retrieval, monitoring or notification context. Therefore, the present invention is not limited to the monitoring and notification of events within a business context. In addition, in accordance with several embodiments, the present invention is based upon the generation and transmission of flagged data, preferably transmitting the flagged data, events, exceptions, and notifications for internal use by a business. However, it should be understood that the present invention is not limited to this arrangement, but instead would equally apply regardless of the mode of transmission. Thus, data may be retrieved from sources (e.g., databases) that are maintained internal to the business as well as from sources that are external to the business (e.g., via the Internet). This data may be in any format, and therefore may be obtained from a database, message bus, or other suitable data source. Thus, the data may be a packet (e.g., e-mail message) or other data structure that has been stored, obtained or otherwise provided to the system for subsequent event interpretation and monitoring. Moreover, the transmission of flagged data, events, exceptions, and notifications are described above with reference to the use of the invention by a particular business. However, flagged data, events, exceptions, and notifications may be transmitted across a network such as the Internet for use within the same business as well as across different entities (e.g., among businesses and between businesses and customers of those businesses). In other words, functions performed by modules such as the adapter, agent, exception server, and notification server may be implemented together at a single server or business, as well as separately at different locations via a network such as the Internet. Thus, the terms adapter, agent, exception server, and notification server are merely illustrative and are not meant to require that the functions be performed by specific or separate modules or servers. Accordingly, the present embodiments are to be considered as illustrative and not restrictive, and the invention is not to be limited to the details given herein, but may be modified within the scope and equivalents of the appended claims.

What is claimed is:

1. A method for providing access in an event detection and tracking system the event detection and tracking system adapted for storing data associated with a plurality of detected events, comprising:

receiving an access request for access to at least a portion of data associated with one of the plurality of detected events;

obtaining access information associated with the access request;

determining from the access information whether to provide access to at least a portion of the data associated with one of the plurality of detected events; and when it is determined from the access information that access to at least a portion of the data is to be provided, providing access to at least a portion of the data in accordance with the access information;

wherein each of the plurality of detected events is defined by a set of one or more event attributes, and wherein the data includes a set of one or more values associated with one or more of the event attributes, the access information indicating whether access to at least a portion of the data is to be provided based upon the set of values associated with the one or more of the event attributes or based on a set of values of the data stored in association with the detected event.

2. The method as recited in claim 1, wherein the data comprises an indicator oft least one of a condition tat has been satisfied with respect to one of the detected events, a status of one of the detected events, a priority of one of the detected events, an analysis provided in association with one of the detected events, an author of the analysis, a time at which one of the events was detected, one or more individuals to whom resolution of the condition has been assigned, and one or more individuals who are to be notified of the detected event.

3. The method as recited in claim 1, wherein the data comprises a set of monitoring information to be accessed by a monitoring module, the set of monitoring information indicating one or more events to be monitored.

4. The method as recited in claim 1, wherein the access information indicates whether access to a portion of the data is to be provided based upon content of the portion of the data.

5. The method as recited in claim 1, wherein the access information indicates whether access to a 1, portion of the data is to be provided based upon a content of a second portion of the data.

6. The method as recited in claim 1, wherein the access information indicates whether access to the data is to be provided based upon content of a portion of to data.

7. The method as recited in claim 1, wherein the access information indicates whether access to a plurality of portions of the data is to be provided based upon content of one of the plurality of portions of the data.

8. The method as recited in claim 1, wherein the access is at least one of read access and write access.

9. The method as recited in claim 1, wherein the access information indicates whether access to at least a portion of the data is to be provided based upon content of at least a portion of the data.

10. The method as recited in claim 9, wherein the data includes information that tracks a sequence of one or more collaboration processes performed to resolve a condition associated with the detected event.

11. The method as recited in claim 9, wherein the data includes analysis associated wit the detected event and wherein access is granted when the analysis is authored by at least one of a user from which the access request is received, one or more individuals in a security group associated with the user; and one or more individuals associated with a company for which the user is employed.

12. The method as recited in claim 1, wherein the data associated with one of the plurality of detected events indicates one or more entities responsible for resolution of the condition, and wherein the access information indicates whether access is granted based upon the entities responsible for resolution of to condition.

13. The method as recited in claim 12, wherein access is granted when the entities responsible for resolution of the condition are a user from which the access request is received, one or more individuals in a security group with which the user is associated, or one or more individuals in a company associated with the user.

14. The method as recited in claim 1, wherein the access information indicates one or more values associated with one or more event attributes.

15. The method as recited in claim 14, wherein access to the data is to be provided when the one or more values indicated in the access information are approximately equal to the set of values in the data.

16. The method as recited in claim 14, wherein access to the data is to be provided when the one or more values indicated in the access information include the set of values in the data.

17. The method as recited in claim 1, wherein the access information indicates whether access is granted based upon a source oft least a portion of the data.

18. The method as recited in claim 17, wherein access is granted when the source of the data is a user from which the access request is received, one or more individuals in a security group associated with the user, or one or more individuals in a company associated with the user.

19. The method as recited in claim 1, wherein the access information indicates whether access is granted to a second portion of the data based upon contents of a first portion of the data.

20. The method as recited in claim 19, wherein the first portion of the data indicates a creator of the second portion of the data.

21. The method as recited in claim 20, wherein the first portion of the data indicates an author of analysis associated with one of the plurality of detected events, the analysis being stored in the second portion of the data.

22. The method as recited claim 20, wherein access is granted when the author is a user from which the access requested is received, an individual in a security group associated with the user, or an individual in a company associated with the user.

23. The method as recited in claim 1, wherein the data indicates a status associated with the detected event and wherein the access information indicates whether access is to be granted based upon the status associated with the detected event.

24. The method as recited in claim 1, wherein the detected event is associated with a condition that has been satisfied with respect to the detected event.

25. The method as recited in claim 23, wherein the data indicates an estimated closure date for resolution of the condition with respect to the detected event, and wherein the access information indicates whether access is granted to the estimated closure date indicated in the data.

26. The method as recited in claim 23, wherein the data indicates a priority for resolution of the condition with respect to the detected event, and wherein the access information indicates whether access is granted to the priority indicated in the data.

27. The method as recited in claim 23, wherein the data includes an assignment indicator indicating one or more individuals responsible for resolution of the condition, and wherein the access information indicates whether access is granted to the assignment indicator.

28. The method as recited in claim 23, wherein the data includes one or more analysis portions associated with resolution of the condition, and wherein the access information indicates whether access is granted one or more of the analysis portions.

29. The method as recited in claim 23, wherein the data indicates a set of notification preferences via which notification of the condition with respect to the detected event is to be transmitted, and wherein the access information indicates whether access is granted to the set of notification preferences.

30. The method as recited in claim 29, wherein the set of notification preferences indicates at least one of one or more entities to which the notification is to be sent, a notification medium via which the notification is to be transmitted, and a notification timing preference during which the notification is to be sent.

31. The method as recited in claim 29, wherein when the access includes write access, the notification can be forwarded via a second set of notification preferences.

32. The method as recited in claim 1, wherein the data associated with one of the plurality of detected events indicates one or more entities to be notified of the condition, and wherein the access information indicates whether access is granted based upon the entities to be notified of the condition.

33. The method as recited in claim 1, wherein access is granted when the entities to be notified of the condition are a user from which the access request is received, one or more individuals in a security group with which the user is associated, or one or more individuals in a company associated with the user.

34. A method for providing access in an event detection and tracking system, the event detection and tracking system adapted for storing data associated with a plurality of detected events, comprising:
   receiving an access request for access to at least a portion of data associated wit one of the plurality of detected events;
   obtaining access information associated with the access request;
   determining from the access information whether to provide access to at least a portion of the data associated with one of the plurality of detected events; and
   when it is determined from the access information that access to at least a portion of the data is to be provided, providing access to at least a portion of the data in accordance with the access information;
   wherein the access information is associated with a user from which the access request is received.

35. A method for providing access in an event detection and tracking system, to event detection and tracking system adapted for storing data associated with a plurality of detected events, comprising:
   receiving an access request for access to at least a portion of data associated with one of the plurality of detected events;
   obtaining access information associated with the access request;
   determining from to access information whether to provide access to at least a portion of the data associated with one of the plurality of detected events; and
   when it is determined from the access information that access to at least a portion of the data is to be provided, providing access to at least a portion of the data in accordance with the access information;
   wherein the access request is received from a user, and wherein the access information is associated with a security group to which the user belongs.

36. A method for providing access in an event detection and tracking system, the event detection and tracking system adapted for storing data associated with a plurality of detected events comprising:
   receiving an access request for access to at least a portion of data associated with one of the plurality of detected events;
   obtaining access information associated with the access request;
   determining from the access information whether to provide access to at least a portion of the data associated with one of the plurality of detected events; and
   when it is determined from the access information that access to at least a portion of the data is to be provided, providing access to at least a portion of the data in accordance with the access information;
   wherein the data indicates a condition that has been satisfied with respect to the detected event and wherein the access information indicates whether access to the condition is to be provided.

37. A method for providing in an event detection and tracking system, the event detection and tracking system adapted for storing data associated with a plurality of detected events, comprising:
   receiving an access request for access to at least a portion of data associated with one of the plurality of detected events;
   obtaining access information associated with the access request;
   determining from the access information whether to provide access to at least a portion of the data associated with one of the plurality of detected events; and
   when it is determined from the access information that access to at least a portion of the data is to be provided, providing access to at least a portion of the data in accordance with the access information;
   wherein the access information includes one or more access rules, each of the access rules indicating whether access is granted to at least a portion of the data.

38. The method as recited in claim 37, wherein the access is at least one of read access and write access.

39. The method as recited in claim 37, wherein each of the plurality of detected events is defined by one or more event attributes, and wherein the data includes a set of one or more values associated with one or more of the event attributes, the access information indicating whether access to one or more of the set of values is to be provided.

40. The method as recited in claim 37, wherein each of the plurality of detected events is defined by a set of one or more event attributes, the access information indicating whether access to one or more of the set of event attributes is to be provided.

41. The method as recited in claim 37, wherein the data indicates a status associated with the detected event, and wherein the access information indicates whether access is granted to the status indicated in the data.

42. A method for providing access in an event detection and tracking system, the event detection and tracking system adapted for storing data associated with a plurality of detected events, comprising:
- receiving an access request for access to at least a portion of data associated with one of the plurality of detected events;
- obtaining access information associated with the access request;
- determining from the access information whether to provide access to at least a portion of the data associated with one of the plurality of detected events; and
- when it is determined from the access information that access to at least a portion of the data is to be provided, providing access to at least a portion of the data in accordance with the access information;
- wherein the access request is received from a user, wherein providing access to at least a portion of the data comprises:
  - filtering the data provided according to a viewing filter associated with the user, the viewing filter indicating one or more attributes for which accessed data is to be viewed.

43. A computer-readable medium storing thereon computer-readable instructions for providing access in an event detection and tracking system, the event detection and tracking system adapted for storing data associated with a plurality of detected events, comprising:
- instruction, for receiving en access request for access to at least a portion of data associated with one of the plurality of detected events;
- instructions for obtaining access information associated with the access request;
- instructions for determining from the access information whether to provide access to at least a portion of the data associated with one of the plurality of detected events; and
- instructions for providing access to at least a portion of the data in accordance with the access information when it is determined from the access information that access to at least a portion of the data is to be provided;
- wherein each of the plurality of detected events is defined by a set of one or more event attributes, and wherein the data includes a set of one or more values associated with one or more of the event attributes, the access information indicating whether access to at least a portion of the data is to be provided based upon the set of values associated with the one or more of the event attributes or based upon a set of values of the data stored in association with the detected event.

44. An apparatus for providing access in an event detection and tracking system, the event detection and tracking system adapted for storing data associated with a plurality of detected events, comprising:
- means for receiving an access request for access to at least a portion of data associated with one of the plurality of detected events;
- means for obtaining access information associated with the access request;
- means for determining from the access information whether to provide access to at least a portion of the data associated with one of the plurality of detected events; and
- means for providing access to at least a portion of the data in accordance with the access information when it is determined from the access information that access to at least a portion of the data is to be provided;
- wherein each of the plurality of detected events is defined by a set of one or more event attributes, and wherein the data includes a set of one or more values associated with one or more of the event attributes, the access information indicating whether access to at least a portion of the data is to be provided based upon the set of values associated with the one or more of the event attributes or based upon a set of values of the data stored in association with the detected event.

45. An apparatus for providing access in an event detection and tracking system, the event detection and tracking system adapted for storing data associated with a plurality of detected events, comprising:
- a processor; and
- a memory, at least one of the processor and the memory being adapted for:
  - receiving an access request for access to at least a portion of data associated with one of the plurality of detected events;
  - obtaining access information associated with the access request;
  - determining from the access information whether to provide access to at least a portion of the data associated with one of the plurality of detected events; and
  - when it is determined from the access information that access to at least a portion of the data is to be provided, providing access to at least a portion of the data in accordance with the access information;
- wherein each of the plurality of detected events is defined by a set of one or more event attributes, and wherein the data includes a set of one or more values associated with one or more of the event attributes, the access information indicating whether access to at least a portion of the data is to be provided based upon the set of values associated with the one or more of the event attributes or based upon a set of values of the data stored in association with the detected event.

* * * * *